US012732625B2

(12) United States Patent
Alshina et al.

(10) Patent No.: US 12,732,625 B2
(45) Date of Patent: Sep. 8, 2026

(54) METHOD AND APPARATUS FOR ENCODING A PICTURE AND DECODING A BITSTREAM USING A NEURAL NETWORK

(71) Applicant: HUAWEI TECHNOLOGIES CO., LTD., Shenzhen (CN)

(72) Inventors: Elena Alexandrovna Alshina, Munich (DE); Han Gao, Shenzhen (CN); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/338,143

(22) Filed: Jun. 20, 2023

(65) Prior Publication Data

US 2023/0353766 A1 Nov. 2, 2023

Related U.S. Application Data

(63) Continuation of application No. PCT/EP2020/087332, filed on Dec. 18, 2020.

(51) Int. Cl.

| | |
|---|---|
| ***H04N 19/42*** | (2014.01) |
| ***H04N 19/132*** | (2014.01) |
| ***H04N 19/172*** | (2014.01) |
| ***H04N 19/187*** | (2014.01) |
| ***H04N 19/463*** | (2014.01) |
| ***H04N 19/80*** | (2014.01) |
| ***H04N 19/85*** | (2014.01) |

(52) U.S. Cl.

CPC ........... *H04N 19/42* (2014.11); *H04N 19/132* (2014.11); *H04N 19/172* (2014.11); *H04N 19/187* (2014.11); *H04N 19/463* (2014.11); *H04N 19/80* (2014.11); *H04N 19/85* (2014.11)

(58) Field of Classification Search

CPC ...................................................... H04N 19/42
USPC ....................................... 375/240.01–240.29
See application file for complete search history.

(56) References Cited

U.S. PATENT DOCUMENTS 11,218,696 B2 * 1/2022 Dorovic ............... H04N 19/523
11,677,948 B2 * 6/2023 Besenbruch ............ G06T 9/002 375/240.03
12,001,935 B2 * 6/2024 Sjögren ................ G06N 3/0455
2003/0067973 A1 * 4/2003 Lee .................... H03H 17/0657 375/229

(Continued)

OTHER PUBLICATIONS

Sze et al., "High Efficiency Video Coding (HEVC): Algorithms and Architectures," Integrated Circuits and Systems, Springer, Total 384 pages (Sep. 2014).

(Continued)

*Primary Examiner* — Leron Beck
(74) *Attorney, Agent, or Firm* — Leydig, Voit & Mayer, Ltd.

(57) ABSTRACT

A method and an apparatus for encoding a picture and decoding a bitstream representing a matrix using a neural network is provided. The method includes obtaining a resizing method out of a plurality of resizing methods. The resizing method is applied to resize an input of size S to a size $\overline{S}$. The resized input is processed by the neural network, wherein the neural network comprises one or more downsampling layers. Subsequently, the method provides an output of the neural network, the output having a size P that is smaller than S in the at least one dimension.

10 Claims, 27 Drawing Sheets

(56) References Cited

U.S. PATENT DOCUMENTS

| | | | | |
|---|---|---|---|---|
| 2018/0091825 | A1* | 3/2018 | Zhao | H04N 19/117 |
| 2019/0096049 | A1* | 3/2019 | Kim | G06T 5/60 |
| 2019/0251707 | A1* | 8/2019 | Gupta | G06T 9/002 |
| 2019/0297326 | A1* | 9/2019 | Reda | G06T 5/20 |
| 2020/0145661 | A1* | 5/2020 | Jeon | G06N 3/08 |
| 2020/0162751 | A1* | 5/2020 | Kim | H04N 19/14 |
| 2020/0175290 | A1* | 6/2020 | Raja | G06N 3/045 |
| 2021/0044804 | A1* | 2/2021 | Lu | H04N 19/132 |
| 2021/0127101 | A1* | 4/2021 | Roh | H04N 23/55 |
| 2021/0241429 | A1* | 8/2021 | Pan | G06N 3/045 |
| 2021/0319420 | A1* | 10/2021 | Yu | G06V 20/52 |
| 2021/0350163 | A1* | 11/2021 | Ojard | G16B 40/10 |
| 2022/0094977 | A1* | 3/2022 | Kim | H04N 19/136 |

OTHER PUBLICATIONS

Hashemi, "Enlarging smaller images before inputting into convolutional neural network: zero-padding vs. interpolation," Journal of Big Data, vol. 6, Springer Open, XP055725533, Total 14 pages (Nov. 14, 2019).

Hassaballah et al., "Recent Advances in Computer Vision: Theories and Applications," Theories and Applications, Springer, Total 430 pages (Jan. 2019).

Theis et al., "Lossy Image Compression with Compressive Autoencoders," Published as a conference paper at ICLR 2017, arxiv.org, Cornell University Library, 201 Online Library Cornell University Ithaca, NY 14853, XP080753545, Total 19 pages (Mar. 1, 2017).

Balle et al., "Variational Image Compression With a Scale Hyperprior," arXiv:1802.01436v2 [eess.IV], Total 23 pages (May 1, 2018).

Ozer et al., "Noise robust sound event classification with convolutional neural network," Neurocomputing, vol. 272, Elsevier, XP085275968, Accepted Jul. 2017, Total 8 pages (Jan. 2018).

Guo et al., "3-D Context Entropy Model for Improved Practical Image Compression," IEEE/CVF Conference on Computer Vision and Pattern Recognition Workshops (CVPRW), Total 4 pages (Apr. 2020).

* cited by examiner x
Encoder
601
y
Q
602
ŷ
Hyper encoder
603
z
Q
608
ẑ
AE
609
Bitstream 2
AD
610
ẑ'
Hyper decoder
607
ŷ'
AE
605
Bitstream 1
AD
606
ŷ
Decoder
604
x̂ input image
reconstruction
814
801
802
803
804
805
806
807
808
809
810
811
812
813
815
820
830
conv Nx5x5/2↓
GDN
conv Mx5x5/2↓
abs
conv Nx3x3/1
ReLU
Q
AE
AD
Bitstream 1
Bitstream 2
conv Mx3x3/1
conv Nx5x5/2↑
IGDN
conv 3x5x5/2↑

Receive input with size S
Obtain resizing method
Resize input from size S to size $\tilde{S}$
Process resized input
Provide output with size P
2210
2220
2230
2240
2250
2200

2400
2401
2402
2403
2404
2405
2410
2420
2430
2440

METHOD AND APPARATUS FOR ENCODING A PICTURE AND DECODING A BITSTREAM USING A NEURAL NETWORK

CROSS-REFERENCE TO RELATED APPLICATIONS

This application is a continuation of International Application No. PCT/EP2020/087332, filed on Dec. 18, 2020 the disclosure of which is hereby incorporated by reference in its entirety.

FIELD

The present disclosure pertains to a method for encoding a picture using a neural network to process an input and a method for decoding a bitstream representing a picture using a neural network to process an input representing a matrix as well as encoders and decoders and a computer-readable storage medium for performing these methods.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Neural networks and deep-learning techniques making use of neural networks have now been used for some time, also in the technical field of encoding and decoding of videos, images and the like.

In such cases, the bitstream usually represents or is data that can reasonably be represented by a two-dimensional matrix of values. For example, this holds for bitstreams that represent or are images, video sequences or the like data. Apart from 2D data, the neural network and the framework referred to in the present disclosure may be applied to further source signals such as audio signals, which are typically represented as a 1D signal, or other signals.

For example, neural networks comprising a plurality of downsampling layers may apply a downsampling (convolution, in the case of the downsampling layer being a convolution layer) to an input to be encoded, like a picture. By applying this downsampling to the input picture, its size is reduced and this can be repeated until a final size is obtained. Such neural networks can be used for both, image recognition with deep-learning neural networks and encoding of pictures. Correspondingly, such networks can be used to decode an encoded picture. Other source signals such as signals with less or more than two dimensions may be also processed by similar networks.

It may be desirable to provide a neural network framework which may be efficiently applied to various different signals possibly differing in size.

SUMMARY

Embodiments of the present disclosure may allow for effectively encoding a picture while ensuring that the original information of the picture can be reconstructed with as little loss of information as possible.

Some embodiments described in the present disclosure provide a method of encoding a picture using a neural network as well as a method for decoding a bitstream representing a picture using a neural network. Further embodiments may refer to an encoder for encoding a picture or a decoder for decoding a bitstream representing a picture. Some embodiments of the present disclosure may pertain to a computer-readable storage medium for instructing a computer to perform a method for encoding a picture or for decoding a bitstream representing a picture.

One embodiment of the resent disclosure pertains to a method for encoding a picture using a neural network, NN, to process or by processing an input representing a matrix having a size S in at least one dimension, wherein the method comprises:

- obtaining a resizing method out of a plurality of resizing methods,
- resizing the input with the size S to a size $\bar{S}$ by applying the resizing method,
- processing the resized input with the size $\bar{S}$ by the NN, wherein the NN comprises one or more downsampling layers, and
- providing, after processing the input with the size $\bar{S}$ with the NN, an output of the NN, the output having a size P that is smaller than S in the at least one dimension.

The step of obtaining (of the method for encoding a picture using a neural network) may also be formulated as obtaining for an/the input representing a/the matrix having a size S in at least one direction a resizing method out of a plurality of resizing methods.

Generally, a picture in the context of the present disclosure may constitute a still picture or a moving picture like a video or video sequence. Also, a portion of a bigger picture or a portion of a video sequence may be encompassed by the term picture. A picture may also be referred to as a frame or an image.

The resizing applied to the input that changes its size S in at least one dimension to a size $\bar{S}$ may generally comprise addition or removal of sample values of the input with the size S.

In this regard, the obtaining of a resizing method of a plurality of resizing methods is to be understood as meaning that, while a plurality of resizing methods would be available to the encoding of the picture, one is used preferably not arbitrarily but depending on additional information. This may result in a selection of a resizing method suited for the input or for obtaining an intended output of the neural network, for example with respect to the size of the output.

The input to the neural network may be a two-dimensional input like the picture itself or a matrix representing sample values of the picture or another structure representing the picture. The input may not necessarily be the picture itself but it may also pertain to a pre-processed or otherwise processed version of this picture. The pre-processing or processing of the picture before it is provided as input to the neural network may for example comprise preparing or modifying the picture for further processing by the neural network.

In the context of the present disclosure, a downsampling layer may be understood as a layer that reduces, for example by applying a convolution to an input, the size of the input. This can comprise for example reducing the size by a factor, also referred to as a downsampling ratio of the downsampling layer, where the downsampling ratio may an integer number larger than 1 if a downsampling is applied that in reduces the size S of the input to a reduced size $\bar{S}$. Downsampling ratios can have any value and may, for example, be 2, 4, 8 or the like. They can also be non-multiples of 2 like for example 5 or 13. The disclosure herein is not limited to specific downsampling ratios.

The disclosure is also not limited to a specific number of downsampling layers being provided as part of the neural network. Any number of downsampling layers can be provided with the neural network. For example, 2, 5, 10 or even more layers can be provided. The layers can also differ with respect to their downsampling ratios or they may all have the same downsampling ratio. For example, all downsampling layers of the neural network may have a downsampling ratio of 2, though the present disclosure is not limited in this regard.

The output of the neural network may also be referred to as the encoded picture though the output of the neural network, as such, is not necessarily already the bitstream representing the encoded picture. An output that encodes the picture may be binarized and may further comprise additional information, for example with respect to the resizing method used for applying the resizing.

This embodiment allows for selecting a resizing method and applying a resizing method for the resizing depending on the circumstances. For example, for some cases it may be more advantageous to increase the size S of the input during the resizing to a size $\bar{S}$ that is larger than S before processing the input with the neural network. Other situations may be more appropriately handled by reducing the size S of the input to a size $\bar{S}$ that is smaller than S. While these are the two general concepts of resizing (either increasing or decreasing the size), among the methods that increase the size S of the input to a size $\bar{S}$ and that decrease the size S of the input to the size $\bar{S}$, some may be even more appropriate than others and may therefore be selected depending on circumstances. Alternatively or additionally, a resizing method or a group of resizing methods may be preset by, for example, a user that wants to encode a picture. This allows for more user-friendly encoding of information.

In one embodiment, the step of obtaining comprises determining the resizing method out of the plurality of resizing methods based on information relating to at least one of the input, the one or more layers of the NN, an output to be provided by the NN, and one or more indications.

In some embodiments, a resizing method may be selected based on the size S of the input and/or the downsampling ratio of at least one of the downsampling layers of the neural network or a target size that is to be provided as output of the neural network (for example the size P may be a target size that is pre-set). Furthermore, as already mentioned above, a user may indicate the resizing method to choose or, upon having performed processing cycles on the input with the neural network several times, an indication may be obtained which resizing method is the most reasonable giving account to the input to be encoded. Based on such further indications, the resizing method may be obtained.

In a further embodiment, the plurality of resizing methods comprises one or more out of padding, padding with zeros, reflection padding, repetition padding, cropping, interpolation to increase the size S of the input to the size $\bar{S}$, interpolation to decrease the size S of the input to the size $\bar{S}$. These methods can advantageously be employed in the resizing.

In some embodiments, the information comprises at least one downsampling ratio of the one or more downsampling layers, and the step of obtaining comprises comparing the size S of the input to a product of downsampling ratios $r_m$ of all downsampling layers of the NN. Here, $r_m$ denotes the downsampling ratio of any downsampling layer m among the downsampling layers of the neural network. Any downsampling ratio $r_m$ preferably is an integer number larger than 1. The index m may be a natural number and may be used to number the downsampling layers in the order they process an input provided to the neural network. In this regard, the first downsampling layer may be denoted with m=1, the second downsampling layer with m=2 and so on. The enumeration may not begin with m=1. Also any other number may be chosen, like 0 or −1 for the first downsampling layer. Moreover, though m may be a natural number and adjacent downsampling layers may differ by the value 1 in their index m, this is not mandatory and also any other way of enumerating and/or distinguishing between the downsampling layers may be provided.

The resizing method may be obtained by comparing the size S to a closest smaller integer multiple of the product of downsampling ratios of all downsampling layers in the NN and/or by comparing the size S to a closest larger integer multiple of the product of the downsampling ratios of all downsampling layers in the NN.

By this evaluation, it can be determined whether increasing the size or decreasing the size is, for example, computationally more efficient and depending on this, the resizing method to use (for example padding or cropping) can be determined.

It may be provided that, if the size S is closer to the closest smaller integer multiple of the product of the downsampling ratios of all downsampling layers in the NN than to the closest larger integer multiple of the product of the downsampling ratios of all downsampling layers in the NN, then a resizing method is applied that decreases the size S to the size $\bar{S}$. Alternatively or additionally it may be provided that, if the size S is closer to the closest larger integer multiple of the product of the downsampling ratios of all downsampling layers in the NN than to the closest smaller integer multiple of product of the downsampling ratios of all downsampling layers in the NN, then a resizing method is applied that increases the size S to the size $\bar{S}$.

In this regard, the comparing may comprise calculating one of $$\mathrm{ceil}\left(\frac{S}{\prod_m r_m}\right)\prod_m r_m \text{ or } \mathrm{floor}\left(\frac{S}{\prod_m r_m}\right)\prod_m r_m.$$

These values can be used to, on the one side, calculate the closest smaller or larger integer multiple. Using the ceil function, the closest larger integer multiple of the product of the downsampling ratios of all downsampling layers can be obtained and using the floor function, the closest smaller integer multiple of the product of the downsampling ratios of all downsampling layers can be obtained, for example. This can subsequently be used to determine which of the increasing or decreasing of the size S may be chosen, for example in view of the computational complexity.

In some embodiments, a value C may be provided that is obtained by $$C = \left| \mathrm{ceil}\left(\frac{S}{\prod_m r_m}\right)\prod_m r_m - S \right|.$$

Additionally, a value F may be provided by $$F = \left| \mathrm{floor}\left(\frac{S}{\prod_m r_m}\right)\prod_m r_m - S \right|.$$

It is possible to explicitly calculate the values C and F in the sense that, during processing, values C and F are obtained, or these values can be used implicitly without explicitly calculating them. Depending on which of either C or F is larger, the resizing method can be chosen. If, for example, F is larger than C, then the distance of the size S of the input to the closest smaller integer multiple of the product of the downsampling ratios of all downsampling layers is larger than the distance to the closest larger integer multiple of the product of the downsampling ratios of all downsampling layers. In such a case, it may be computationally more efficient to increase the size of the input S to a size $\overline{S}$ that is larger than S. In that case, $\overline{S}$ may correspond to the closest larger integer multiple of the product of the downsampling ratios of all downsampling layers. If C is larger than F, it may be computationally more efficient to decrease the size S to a size $\overline{S}$ where $\overline{S}$ in that case may correspond to the closets smaller integer multiple of the product of the downsampling ratios of all downsampling layers.

If, during this comparing, it is obtained that C is equal to F, no resizing method may be applied that changes the size S of the input. By using these formulas, a reliable evaluation of whether increasing or decreasing the size S is more efficient can be made.

In a further embodiment, the information comprises the size P of the output in the at least one dimension or the information comprises an index indicating an entry in a pre-stored lookup table, LUT, comprising a plurality of entries, wherein each entry indicates a different output size and the method further comprises obtaining the size P from the LUT using the index.

With the first alternative of this embodiment, the size P (which may also be referred to as intended output size) of the output can be immediately obtained, thereby making it possible to specify the resizing method to be chosen so that the intended output size is obtained. Providing an indication that indicates an entry in the table that may, for example, be available to the encoder that performs the encoding reduces the size of information that needs to be provided to the encoder for performing the encoding.

In a further embodiment, it is provided that, based on the size P and the size S, a resizing method is obtained so that the output of the NN, after processing the input with the size S, has the size P. This can comprise, for example, obtaining and applying a resizing method so that the size S is changed to a size S that, when processed by the downsampling layers of the neural network, results in an output having the size P.

In a further embodiment, obtaining the resizing method comprises comparing the size S to a product D obtained from the size P and the downsampling ratios of all downsampling layers of the NN. Thereby, the downsampling that will be applied on the input with the size S can be used together with the to be obtained size P of the output to determine whether, for example, the size S is to be increased or decreased. This can be advantageous in cases where the intended output size P is a preset value.

It can also be provided that, if the size S is larger than D, then a resizing method is applied that reduces the size S to the size $\overline{S}$, and/or if the size S is smaller than D, then a resizing method is applied that increases the size S to the size $\overline{S}$. Here, the size $\overline{S}$ is equal to the product D.

Instead of calculating the product of the downsampling ratios of all downsampling layers and the intended output size P, it may also be provided, in one embodiment, that only the size $\overline{S}$ which is the size to which the size S is resized and may be identical to the product of the size P with the downsampling ratios of all downsampling layers, is provided, reducing the amount of information necessary.

In a further embodiment, the size P is provided as further information, wherein the information is provided together with the picture or in an additional bitstream.

In one embodiment, the one or more indications comprise an indication, wherein a first value of the indication indicates that padding or cropping is to be applied as the resizing method and a second value of the indication indicates that interpolation is to be applied as the resizing method. The first and second value of the indication in this context mean that the indication can either take the first value or the second value. Thereby, the information regarding which resizing method is to be used can be provided for the encoding with a preferably small amount of information. This indication may also be referred to in the following as "first indication" for easier differentiation from other indications. It may be present or not present, independent from presence or non-presence of other indications explained in the following.

In some embodiments, it may be provided that the indication is or comprises a flag that has a size of 1 bit. Thereby, it can be indicated with a small amount of information whether an increasing or a decreasing of the size S of the input during the resizing is to be applied.

In one embodiment, the one or more indications comprise an indication, wherein a first value of the indication indicates that the size S is to be increased and a second value of the indication indicates that the size S is to be decreased. This indication may also be referred to in the following as "second indication" for easier differentiation from other indications.

That this second indication may be present independent from the first indication and/or independent from other indications referred to below. It may, however, also be provided when the value of the first indication indicates that interpolation is to be applied. This may encompass that, at least when the value of the first indication indicates that interpolation is applied, the second indication is also provided or signaled. The second indication may not be present when the value of the first indication does not indicate that interpolation is to be applied, thereby reducing the amount of information provided further. However, it may also be provided that the second indication is provided in any case, independent from the value of the first indication and, for example, if the value of the first indication does not indicate that interpolation is to be applied, this value is set to a default value, for example 0. This holds for all other indications mentioned herein that are provided when another indication has a value.

In a further embodiment, the one or more indications comprise an indication, wherein a value of the indication indicates an interpolation filter that is to be used in the interpolation. Thereby, further specifications to the interpolation to be applied during the resizing can be provided. This indication may also be referred to in the following as "third indication" for easier differentiation from other indications. This indication may be present independent from the presence or not-presence of other indications. In some embodiments, it may, however, be provided when the first indication indicates that interpolation is to be applied as the resizing method.

In this regard, it can be provided that the indication is or comprises an index indicating an entry in a lookup table, LUT, that has a plurality of entries and each entry in the LUT specifies an interpolation filter. Thereby, the amount of information that is provided or signaled is further reduced in case the look-up table is already available at the encoder performing the encoding.

In some embodiments, the interpolation filters may comprise Bilinear, Bicubic, Lanczos3, Lanczos5, Lanczos8, a N-tab filter.

In a further embodiment, the one or more indications comprise an indication, wherein a first value of the indication indicates that padding is to be applied as the resizing method and a second value of the indication indicates that cropping is to be applied as the resizing method. With this, also information on whether padding or cropping is to be used in the resizing can be provided. This indication may also be referred to in the following as "fourth indication" for easier differentiation from other indications. This indication may be present independent from the presence or not-presence of other indications. In some embodiments, it may, however, be provided when the first indication indicates that padding or cropping is to be applied as the resizing method.

In some embodiments, the indication may be or may comprise a flag having a size of 1 bit. This reduces the size of the indication to a minimum while ensuring that the appropriate information can be provided.

In another embodiment, the one or more indications comprise an indication, the indication having a value that indicates whether padding with zeros, reflection padding or repetition padding is to be applied as the resizing method. With this, different kinds of padding can be provided. This indication may also be referred to in the following as "fifth indication" for easier differentiation from other indications. This indication may be present independent from the presence or not-presence of other indications. In some embodiments, it may, however, be provided when the fourth indication indicates that padding or cropping is to be applied as the resizing method.

It may also be provided that instead of the fifth indication, the fourth indication has a size of 2 bit, thereby providing information that can have four different values. In that case, the value of this fourth indication can indicate whether padding with zeros, reflection padding, repetition padding or cropping is to be applied as the resizing method by associating one of those methods each with one value of the fourth indication. A fifth indication that specifies the method of padding is then not provided.

In a further embodiment, the one or more indications comprise an indication that is or comprises an index indicating an entry in a look-up table, LUT, wherein the LUT comprises a plurality of entries, wherein each entry specifies a resizing method. With this, the resizing method to choose for encoding can be obtained from the LUT and the information that needs to be provided to the encoder may only comprise the indication in the form of or comprising the index.

In some embodiments, it can be provided that the LUT comprises entries for at least two resizing method comprising padding with zeros, reflection padding, repetition padding, cropping, interpolation.

In particular, the LUT may comprise at least one entry specifying interpolation to increase the size of the input as resizing method and/or wherein the LUT comprises at least one entry specifying interpolation to decrease the size of the input as resizing method. In some embodiments, the LUT may further comprise, for interpolation to increase the size, different entries that specifies the interpolation filter to be used for the interpolation to increase the size. Furthermore, in some embodiments, the LUT may further comprise, for interpolation to decrease the size, different entries that specifies the interpolation filter to be used for the interpolation to decrease the size. Assuming there is a number of N (N being a natural number being at least 1) interpolation filters that can be applied during interpolation for increasing the size of the input, the LUT may then comprise N entries for "interpolation to increase the size of the input", where each entry specifies a different filter. Correspondingly, there may be M (M being a natural number being at least 1; M can be identical to N) interpolation filters that can be applied during interpolation to decrease the size of the input. The LUT may then comprise M entries for "interpolation to decrease the size of the input", where each entry specifies a different filter.

It can be provided that the resizing of the input with the size S to the size $\overline{S}$ with the resizing method obtained from the one or more indications is applied so that the size $\overline{S}$ is an integer multiple of a product of the downsampling ratios of all downsampling layers of the NN. As processing the input of the size s bar with neural network is reasonably possible in case the size s bar is an integer multiple of the product of the downsampling ratios of all downsampling layers, this ensures reliable processing of the input.

In one embodiment, the size S corresponds to the size of the picture in the at least one dimension. The size of the picture may for example be expressed in terms of the number of samples in one or two dimensions. As the size S may refer to a one-dimensional value, the size S may correspond, with its value, to the number of samples of the picture in this dimension.

In a further embodiment, information on the resizing method used is included in a bitstream comprising the output or in an additional bitstream. Thereby, the information regarding the resizing method that was applied during the encoding is also provided in a bitstream that may be provided to a decoding method or a decoder. This can support reliably reconstructing the picture from the bitstream. Instead of providing this information in a bitstream comprising the encoded picture, a second bitstream (additional bitstream) may be provided in which this information is included, for example in order to separately provide this additional bitstream to another computing entity for further processing.

In some embodiments, the information on the resizing method used may comprise at least one of the size of the input, the size of the picture, the resizing method applied, one or more indications, a downsampling ratio of at least one downsampling layer of the NN. The indications can be the first to fifth indications as referred to above. However, also other indications can be thought of. The disclosure is not limited regarding the indications that are provided.

With this information, reliable decoding of the bitstream is possible.

A method of decoding a bitstream representing a picture using a neural network, NN, to process or by processing an input representing a matrix having a size T in at least one dimension, wherein the method comprises:

obtaining a resizing method out of a plurality of resizing methods, processing the input with the size T by the NN, wherein the NN comprises one or more upsampling layers, thereby obtaining an intermediate output having a size $\bar{T}$ that is larger than T in the at least one dimension, resizing the intermediate output from the size $\bar{T}$ to a size $\hat{T}$ by applying the obtained resizing method, thereby obtaining a decoded picture.

The step of obtaining (of the method for decoding a bitstream representing a picture using a neural network) may also be formulated as obtaining for an/the input representing a/the matrix having a size T in at least one direction a resizing method out of a plurality of resizing methods.

The intermediate output with a size $\bar{T}$ bar is not necessarily provided as an explicit output of the neural network. Indeed, the resizing of the intermediate output with the size $\bar{T}$ may also be applied as one step in the processing of the bitstream through the neural network directly, thus not requiring an explicit provision of the intermediate output.

In some embodiments, the size $\hat{T}$ may correspond to the size of the decoded picture. This is, however, not necessarily the case if the output of the neural network as such does not already constitute the decoded picture.

With this method of decoding, a reliable decoding of an encoded picture can be obtained also in cases of an adaptive selection of a resizing method during the encoding of the picture, for example with one of the methods referred to above.

It can be provided that the step of obtaining the resizing method comprises determining the resizing method from the plurality of resizing methods based on information relating to at least one of the input, the one or more layers of the NN, an output to be provided by the NN, the decoded picture, one or more indications. This information may be obtained from the bitstream or an additional bitstream and may be provided, for example, by an encoder that encoded the picture, thereby supporting reliable reconstruction of the picture in the decoding.

It can be provided that the plurality of resizing methods comprises padding, padding with zeros, reflection padding, repetition padding, cropping, interpolation to increase the size $\bar{T}$ of the intermediate output to the size $\hat{T}$, interpolation to decrease the size $\bar{T}$ of the intermediate output to the size $\hat{T}$. These methods may be advantageous with respect to resizing an input obtained from a neural network that has the form of or can be represented in the form of a matrix.

In one embodiment, the method comprises comparing the size $\bar{T}$ with the size $\hat{T}$ and obtaining, based on the comparing, the resizing method. The size $\hat{T}$ may be further obtained by some calculation or processing or it may be provided as part of the bitstream as the size $\hat{T}$ may be associated with the size of the picture to be decoded and, therefore, this information may be provided to the decoding.

In some embodiments, the size $\hat{T}$ may be obtained from a function. In case the size $\hat{T}$ is not provided in the bitstream or the like, it may be obtained from a function, for example based on other information. This may be advantageous if the size $\hat{T}$ can be obtained from other information that is already included in the bitstream, thereby reducing the size of the bitstream as no further redundant information, in this case the size $\hat{T}$, is provided in the bitstream.

In one embodiment, the function comprises or is a combined upsampling parameter of the NN. The combined upsampling parameter may be related to the upsampling ratios of the neural network and/or it may pertain to information regarding the upsampling ratios of the decoder. This may support reliable decoding.

In some embodiments, the combined upsampling parameter is or comprises a product of the upsampling ratios of all upsampling layers of the NN. In case the upsampling ratios of the upsampling layers of the neural network are available during the decoding, this product can be obtained without having to additionally include information in the bitstream, thereby reducing its size.

It can further be provided that the size $\hat{T}$ is obtained from a product of the size T of the input and the upsampling ratios of all upsampling layers of the NN. As the size T may be obtained from the bitstream without having to explicitly provide it in the same and as the upsampling ratios of all upsampling layers are usually available during the decoding, this information does not need to be provided additionally in the bitstream, thereby reducing its size.

It can also be provided that, if the size $\bar{T}$ is not equal to the size $\hat{T}$, the resizing method is applied. This encompasses the case where a resizing of the input with the size S to the size $\bar{T}$ is applied in any case, even if it the size $\bar{T}$ is equal to the size $\hat{T}$. However, a resizing that changes the size $\bar{T}$ to the size $\hat{T}$ may only be applied if these sizes differ in order to avoid unnecessary modification to the result of the upsampling.

In one embodiment, if the size $\bar{T}$ is smaller than the size $\hat{T}$, a resizing method is applied that increases the size $\bar{T}$. Additionally or alternatively it may be provided that, if the size $\bar{T}$ is larger than the size $\hat{T}$, a resizing method is applied that decreases the size $\bar{T}$.

In one embodiment, the size $\hat{T}$ is obtained from the bitstream or from an additional bitstream or the size $\hat{T}$ is obtained from an index in the bitstream or from an index in an additional bitstream and the index indicates an entry in a table, wherein the table is a lookup table, LUT, comprising a plurality of entries and each entry indicates a size $\hat{T}$. The method may further comprise obtaining the size $\hat{T}$ using the index. Thereby, reliable reconstruction of the picture may be ensured. The first alternative allows for immediately obtaining the size $\hat{T}$ without further processing. The second alternative may allow for reducing the size of the bitstream.

It can be provided that the one or more indications comprise an indication, wherein a first value of the indication indicates that padding or cropping is to be applied as the resizing method and a second value of the indication indicates that interpolation is to be applied as the resizing method. This indication may also be referred to in the following as "first indication" for easier differentiation from other indications. It may be present or not present, independent from presence or non-presence of other indications explained in the following.

The first indication and all further indications mentioned below may be indicated/signaled in the bitstream itself or in an additional bitstream or may otherwise be made available to the decoding. The first indication may be provided with the size that is as small as possible so as to only indicate the appropriate information. Thereby, the size of the bitstream is reduced further while ensuring reliable reconstruction of the picture.

In some embodiments, it can be provided that the indication is or comprises a flag having a size of 1 bit. This reduces the size of the indication to a minimum.

In a further embodiment, the one or more indications comprise an indication, wherein the indication has a first value that indicates that the size $\overline{T}$ is to be increased and a second value that indicates that the size $\overline{T}$ is to be decreased. This indication may also be referred to in the following as "second indication" for easier differentiation from other indications.

The second indication may be present independent from the first indication and/or independent from other indications referred to below. It may, however, also be that it is only present if the first indication indicates that interpolation is to be applied as the resizing method. Thereby, the size of the bitstream can be reduced further. For all further indications that are provided when another indication takes a value, this may also be the case.

In one embodiment, the one or more indications comprise an indication, wherein the indication has a value that indicates an interpolation filter that is to be used in the interpolation. This indication may also be referred to in the following as "third indication" for easier differentiation from other indications.

As the interpolation filters are usually available during the decoding, the selection of the interpolation filter can be signaled in the bitstream with as little information as possible, thereby reducing its size.

In some embodiments, the indication may be or may comprise an index indicating an entry in a lookup table, LUT that has a plurality of entries and each entry in the LUT specifies an interpolation filter. In case the LUT is already available for example at a decoder applying the decoding method, only the indication may be provided in the bitstream, thereby reducing the size of the bitstream as the interpolation filters as such do not have to be signaled.

In some embodiments, the interpolation filters may comprise Bilinear, Bicubic, Lanczos3, Lanczos5, Lanczos8, a N-tab filter.

Further, the LUT may be provided in the bitstream or in an additional bitstream or is pre-set. If the look-up table is preset, it is already available to the decoding or the decoder that performs the decoding. In that case, the LUT may not be provided in the bitstream. If the LUT is provided in the bitstream or an additional bitstream, in order to reduce their size, the look-up table may be provided in the header of the bitstream or at any other reasonable portion that allows for providing the look-up table only once in the bitstream, thereby keeping its size as small as possible. The indication may then be provided on a slice level or the like, referencing values in the LUT.

In a further embodiment, the one or more indications comprise an indication, the indication having a first value that indicates that padding is to be applied as the resizing method and a second value that indicates that cropping is to be applied as the resizing method. This indication may also be referred to in the following as "fourth indication" for easier differentiation from other indications. This indication may be present independent from the presence or not-presence of other indications. In some embodiments, it may, however, be provided when the first indication indicates that padding or cropping is to be applied as the resizing method.

It can be provided that the indication is or comprises a flag having a size of 1 bit. This may reduce the size of the bitstream.

In one embodiment, the one or more indications comprise an indication, the indication having a value that indicates whether padding with zeros, reflection padding or repetition padding is to be applied as the resizing method. With this, also a selection among the available padding methods can be reliably made. This indication may also be referred to in the following as "fifth indication" for easier differentiation from other indications. This indication may be present independent from the presence or not-presence of other indications. In some embodiments, it may, however, be provided when the fourth indication indicates that padding or cropping is to be applied as the resizing method.

Alternatively, it may be provided that the fourth indication has a size of 2 bit and a value of the fourth indication indicates whether padding with zeros, reflection padding, repetition padding or cropping it to be applied as the resizing method. In that case, no fifth indication may be provided.

In a further embodiment, the one or more indications comprise an indication that is or comprises an index indicating an entry in a look-up table, LUT, wherein the LUT comprises a plurality of entries, wherein each entry specifies a resizing method. With this, the resizing method to choose for decoding can be obtained from the LUT and the information that needs to be provided in the bitstream (or an additional bitstream) only comprises the indication in the form of or comprising the index.

In some embodiments, it can be provided that the LUT comprises entries for at least two resizing method comprising padding with zeros, reflection padding, repetition padding, cropping, interpolation.

In particular, the LUT may comprise at least one entry specifying interpolation to increase the size of the intermediate output as resizing method and/or wherein the LUT comprises at least one entry specifying interpolation to decrease the size of the intermediate output as resizing method. In some embodiments, the LUT may further comprise, for interpolation to increase the size, different entries that specifies the interpolation filter to be used for the interpolation to increase the size. Furthermore, in some embodiments, the LUT may further comprise, for interpolation to decrease the size, different entries that specifies the interpolation filter to be used for the interpolation to decrease the size. Assuming there is a number of N (N being a natural number being at least 1) interpolation filters that can be applied during interpolation for increasing the size of the intermediate output, the LUT may then comprise N entries for "interpolation to increase the size of the intermediate output", where each entry specifies a different filter. Correspondingly, there may be M (M being a natural number being at least 1, M can be identical to N) interpolation filters that can be applied during interpolation to decrease the size of the intermediate output. The LUT may then comprise M entries for "interpolation to decrease the size of the intermediate output", where each entry specifies a different filter.

Embodiments of the present disclosure also refer to an encoder for encoding a picture, wherein the encoder comprises a receiver for receiving a picture and one or more processors configured to implement a neural network, NN, the NN comprising, in a processing order of a picture through the NN, a plurality of layers comprising at least one downsampling layer that is adapted to apply a downsampling to an input, and a transmitter for outputting a bitstream, wherein the encoder is adapted to perform a method according to any of the above embodiments.

Furthermore, an encoder for encoding a picture is provided, wherein the encoder comprises one or more processors for implementing a neural network, NN, wherein the one or more processors are adapted to perform a method according to any of the above embodiments.

The present disclosure also refers to an encoder for encoding a picture, the encoder comprising one or more processors that are adapted to implement a neural network NN, the NN comprising, in a processing order of a picture through the NN, a plurality of layers comprising at least one downsampling layer that is adapted to apply a downsampling to an input, and a transmitter for outputting a bitstream, wherein the encoder is adapted to encoding a picture by:

- obtaining a resizing method out of a plurality of resizing methods,
- resizing an input with a size S to a size $\bar{S}$ by applying the resizing method,
- processing the resized input with the size $\bar{S}$ by the NN, wherein the NN comprises one or more downsampling layers, and
- providing, after processing the input with the size $\bar{S}$ with the NN, an output of the NN, the output having a size P that is smaller than S in the at least one dimension.

Thereby, the advantages in applying the method for encoding a picture as referred to above are provided to encoders.

The present disclosure also refers to a decoder for decoding a bitstream representing a picture, wherein the decoder comprises a receiver for receiving a bitstream and one or more processors configured to implement a neural network, NN, the NN comprising, in a processing order of a bitstream through the NN, a plurality of layers comprising at least two upsampling layers that are adapted to apply upsampling to an input, and a transmitter for outputting a decoded picture, wherein the decoder is adapted to perform any of the methods of the above embodiments.

Moreover, a decoder for decoding a bitstream representing a picture is provided, wherein the decoder comprises one or more processors for implementing a neural network, NN, wherein the one or more processors are adapted to perform a method according to any of the above embodiments.

The present disclosure also pertains to a decoder for decoding a bitstream representing a picture, wherein the decoder comprises a receiver for receiving a bitstream and one or more processors configured to implement a neural network, NN, the NN comprising, in a processing order of a bitstream through the NN, a plurality of layers comprising at least two upsampling layers that are adapted to apply upsampling to an input, and a transmitter for outputting a decoded picture, wherein the decoder is adapted to decode a picture by:

- obtaining a resizing method out of a plurality of resizing methods,
- processing the input with the size T by the NN, wherein the NN comprises one or more upsampling layers, thereby obtaining an intermediate output having a size $\bar{T}$ that is larger than T in the at least one dimension,
- resizing the intermediate output from the size $\bar{T}$ to a size $\hat{T}$ by applying the obtained resizing method, thereby obtaining a decoded picture.

Thereby, the advantages of the above-explained methods for decoding a bitstream representing a picture can be implemented in decoders.

Moreover, a computer-readable storage medium is provided that comprises computer executable instructions that, when executed on a computing system, cause the computing system to execute a method according to any of the above embodiments.

DETAILED DESCRIPTION

Figure 1A:
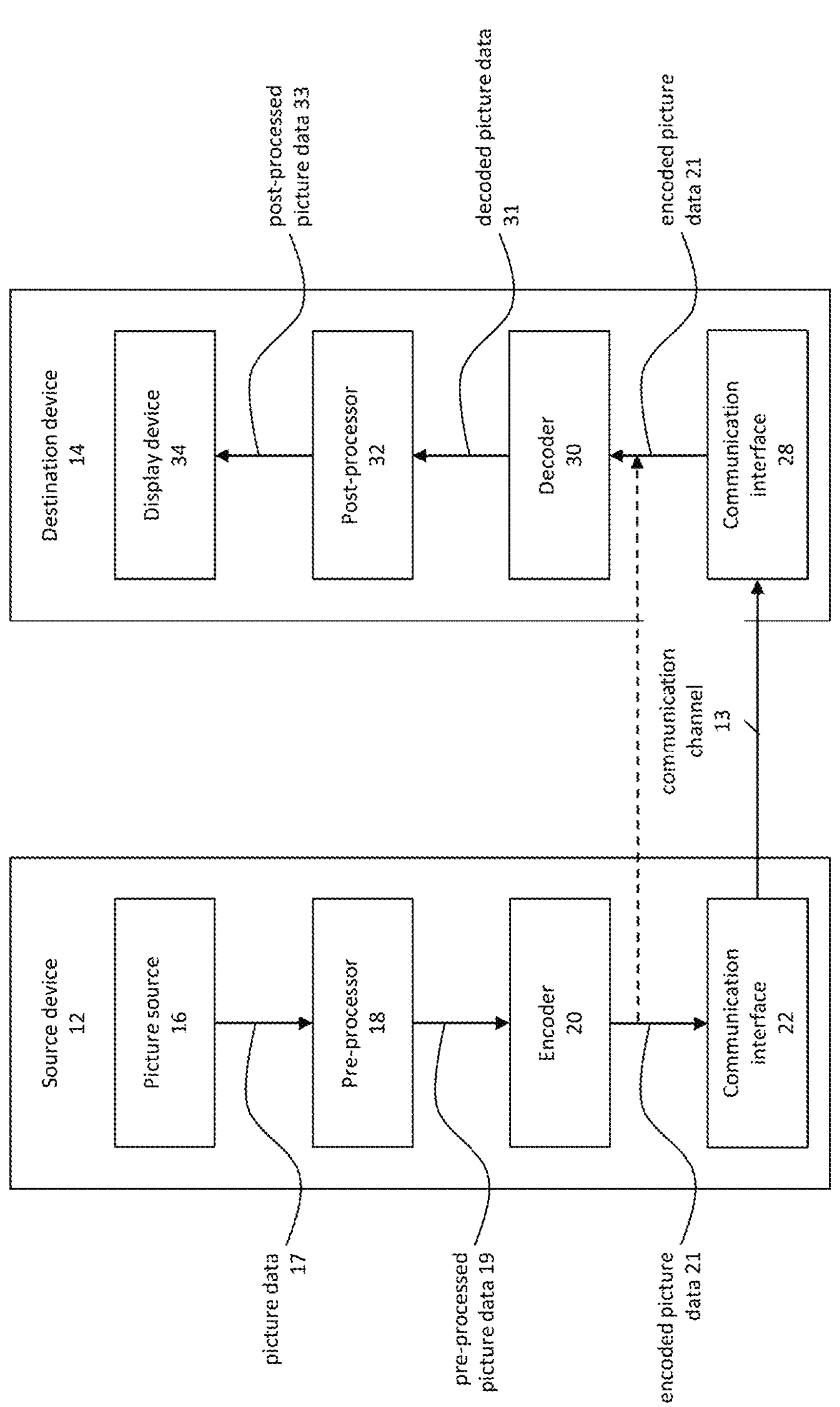
FIG. 1A is a block diagram showing an example of a video coding system configured to implement an embodiments of the present disclosure.

In the following, some embodiments are described with reference to the Figs. The FIGS. 1 to 3 refer to video coding systems and methods that may be used together with more specific embodiments of the present disclosure described in the further Figs. In some cases, the embodiments described in relation to FIGS. 1 to 3 may be used with encoding/decoding techniques described further below that make use of a neural network for encoding a bitstream and/or decoding a bitstream.

In the following description, reference is made to the accompanying Figs., which form part of the disclosure, and which show, by way of illustration, aspects of the present disclosure or aspects in which embodiments of the present disclosure may be used. It is understood that the embodiments may be used in other aspects and comprise structural or logical changes not depicted in the Figs. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the Figs. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the Figs. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term “picture” the term “frame” or “image” may be used as synonyms in the field of video coding. Video coding (or coding in general) comprises two parts video encoding and video decoding. Video encoding is performed at the source side, typically comprising processing (e.g. by compression) the original video pictures to reduce the amount of data that may be required for representing the video pictures (for more efficient storage and/or transmission). Video decoding is performed at the destination side and typically comprises the inverse processing compared to the encoder to reconstruct the video pictures. Embodiments referring to “coding” of video pictures (or pictures in general) shall be understood to relate to “encoding” or “decoding” of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of “lossy hybrid video codecs” (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks. Recently, some parts or the entire encoding and decoding chain has been implemented by using a neural network or, in general, any machine learning or deep learning framework.

In the following embodiments of a video coding system 10, a video encoder 20 and a video decoder 30 are described based on FIG. 1.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. Some embodiments of the present disclosure (e.g. relating to an initial rescaling or rescaling between two proceeding layers) may be implemented by the encoder 20. Some embodiments (e.g. relating to an initial rescaling) may be implemented by the picture pre-processor 18.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

Some embodiments of the disclosure may be implemented by the decoder 30 or by the post-processor 32.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
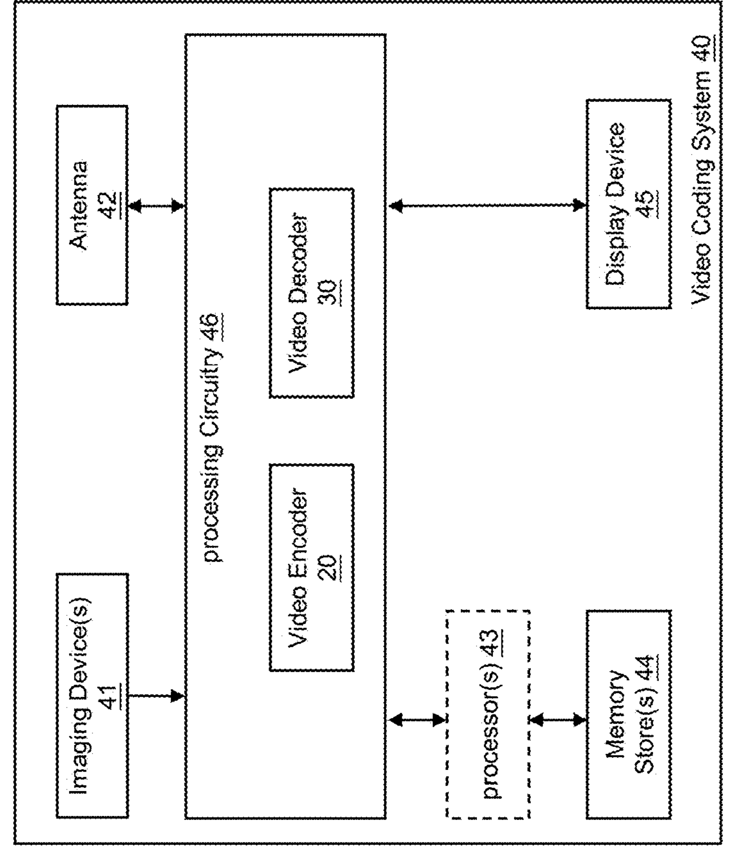
FIG. 1B is a block diagram showing another example of a video coding system configured to implement some embodiments of the present disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody various modules and/or any other encoder system or subsystem described herein. The decoder 30 may be implemented via processing circuitry 46 to embody various modules and/or any other decoder system or subsystem described herein. The processing circuitry may be configured to perform the various operations as discussed later. As shown in FIG. 3, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, some embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Figure 2:
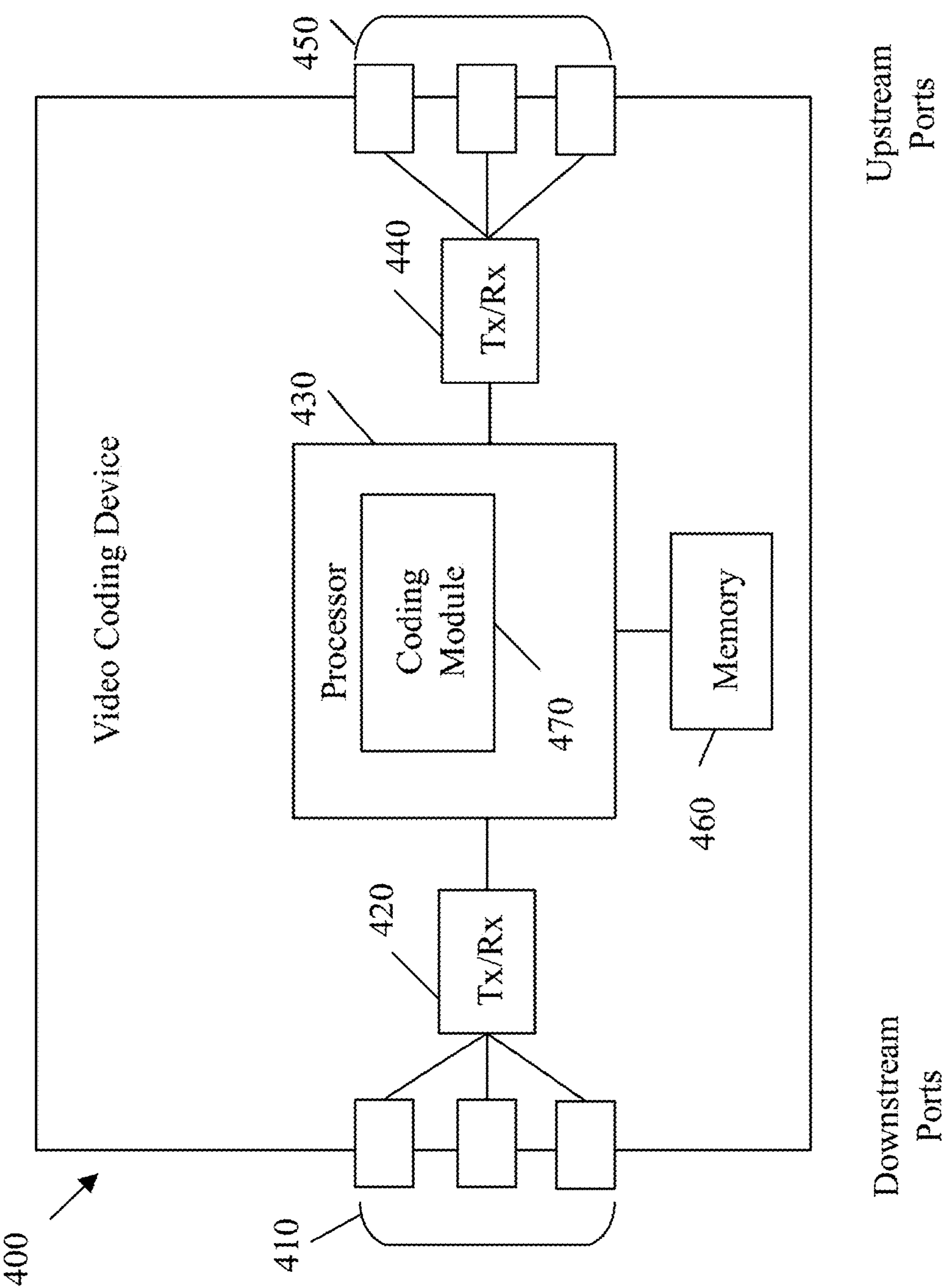
FIG. 2 is a block diagram illustrating an example of an encoding apparatus or a decoding apparatus, in accordance with an embodiment of the present disclosure.

FIG. 2 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 3:
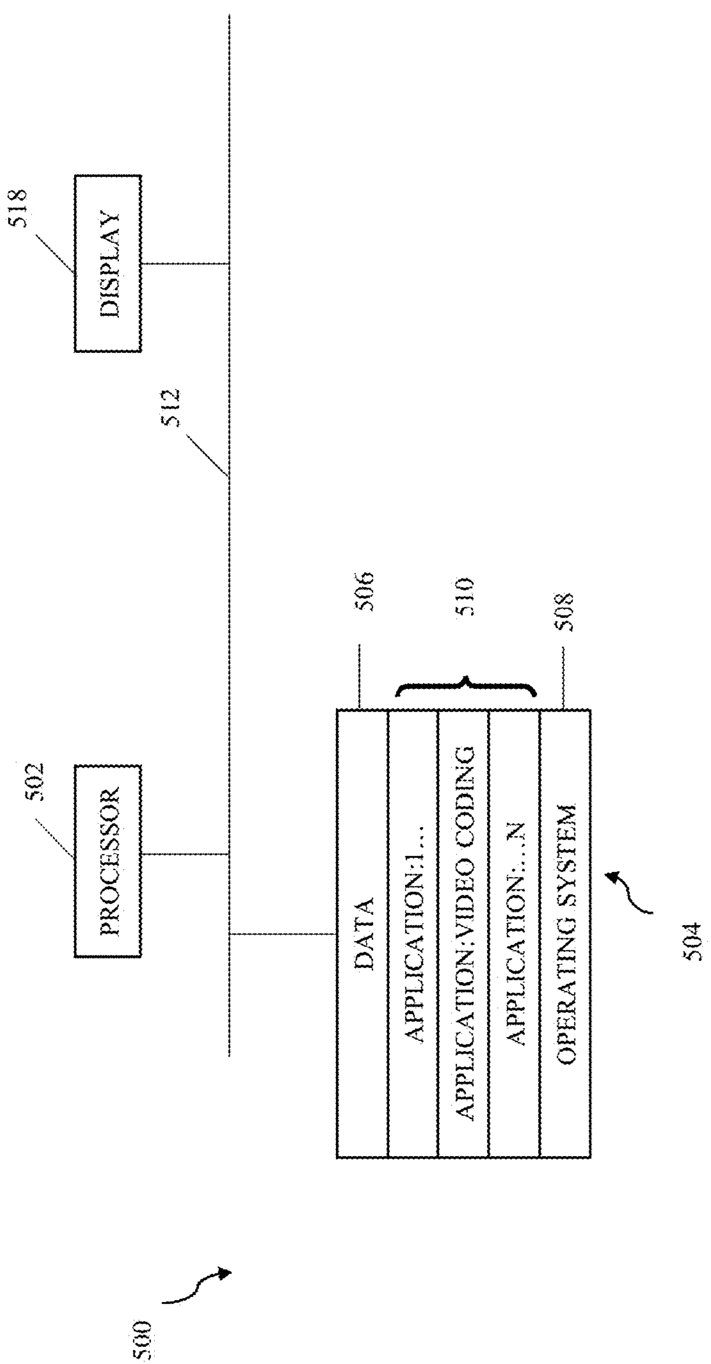
FIG. 3 is a block diagram illustrating another example of an encoding apparatus or a decoding apparatus, in accordance with an embodiment of the present disclosure.

FIG. 3 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In the following, more non-limiting, and exemplary embodiments of the present disclosure are described. Before that, some explanations will be provided aiding in the understanding of the disclosure:

Artificial neural networks (ANN) or connectionist systems are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. In ANN implementations, the "signal" at a connection is a real number, and the output of each neuron can be computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing tasks, leading to deviations from biology. ANNs have been used on a variety of tasks, including computer vision.

Figure 6:
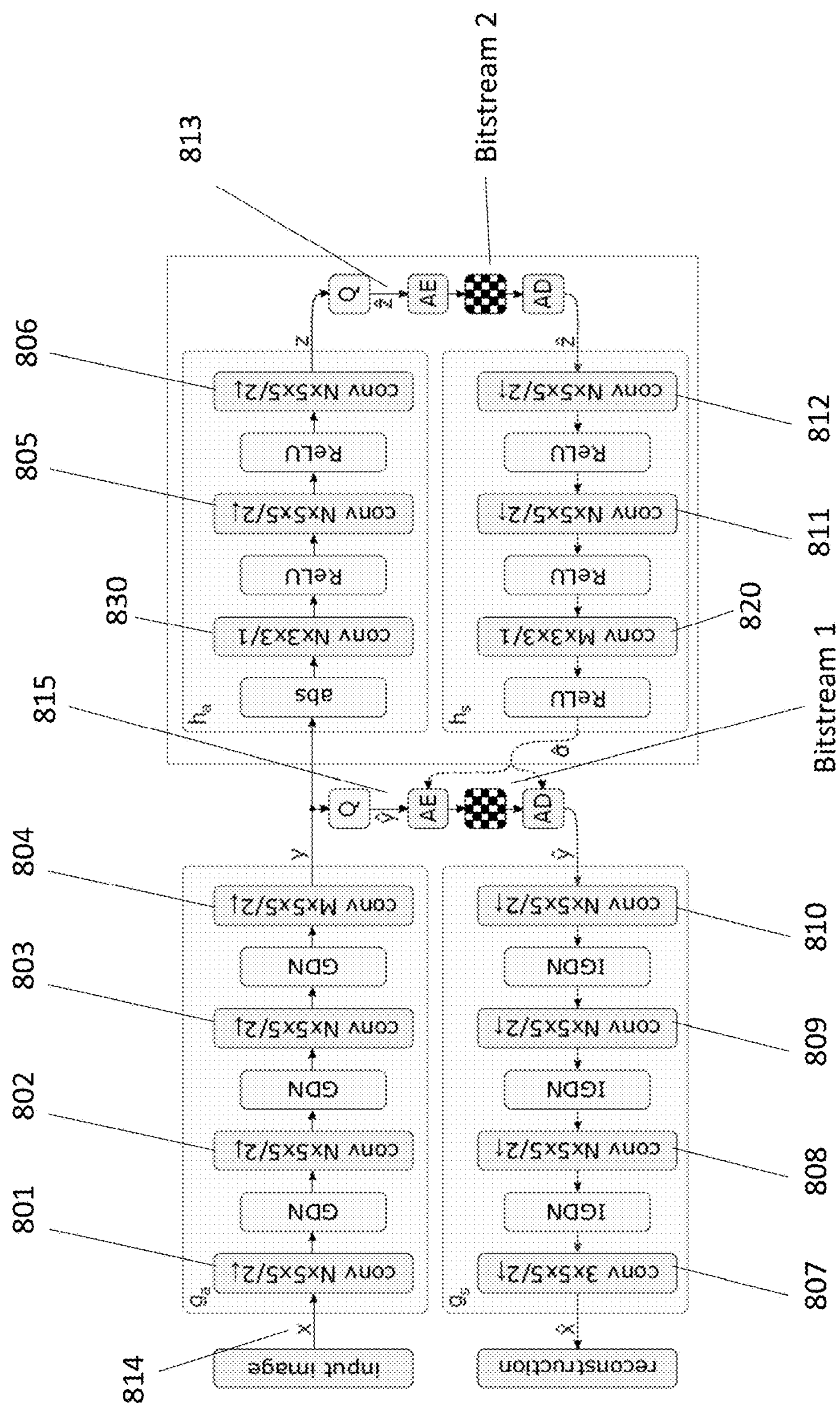
FIG. 6 shows an encoder and a decoder in line with a VAE framework, in accordance with an embodiment of the present disclosure.

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers. A convolutional neural network consists of an input and an output layer, as well as multiple hidden layers. Input layer is the layer to which the input is provided for processing. For example, the neural network of FIG. 6 is a CNN. The hidden layers of a CNN typically consist of a series of convolutional layers that convolve with a multiplication or other dot product. The result of a layer is one or more feature maps, sometimes also referred to as channels. There may be a subsampling involved in some or all of the layers. As a consequence, the feature maps may become smaller. The activation function in a CNN may be a RELU (Rectified Linear Unit) layer or a GDN layer as already exemplified above, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at an index point.

When programming a CNN for processing pictures or images, the input is a tensor with shape (number of images)×(image width)×(image height)×(image depth). Then, after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

An autoencoder is a type of artificial neural network used to learn efficient data codings in an unsupervised manner. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name.

Picture size: refers to the width or height or the width-height pair of a picture. Width and height of an image is usually measured in number of luma samples.

Downsampling: Downsampling is a process, where the sampling rate (sampling interval) of the discrete input signal is reduced. For example if the input signal is an image which has a size of height h and width w (or H and W as referred to below likewise), and the output of the downsampling is a height h2 and a width w2, at least one of the following holds true:

$$h2<h$$

$$w2<w$$

In one example implementation, downsampling can be implemented as keeping only each m-th sample, discarding the rest of the input signal (which, in the context of the present disclosure, basically is a picture).

Upsampling: Upsampling is a process, where the sampling rate (sampling interval) of the discrete input signal is increased. For example if the input image has a size of h and w (or H and W as referred to below likewise), and the output of the downsampling is h2 and w2, at least one of the following holds true:

$$h<h2$$

$$w<w2$$

Resampling: downsampling and upsampling processes are both examples of resampling. Resampling is a process where the sampling rate (sampling interval) of the input signal is changed.

Interpolation filtering: During the upsampling or downsampling processes, filtering can be applied to improve the accuracy of the resampled signal and to reduce the aliasing affect. An interpolation filter usually includes a weighted combination of sample values at sample positions around the resampling position. It can be implemented as:

$$f(x_r, y_r) = \sum s(x, y)C(k)$$

Where f( ) is the resampled signal, $(x_r, y_r)$ are the resampling coordinates, C(k) are interpolation filter coefficients and s(x,y) are or is the input signal. The summation operation is performed for (x,y) that are in the vicinity of $(x_r, y_r)$.

Cropping: Trimming off the outside edges of a digital image. Cropping can be used to make an image smaller (in number of samples) and/or to change the aspect ratio (length to width) of the image.

Padding: padding refers to increasing the size of the input image (or image) by generating new samples at the borders of the image. This can be done, for example, by either using sample values that are predefined or by using sample values of the positions in the input image.

Resizing: Resizing is a general term where the size of the input image is changed. It might be done using one of the methods of padding or cropping. It can be done by a resizing operation using interpolation. In the following, resizing may also be referred to as rescaling.

Integer division: Integer division is division in which the fractional part (remainder) is discarded.

Convolution: convolution is given by the following general equation. Below f( ) can be defined as the input signal and go can be defined as the filter.

$$(f * g)[n] = \sum_{m=-\infty}^{\infty} f[m]g[n-m]$$

Downsampling layer: A processing layer, such as a layer of a neural network that results in a reduction of at least one of the dimensions of the input. In general, the input might have 3 or more dimensions, where the dimensions might comprise number of channels, width and height. However, the present disclosure is not limited to such signals. Rather, signals which may have one or two dimensions (such as audio signal or an audio signal with a plurality of channels) may be processed. The downsampling layer usually refers to reduction of the width and/or height dimensions. It can be implemented with convolution, averaging, max-pooling etc. operations. Also other ways of downsampling are possible and the present disclosure is not limited in this regard.

Upsampling layer: A processing layer, such as a layer of a neural network that results in an increase of one of the dimensions of the input. In general, the input might have 3 or more dimensions, where the dimensions might comprise number of channels, width and height. The upsampling layer usually refers to increase in the width and/or height dimensions. It can be implemented with de-convolution, replication etc. operations. Also, other ways of upsampling are possible and the present disclosure is not limited in this regard.

Some deep learning based image and video compression algorithms follow the Variational Auto-Encoder framework (VAE), e.g. G-VAE: A Continuously Variable Rate Deep Image Compression Framework, (Ze Cui, Jing Wang, Bo Bai, Tiansheng Guo, Yihui Feng), available at: https://arxiv.org/abs/2003.02012.

The VAE framework could be counted as a nonlinear transforming coding model.

Figure 4:
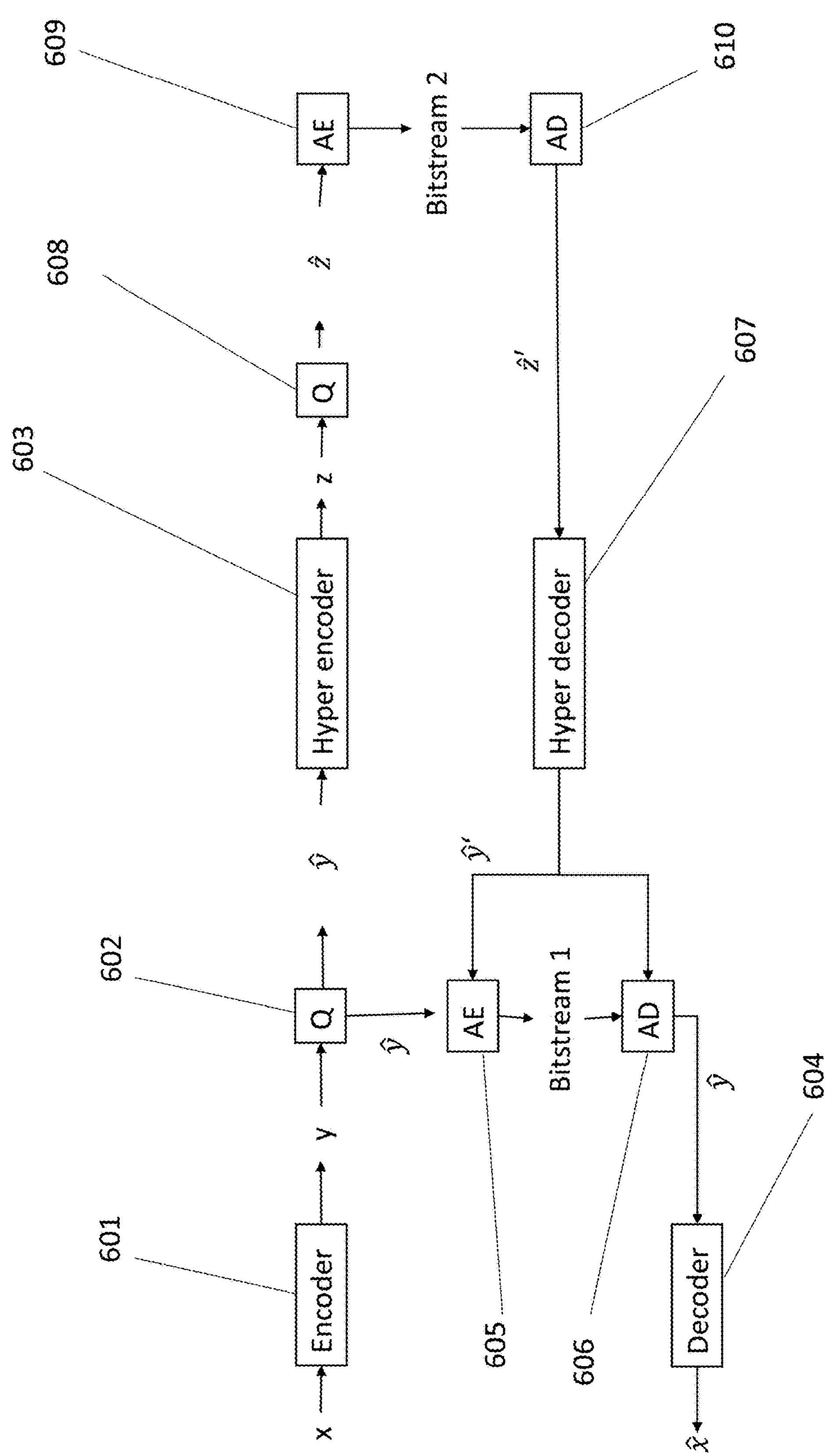
FIG. 4 shows an encoder and a decoder together according to one embodiment, in accordance with an embodiment of the present disclosure.

The transforming process can be mainly divided into four parts: FIG. 4 exemplifies the VAE framework. In the FIG. 4, the encoder 601 maps an input image x into a latent representation (denoted by y) via the function y=f(x). This latent representation may also be referred to as a part of or a point within a "latent space" in the following. The function f( ) is a transformation function that converts the input signal x into a more compressible representation y. The quantizer 602 transforms the latent representation y into the quantized latent representation $\hat{y}$ with (discrete) values by $\hat{y}=Q(y)$, with Q representing the quantizer function. The entropy model, or the hyper encoder/decoder (also known as hyperprior) 603 estimates the distribution of the quantized latent representation $\hat{y}$ to get the minimum rate achievable with a lossless entropy source coding.

The latent space can be understood as a representation of compressed data in which similar data points are closer together in the latent space. Latent space is useful for learning data features and for finding simpler representations of data for analysis.

The quantized latent representation T, $\hat{y}$ and the side information $\hat{z}$ of the hyperprior 3 are included into a bitstream 2 (are binarized) using arithmetic coding (AE).

Furthermore, a decoder 604 is provided that transforms the quantized latent representation to the reconstructed image $\hat{x}$, $\hat{x}=g(\hat{y})$. The signal $\hat{x}$ is the estimation of the input image x. It is desirable that x is as close to $\hat{x}$ as possible, in other words the reconstruction quality is as high as possible. However, the higher the similarity between $\hat{x}$ and x, the higher the amount of side information to be transmitted. The side information includes bitstream1 and bitstream2 shown in FIG. 4, which are generated by the encoder and transmitted to the decoder. Normally, the higher the amount of side information, the higher the reconstruction quality. However, a high amount of side information means that the compression ratio is low. Therefore, one purpose of the system described in FIG. 4 is to balance the reconstruction quality and the amount of side information conveyed in the bitstream.

In FIG. 4 the component AE 605 is the Arithmetic Encoding module, which converts samples of the quantized latent representation $\hat{y}$ and the side information $\hat{z}$ into a binary representation bitstream 1. The samples of $\hat{y}$ and $\hat{z}$ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 606 is the process of reverting the binarization process, where binary digits are converted back to sample values. The arithmetic decoding is provided by the arithmetic decoding module 606.

It is noted that the present disclosure is not limited to this particular framework. Moreover the present disclosure is not restricted to image or video compression, and can be applied to object detection, image generation, and recognition systems as well.

In FIG. 4 there are two sub networks concatenated to each other. A subnetwork in this context is a logical division between the parts of the total network. For example in the FIG. 4 the modules 601, 602, 604, 605 and 606 are called the "Encoder/Decoder" subnetwork. The "Encoder/Decoder" subnetwork is responsible for encoding (generating) and decoding (parsing) of the first bitstream "bitstream1". The second network in FIG. 4 comprises modules 603, 608, 609, 610 and 607 and is called "hyper encoder/decoder" subnetwork. The second subnetwork is responsible for generating the second bitstream "bitstream2". The purposes of the two subnetworks are different. The first subnetwork is responsible for:

- the transformation 601 of the input image x into its latent representation y (which is easier to compress that x),
- quantizing 602 the latent representation y into a quantized latent representation $\hat{y}$,
- compressing the quantized latent representation $\hat{y}$ using the AE by the arithmetic encoding module 605 to obtain bitstream "bitstream 1",".
- Parsing the bitstream 1 via AD using the arithmetic decoding module 606, and
- reconstructing 604 the reconstructed image ($\hat{x}$) using the parsed data.

The purpose of the second subnetwork is to obtain statistical properties (e.g. mean value, variance and correlations between samples of bitstream 1) of the samples of "bitstream1", such that the compressing of bitstream 1 by first subnetwork is more efficient. The second subnetwork generates a second bitstream "bitstream2", which comprises the said information (e.g. mean value, variance and correlations between samples of bitstream1).

The second network includes an encoding part which comprises transforming 603 of the quantized latent representation $\hat{y}$ into side information z, quantizing the side information z into quantized side information $\hat{z}$, and encoding (e.g. binarizing) 609 the quantized side information $\hat{z}$ into bitstream2. In this example, the binarization is performed by an arithmetic encoding (AE). A decoding part of the second network includes arithmetic decoding (AD) 610, which transforms the input bitstream2 into decoded quantized side information $\hat{z}'$. The $\hat{z}'$ might be identical to $\hat{z}$, since the arithmetic encoding end decoding operations are lossless compression methods. The decoded quantized side information $\hat{z}'$ is then transformed 607 into decoded side information $\hat{y}'$. $\hat{y}'$ represents the statistical properties of $\hat{y}$ (e.g. mean value of samples of $\hat{y}$, or the variance of sample values or like). The decoded latent representation $\hat{y}'$ is then provided to the above-mentioned Arithmetic Encoder 605 and Arithmetic Decoder 606 to control the probability model of $\hat{y}$.

The FIG. 4 describes an example of VAE (variational auto encoder), details of which might be different in different implementations. For example in some embodiments, additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 605 and AD (arithmetic decoder) 606 components.

The FIG. 4 depicts the encoder and decoder in a single figure. As is clear to those skilled in the art, the encoder and the decoder may be, and very often are, embedded in mutually different devices.

Figure 7:
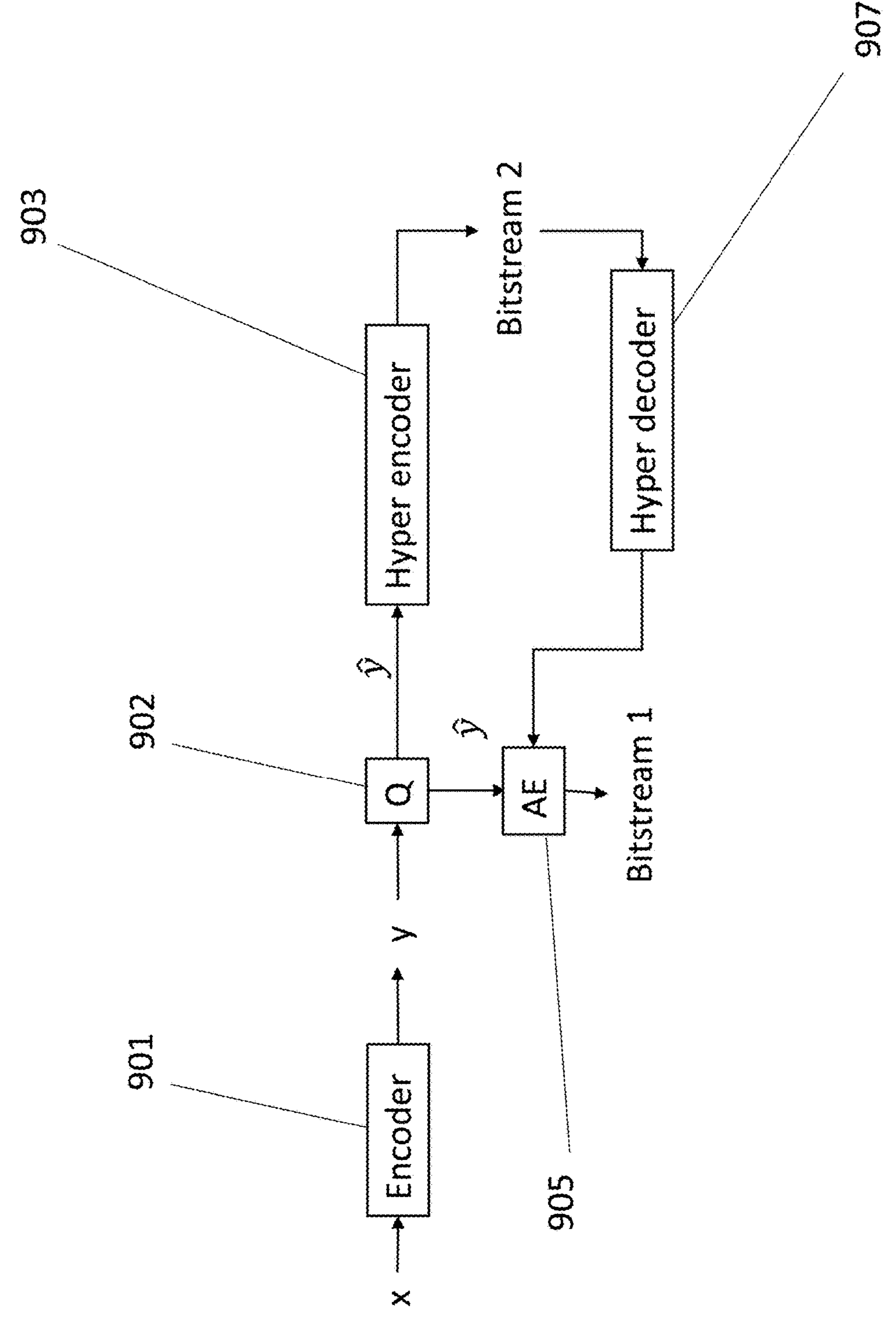
FIG. 7 shows components of an encoder according to FIG. 4 in accordance with one embodiment of the present disclosure.
Figure 8:
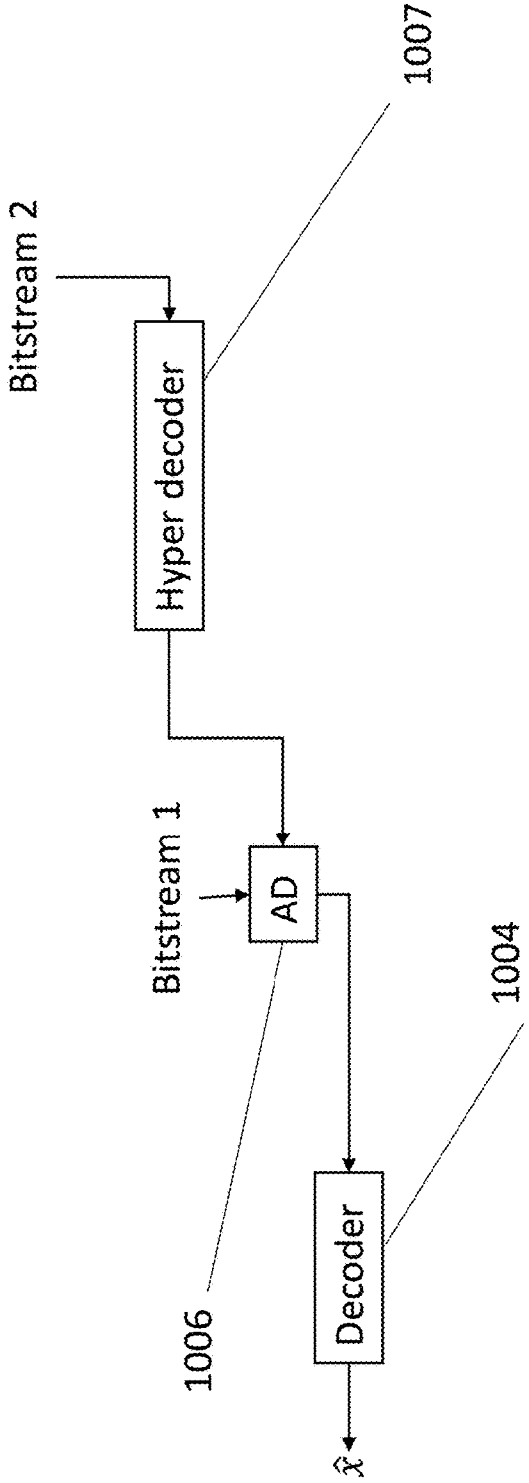
FIG. 8 shows components of a decoder according to FIG. 4 in accordance with one embodiment of the present disclosure.

FIG. 7 depicts the encoder and FIG. 8 depicts the decoder components of the VAE framework in isolation. What is explained in the following with respect to FIGS. 7 and 8 may also be the case for the neural networks and encoder as well as decoder provided further below with respect to FIG. 19, FIG. 22 and FIGS. 25 and 26.

As input, the encoder receives, according to some embodiments, a picture. The input picture may include one or more channels, such as color channels or other kind of channels, e.g. depth channel or motion information channel, or the like. The output of the encoder (as shown in FIG. 7) is a bitstream1 and a bitstream2. The bitstream1 is the output of the first sub-network of the encoder and the bitstream2 is the output of the second subnetwork of the encoder.

Similarly in FIG. 8, the two bitstreams, bitstream1 and bitstream2, are received as input and $\hat{z}$, which is the reconstructed (decoded) image, is generated at the output.

As indicated above, the VAE can be split into different logical units that perform different actions. This is exemplified in FIGS. 7 and 8 so that FIG. 7 depicts components that participate in the encoding of a signal, like a video and provided encoded information. This encoded information is then received by the decoder components depicted in FIG. 8 for encoding, for example. It is noted that the components of the encoder and decoder denoted with numerals 9_xx_ and 10_xx_ may correspond in their function to the components referred to above in FIG. 4 and denoted with numerals 6_xx_.

In some embodiments, as is seen in FIG. 7, the encoder comprises the encoder 901 that transforms an input x into a signal y which is then provided to the quantizer 902. The quantizer 902 provides information to the arithmetic encoding module 905 and the hyper encoder 903. The hyper encoder 903 provides the bitstream2 already discussed above to the hyper decoder 907 that in turn signals information to the arithmetic encoding module 605.

The encoding can make use of a convolution, as will be explained in further detail below with respect to FIG. 19. Decoding can make use of a de-convolution as will be explained further below also with respect to FIG. 19 and FIG. 22.

The output of the arithmetic encoding module is the bitstream1. The bitstream1 and bitstream2 are the output of the encoding of the signal, which are then provided (transmitted) to the decoding process.

Although the unit 901 is called "encoder", it is also possible to call the complete subnetwork described in FIG. 7 as "encoder". The process of encoding in general means the unit (module) that converts an input to an encoded (e.g. compressed) output. It can be seen from FIG. 7, that the unit 901 can be actually considered as a core of the whole subnetwork, since it performs the conversion of the input x into y, which is the compressed version of the x. The compression in the encoder 901 may be achieved, e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 901 by a lossy compression. The AE 905 in combination with the hyper encoder 903 and hyper decoder 907 used to configure the AE 905 may perform the binarization which may further compress the quantized signal by a lossless compression. Therefore, it is also possible to call the whole subnetwork in FIG. 7 an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

Figure 5:
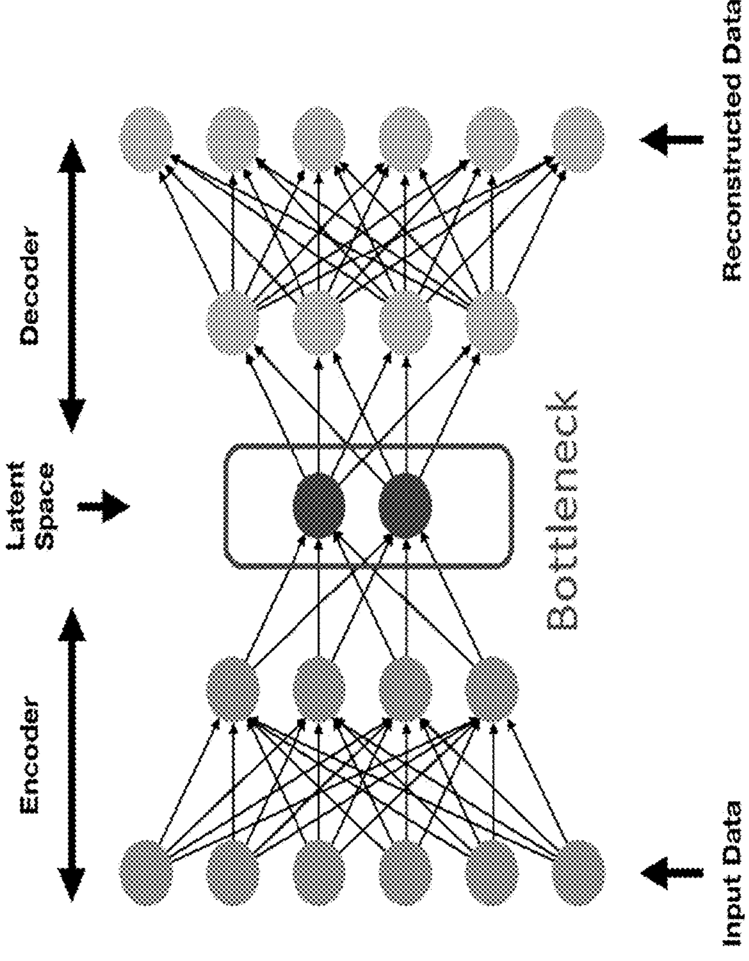
FIG. 5 shows a schematic depiction of encoding and decoding of an input, in accordance with an embodiment of the present disclosure.

The general principle of compression is exemplified in FIG. 5. The latent space, which is the output of the encoder and input of the decoder, represents the compressed data. It is noted that the size of the latent space may be much smaller than the input signal size. Here, the term size may refer to resolution, e.g. to a number of samples of the feature map(s) output by the encoder. The resolution may be given as a product of number of samples per each dimension (e.g. width×heighth×number of channels of an input image or of a feature map).

The reduction in the size of the input signal is exemplified in the FIG. 5, which represents a deep-learning based encoder and decoder. In the FIG. 5, the input image x corresponds to the input Data, which is the input of the encoder. The transformed signal y corresponds to the Latent Space, which has a smaller dimensionality or size in at least one dimension than the input signal. Each column of circles represent a layer in the processing chain of the encoder or decoder. The number of circles in each layer indicate the size or the dimensionality of the signal at that layer.

One can see from the FIG. 5 that the encoding operation corresponds to a reduction in the size of the input signal, whereas the decoding operation corresponds to a reconstruction of the original size of the image.

One of the methods for reduction of the signal size is downsampling. Downsampling is a process where the sampling rate of the input signal is reduced. For example if the input image has a size of h and w, and the output of the downsampling is h2 and w2, at least one of the following holds true:

$$h2<h$$

$$w2<w$$

The reduction in the signal size usually happens step by step along the chain of processing layers, not all at once. For example if the input image x has dimensions (or size of dimensions) of h and w (indicating the height and the width), and the latent space y has dimensions h/16 and w/16, the reduction of size might happen at 4 layers during the encoding, wherein each layer reduces the size of the signal by a factor of 2 in each dimension.

Some deep learning based video/image compression methods employ multiple downsampling layers. As an example the VAE framework, FIG. 6, utilizes 6 downsampling layers that are marked with 801 to 806. The layers that include downsampling is indicated with the downward arrow in the layer description. The layer description "Conv Nx5×5/2↓" means that the layer is a convolution layer, with N channels and the convolution kernel is 5×5 in size. As stated, the 2↓ means that a downsampling with a factor of 2 is performed in this layer. Downsampling by a factor of 2 results in one of the dimensions of the input signal being reduced by half at the output. In FIG. 6, the 2↓ indicates that both width and height of the input image is reduced by a factor of 2. Since there are 6 downsampling layers, if the width and height of the input image 814 (also denoted with x) is given by w and h, the output signal ẑ 813 is has width and height equal to w/64 and h/64 respectively. Modules denoted by AE and AD are arithmetic encoder and arithmetic decoder, which are explained above already with respect to FIGS. 4, 7 and 8. The arithmetic encoder and decoder are implementations of entropy coding. AE and AD (as part of the component 813 and 815) can be replaced by other means of entropy coding. In information theory, an entropy encoding is a lossless data compression scheme that is used to convert the values of a symbol into a binary representation which is a revertible process. Also the "Q" in the figure corresponds to the quantization operation that was also referred to above in relation to FIG. 4 and is further explained above in the section "Quantization". Also, the quantization operation and a corresponding quantization unit as part of the component 813 or 815 is not necessarily present and/or can be replaced with another unit.

In FIG. 6, there is also shown the decoder comprising upsampling layers 807 to 812. A further layer 820 is provided between the upsampling layers 811 and 810 in the processing order of an input that is implemented as convolutional layer but does not provide an upsampling to the input received. A corresponding convolutional layer 830 is also shown for the decoder. Such layers can be provided in NNs for performing operations on the input that do not alter the size of the input but change characteristics. However, it is not necessary that such a layer is provided.

When seen in the processing order of bitstream2 through the decoder, the upsampling layers are run through in reverse order, i.e. from upsampling layer 812 to upsampling layer 807. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 807 to 812 are implemented as convolutional layers (conv). In some examples, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

In the first subnetwork, some convolutional layers (801 to 803) are followed by generalized divisive normalization (GDN) at the encoder side and by the inverse GDN (IGDN) at the decoder side. In the second subnetwork, the activation function applied is ReLu. It is noted that the present disclosure is not limited to such implementation and in general, other activation functions may be used instead of GDN or ReLu.

The image and video compression systems in general cannot process arbitrary input image sizes. The reason is that some of the processing units (such as transform unit, or motion compensation unit) in a compression system operate on a smallest unit, and if the input image size is not integer multiple of the smallest processing unit, it is not possible to process the image.

As an example, HEVC specifies four transform units (TUs) sizes of 4×4, 8×8, 16×16, and 32×32 to code the prediction residual. Since the smallest transform unit size is 4×4, it is not possible to process an input image that has a size of 3×3 using an HEVC encoder and decoder. Similarly if the image or picture size is not a multiple of 4 in one dimension, it is also not possible to process the image or picture, respectively, since it is not possible to partition the image or picture into sizes that are processable by the valid transform units (4×4, 8×8, 16×16, and 32×32). Therefore, the input image or picture may be a multiple of a minimum coding unit size, which is 8×8, according to the HEVC standard. Otherwise the input image or picture is not compressible by HEVC. Similar requirements have been posed by other codecs, too. In order to make use of existing hardware or software, or in order to maintain some interoperability or even portions of the existing codecs, it may be desirable to maintain such limitation. However, the present disclosure is not limited to any particular transform block size.

Some DNN (deep neural network) or NN (neural network) based image and video compression systems utilize multiple downsampling layers. In FIG. 6, for example, four downsampling layers are comprised in the first subnetwork (layers 801 to 804) and two additional downsampling layers are comprised in the second subnetwork (layers 805 to 806). Therefore, if the size of the input image is given by w and h respectively (indicating the width and the height), the output of the first subnetwork is w/16 and h/16, and the output of the second network is given by w/64 and h/64.

The term "deep" in deep neural networks usually refers to the number of processing layers that are applied sequentially to the input. When the number of the layers is high, the neural network is called a deep neural network, though there is no clear description or guidance on which networks should be called a deep network. Therefore for the purposes of this application there is no major difference between a DNN and an NN. DNN may refer to a NN with more than one layer.

During downsampling, for example in the case of convolutions being applied to the input, fractional (final) sizes for the encoded picture can be obtained in some cases. Such fractional sizes cannot be reasonably processed by a subsequent layer of the neural network or by a decoder.

Stated differently, some downsampling operations (like convolutions) may expect (e.g. by design) that the size of the input to a layer of the neural network fulfills conditions so that the operations performed within a layer of the neural network performing the downsampling or following the downsampling are still well defined mathematical operations. For example, for a downsampling layer having a downsampling ratio $r>1$, $r\in\mathbb{N}$ (i.e. the downsampling ratio is an integer value larger than 1) that reduces the size of the input in at least one dimension by the ratio r, a reasonable output is obtained if the input has a size in this dimension that is an integer multiple of the downsampling ratio r. The downsampling by r means that the number of input samples in one dimension (e.g. width) or more dimensions (e.g. width and height) is divided by the downsampling ratio (for example two if r=2) to obtain number of output samples.

To provide a numeric example, a downsampling ratio of a layer may be 4. A first input has a size 512 in the dimension to which the downsampling is applied. 512 is an integer multiple of 4 because 128×4=512. Processing of the input can thus be performed by the downsampling layer resulting in a reasonable output. A second input may have a size of 513 in the dimension to which the downsampling is applied. 513 is not an integer multiple of 4 and this input can thus not be processed reasonably by the downsampling layer or a subsequent downsampling layer if they are, e.g. by design, expecting certain (e.g. 512) input size. In view of this, in order to ensure that an input can be processed by each layer of the neural network in a reasonable way (in compliance with a predefined layer input size) even if the size of the input is not always the same, a rescaling (also referred to as resizing) may be applied before processing the input by the neural network. This rescaling comprises changing or adapting the actual size of the input to the neural network (e.g. to the input layer of the neural network), so that it is fulfilling the above condition with respect to all of the downsampling layers of the neural network. This rescaling is done by increasing or decreasing a size of the input in the dimension to which the downsampling is applied so that the size $S=K\Pi_i r_i$, where $r_i$ are the downsampling ratios of the downsampling layers and K is an integer greater than zero. In other words, the input size of the input picture (signal) in the downsampling direction is adapted to be an integer multiple of a product of all downsampling ratios applied to the input picture (signal) in the network processing chain in the downsampling direction (dimension).

Thereby, the size of the input to the neural network has a size that ensures that each layer can process its respective input, e.g. in compliance with a layer's predefined input size configuration.

By providing such rescaling, however, there are limits to the reduction in the size of a picture that is to be encoded and, correspondingly, the size of the encoded picture that can be provided to a decoder for, for example, reconstructing the encoded information also has a lower limit. Furthermore, with the approaches provided so far, a significant amount of entropy may be added to the bitstream (when increasing its size by the rescaling) or a significant amount of information loss can occur (if reducing the size of the bitstream by the rescaling). Both can have negative influence on the quality of the bitstream after the decoding.

It is, therefore, difficult to obtain high quality of encoded/decoded bitstreams and the data they represent while, at the same time, providing encoded bitstreams with reduced size.

Since the size of the output of a layer in a network cannot be fractional (there needs to be an integer number of rows and columns of samples), there is a restriction in the input image size. In FIG. 6, for ensuring reliable processing, the input image size is an integer multiple of 64 in both horizontal and vertical directions. Otherwise, the output of the second network will not be integer.

In order to solve this problem, it would be possible to use the method of padding the input image with zeros to make it a multiple of 64 samples in each direction. According to this solution the input image size can be extended in width and height by the following amount:

$$w_{diff} = \mathrm{Int}\left(\frac{w+63}{64}\right)\cdot 64 - w$$

$$h_{diff} = \mathrm{Int}\left(\frac{h+63}{64}\right)\cdot 64 - h$$

where "Int" is an integer conversion. The integer conversion may calculate the quotient of a first value a and a second value b and may then provide an output that ignores all fractional digits, thus only being an integer number. The newly generated sample values can be set equal to 0.

The other possibility of solving the issue described above is to crop the input image, i.e. discard rows and columns of samples from ends of the input image, to make the input image size a multiple of 64 samples. The minimum amount of rows and samples that needs to be cropped out can be calculated as follows:

$$w_{diff} = w - \mathrm{Int}\left(\frac{w}{64}\right)\cdot 64$$

$$h_{diff} = h - \mathrm{Int}\left(\frac{h}{64}\right)\cdot 64$$

where $w_{diff}$ and $w_{diff}$ correspond to an amount of sample rows and columns respectively, that need to be discarded from sides of the image.

Using the above, the new size of the input image in horizontal ($h_{new}$) and vertical ($w_{new}$) dimensions is as follows:

In the case of padding:

$$h_{new} = h + h_{diff}$$

$$w_{new} = w + w_{diff}$$

In the case of cropping:

$$h_{new} = h - h_{diff}$$

$$w_{new} = w + w_{diff}$$

Figure 10:
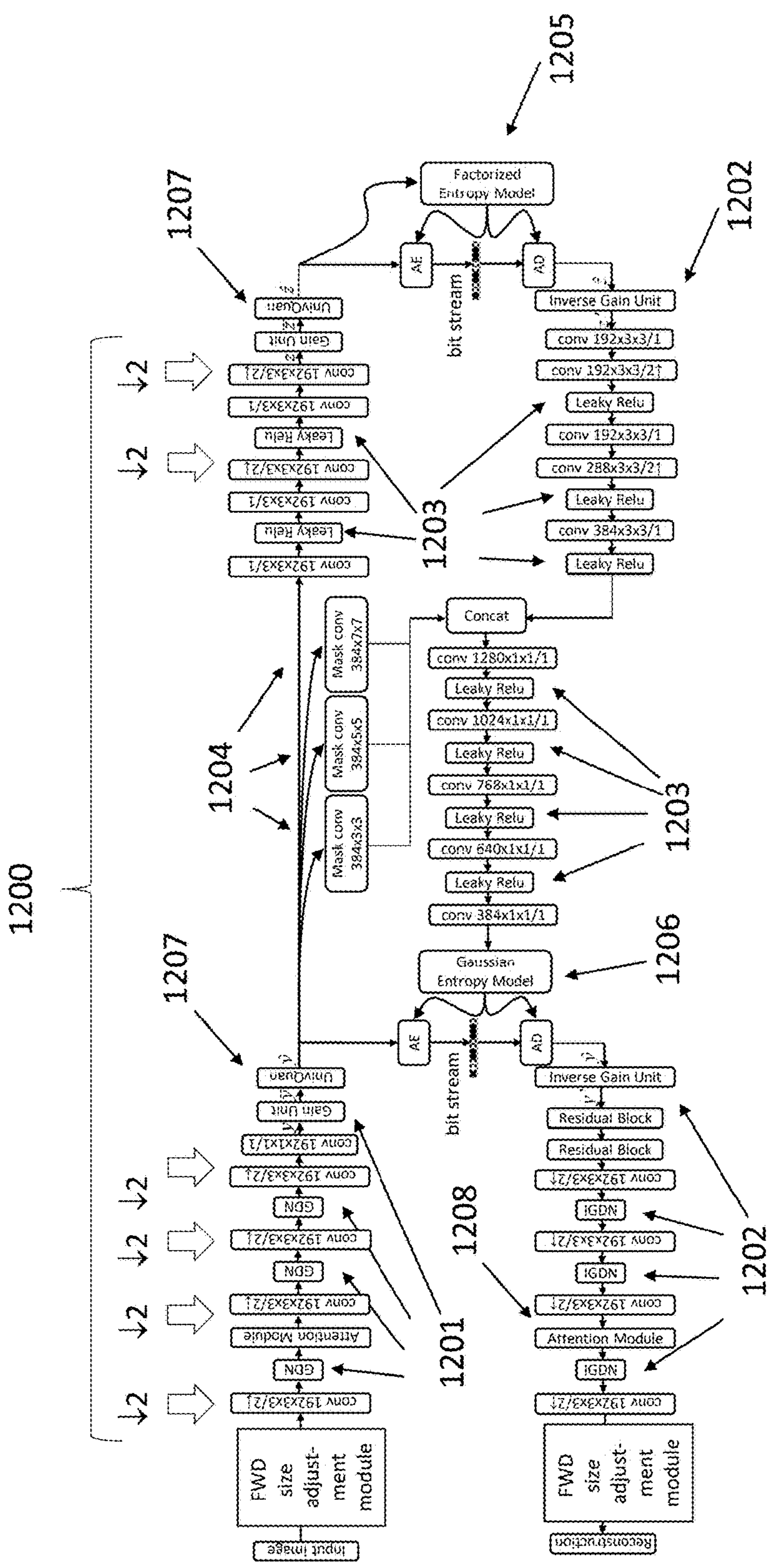
FIG. 10 shows an encoder and a decoder, in accordance with an embodiment of the present disclosure.
Figure 11:
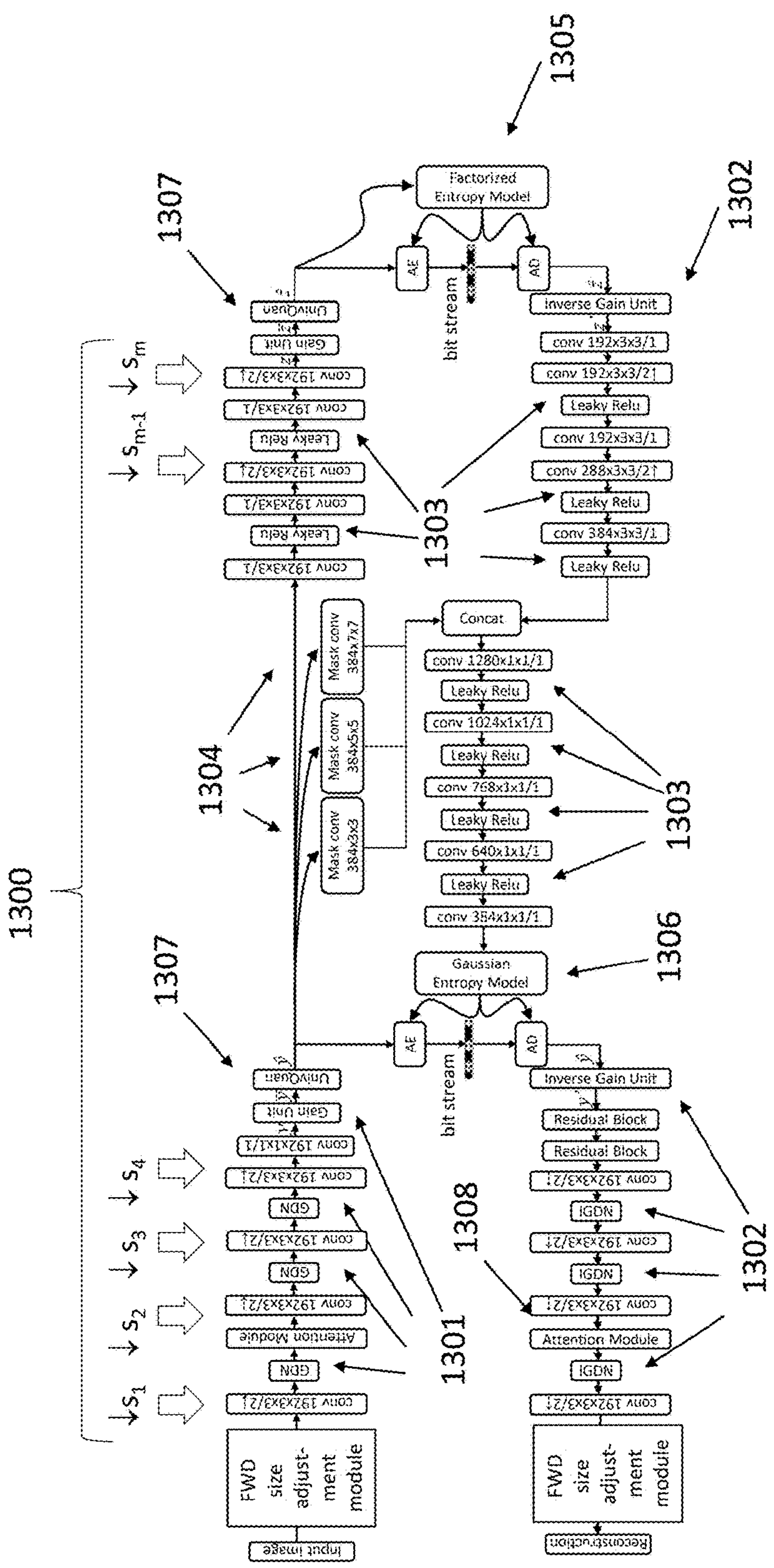
FIG. 11 shows a further encoder and a further decoder, in accordance with an embodiment of the present disclosure.

This is also shown in the FIGS. 10 and 11. In FIG. 10, it is shown that the encoder and the decoder (together denoted with 1200) may comprise a number of downsampling and upsampling layers. Each layer applies a downsampling by a factor of 2 or an upsampling by a factor of 2. Furthermore, the encoder and the decoder can comprise further components, like a generalized divisive normalization (GDN) 1201 at the encoder side and by the inverse GDN (IGDN) 1202 at the decoder side. Furthermore, both the encoder and the decoder may comprise one or more ReLus, such as leaky ReLus 1203. There can also be provided a factorized entropy model 1205 at the encoder and a Gaussian entropy model 1206 at the decoder. Moreover, a plurality of convolution masks 1204 may be provided. Moreover, the encoder includes, in the embodiments of FIGS. 10 and 11, a universal quantizer (UnivQuan) 1207 and the decoder comprises an attention module 1208. For ease of reference, functionally corresponding components have corresponding numerals in FIG. 11.

The total number of downsampling operations and strides defines conditions on the input channel size, i.e. the size of the input to the neural network.

Here, if input channel size is an integer multiple of 64=2×2×2×2×2×2, then the channel size remains integer after all proceeding downsampling operations. By applying corresponding upsampling operations in the decoder during the upsampling, and by applying the same rescaling at the end of the processing of the input through the upsampling layers (for example with the FWD size adjustment module shown in this figure), the output size is again identical to the input size at the encoder.

Thereby, a reliable reconstruction of the original input is obtained.

In FIG. 11, a more general example of what is explained in FIG. 10 is shown. This example also shows an encoder and a decoder, together denoted with 1300. The m downsampling layers (and corresponding upsampling layers) have downsampling ratios $s_i$ and corresponding upsampling ratios. Here, if the input channel size is an integer multiple of S=

$$\prod_{i=1}^{m} s_i,$$

the channel size remains integer after all m proceeding (also referred to as consecutive or subsequent or cascaded) downsampling operations. A corresponding rescaling of the input before processing it by the neural network in the encoder (for example with the FWD size adjustment module shown in FIG. 11) ensures that the above equation is fulfilled. In other words, the input channel size in the downsampling direction is a product of all downsampling ratios applied to the input by the respective m downsampling layers of the (sub-)network.

This mode of changing the size of the input as explained above may still have some drawbacks:

In FIG. 6, the bitstreams indicated by "bitstream 1" and "bitstream 2" have sizes equal to:

$$A\left(\frac{h_{new}}{16}\right)\left(\frac{w_{new}}{16}\right) \text{ and } B\left(\frac{h_{new}}{64}\right)\left(\frac{w_{new}}{64}\right),$$

respectively. A and B are scalar parameters that describe the compression ratio. The higher the compression ratio, the smaller the numbers A and B. The total size of the bitstream is therefore given as $$A\left(\frac{h_{new}}{16}\right)\left(\frac{w_{new}}{16}\right)+B\left(\frac{h_{new}}{64}\right)\left(\frac{w_{new}}{64}\right).$$

Since the goal of the compression is to reduce the size of the bitstream while keeping the quality of the reconstructed image high, it is apparent that the $h_{new}$ and $w_{new}$ should be as small as possible to reduce the bitrate.

Therefore, the problem of "padding with zero" is the increase in the bitrate due to an increase in the input size. In other words, the size of the input image is increased by adding redundant data to the input image, which means that more side information may be transmitted from the encoder to the decoder for reconstruction of the input signal. As a result, the size of the bitstream is increased.

As an example, using the encoder/decoder pair in FIG. 6, if the input image has a size 416×240, which is the image size format commonly known as WQVGA (Wide Quarter Video Graphics Array), the input image may be padded to be equal to size 448×256, which equals a 15% increase in bitrate due to inclusion of redundant data.

The problem with the second approach (cropping of the input image) is the loss of information. Since the goal of compression and decompression is the transmission of the input signal while keeping the fidelity high, it is against the purpose to discard part of the signal. Therefore, cropping is not advantageous unless it is known that there are some parts of the input signal that are unwanted, which is usually not the case.

According to one example, the size adjustment of the input image is performed in front of every downsampling or upsampling layer of the DNN based picture or video compression system. More specifically, if a downsampling layer has a downsampling ratio 2 (input size is halved at the output of the layer), input resizing is applied to the input of the layer if it has an odd number of sample rows or columns and padding is not applied if the number of sample rows or columns are even (multiple of 2).

Additionally, a resizing operation can be applied at the end, e.g. at the output of an upsampling layer, if a corresponding downsampling layer has applied resizing at the (its) input. The corresponding layer of a downsampling layer can be found by counting the number of upsampling layers starting from the reconstructed image and counting the number of downsampling layers starting from the input image. This is exemplified by FIG. 18, wherein upsampling layer 1 and downsampling layer 1 are corresponding layers, and upsampling layer 2 and downsampling layer 2 are corresponding layers and so on.

The resizing operation applied at the input of a downsampling layer and the resizing operation applied at the output of an upsampling layer are complementary, such that the size of the data at the output of both is kept the same.

Figure 9:
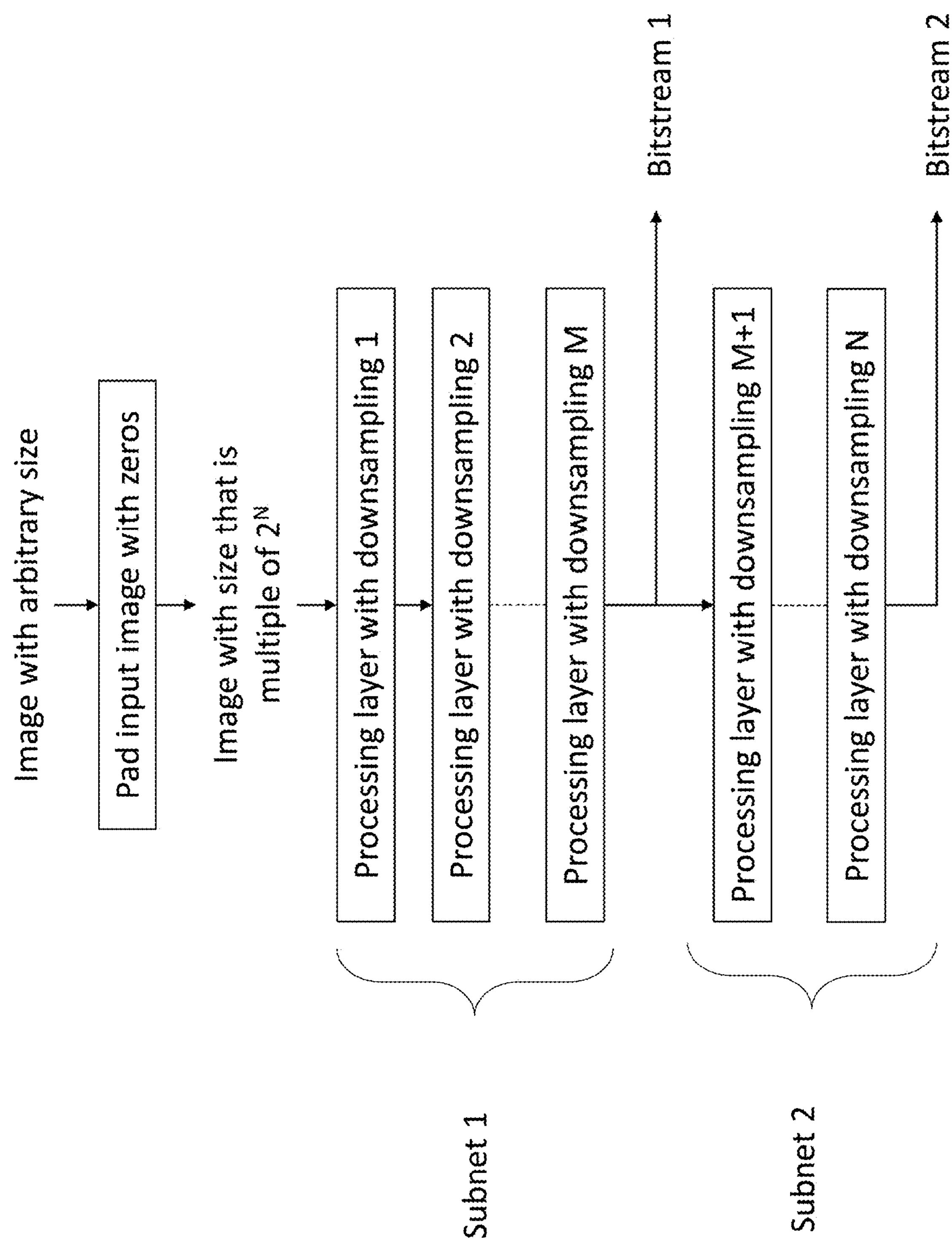
FIG. 9 shows rescaling and processing of an input, in accordance with an embodiment of the present disclosure.

As a result, the increase in the size of the bitstreams is minimized. An exemplary embodiment can be explained with reference to FIG. 12, in contrast with FIG. 9, which describes another approach. In FIG. 9, the resizing of the input is done before the input is provided to the DNN, and is done so that the resized input can be processed through the whole DNN. The example shown in FIG. 9 may be realized (implemented) with the encoder/decoder as described in FIG. 6.

Figure 12:
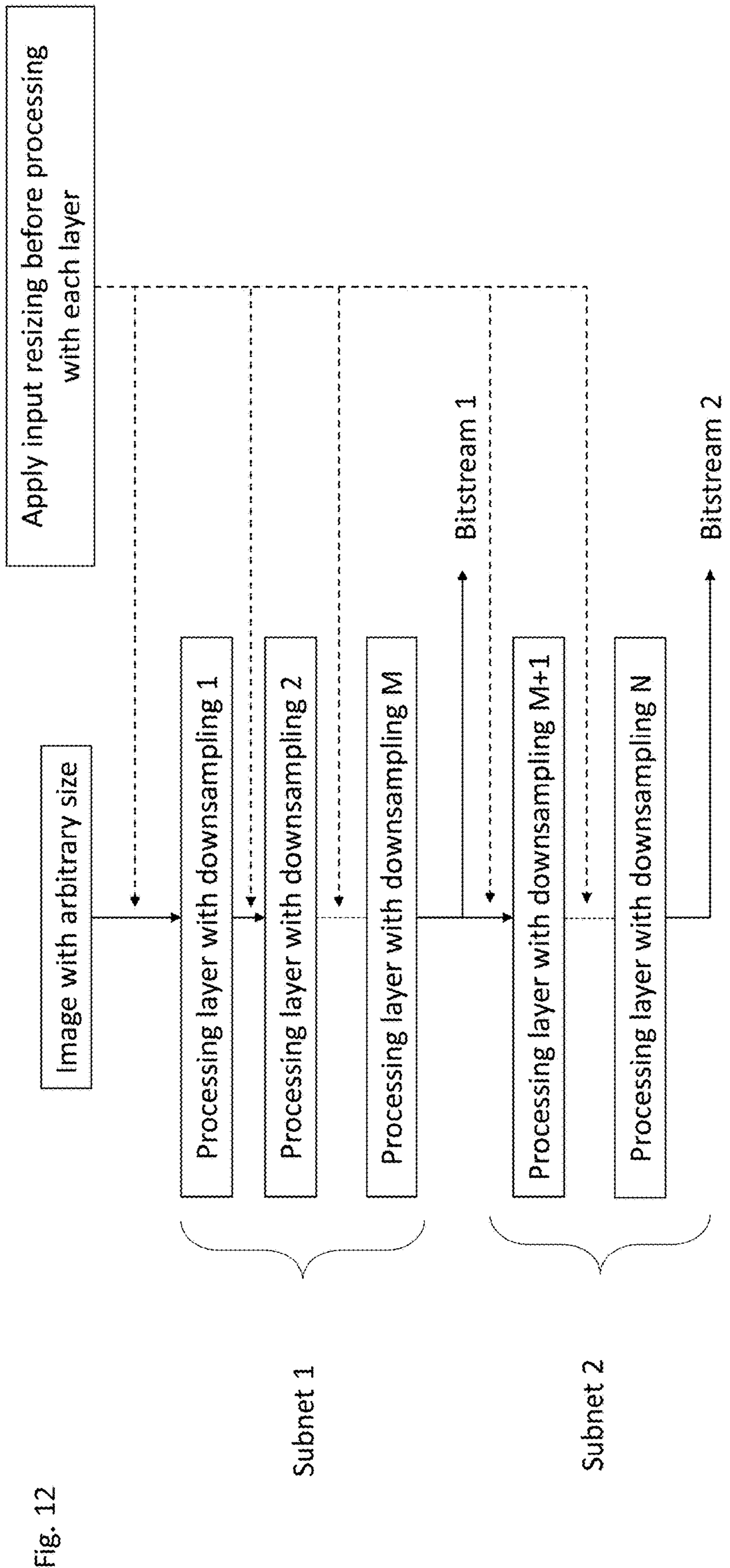
FIG. 12 shows a rescaling and processing of an input in accordance with one embodiment of the present disclosure.

In FIG. 12, an input image having an arbitrary size is provided to the neural network. The neural network in this example comprises N downsampling layers, each layer i (1<=i<=N) having a downsampling ratio $r_i$. The "<=" denotes smaller than or equal to. The downsampling ratios $r_i$ are not necessarily the same for different values of i, but, in some embodiments, may be all equal and can, for example, all be $r_i=r=2$. In FIG. 12, the downsampling layers 1 to M are summarized as subnet 1 of downsampling layers. The subnet 1 provides as output the bitstream1. This summarizing of the downsampling layers is, in this context, however, only for descriptive purposes. The second subnet 2, comprising the layers M+1 to N provides as output the bitstream2.

In this example, before an input to a downsampling layer, for example the downsampling layer M, is provided to the downsampling layer, but after it has been processed by the previous downsampling layer (in this case, the layer M−1), the input is resized by applying a resizing operation so that the input to the downsampling layer M has a size $S=nr_M$, $n\in\mathbb{N}$. $r_M$ represents the downsampling ratio of the downsampling layer M and may be a preset value and may thus be already available at the decoder. In this example, this resizing operation is performed before each downsampling layer so that the above condition is fulfilled for the specific downsampling layer and its respective downsampling ratio. In other words, the size S is adapted to or set as to an integer multiple of the downsampling ratio of the following (following the downsampling in the sequence of processing) layer.

In FIG. 9, the input image is padded (which is a form of image resizing) to account for all downsampling layers that are going to process the data one after the other. In FIG. 9, the downsampling ratio is exemplarily selected to be equal to 2 for demonstration purpose. In this case, since there are N layers that perform downsampling with a ratio of 2, the input image size is adjusted by padding (with zeros) to be an integer multiple of $2^N$. It is noted that herein, an integer "multiple" may still be equal to 1, i.e. the multiple has the meaning of multiplication (e.g. by one or more) rather than the meaning of a plurality.

An example is demonstrated in FIG. 12. In the FIG. 12, input resizing is applied in front of each downsampling layer. The input is resized to be an integer multiple of the downsampling ratio of each layer. For example, if the downsampling ratio of a layer is 3:1 (input size:output size), a ratio of 3, the input of the layer is resized to become a multiple of 3.

Some examples can be applied to FIG. 6 also. In FIG. 6, there are 6 layers with downsampling, namely the layers 801, 802, 803, 804, 805 and 806. All of the downsampling layers have a factor of 2. According to one example, the input resizing is applied before all 6 layers. In FIG. 6 the resizing is applied also after each layer out of the upsampling layers (807, 808, 809, 810, 811 and 812) in a corresponding manner (which is explained in the above paragraph). This means that a resizing applied before a downsampling layer at a specific order or position in the neural network of the encoder is applied at a corresponding position in the decoder.

In some embodiments, two options for rescaling the input may exist and one of them may be chosen depending, for example, on the circumstance or a condition as will be explained further below. These embodiments are described with reference to FIGS. 13 to 15.

The first option 1501 may comprise padding the input, for example with zeros or redundant information from the input itself in order to increase the size of the input to a size that matches an integer multiple of the downsampling ratio. At the decoder side, in order to rescale, cropping may be used in this option in order to reduce the size of the input to a size that matches, for example, a target input size of the proceeding upsampling layer.

This option can be implemented computationally efficient, but it is only possible to increase the size at the encoder side.

The second option 1502 may utilize interpolation at the encoder and interpolation at the decoder for rescaling/resizing the input. This means, interpolation may be used to increase the size of an input to an intended size, like an integer multiple of the downsampling ratio of all downsampling layers, or a target input size of all upsampling layers, or interpolation may be used to decrease the size of the input to an intended size, like an integer multiple of a combined downsampling ratio of all downsampling layers of the NN, or a target input size of all upsampling layers of the NN. Thereby, it is possible to apply resizing at the encoder by either increasing or decreasing the size of the input. Further, in this option 1502, different interpolation filters may be used, thereby providing spectral characteristics control.

The different options 1501 and 1502 can be signaled, for example in the bitstream as side information. The differentiation between the first option (option 1) 1501 and the second option (option 2) 1502 can be signaled with an indication, such as a syntax element methodIdx, which may take one of two values. For example a first value (e.g. 0) is for indicating padding/cropping, and a second value (e.g. 1) is for indicating interpolation being used for the resizing. For example, a decoder may receive a bitstream encoding a picture and comprising, potentially, side information including an element methodIdx. Upon parsing this bitstream, the side information can be obtained and the value of methodIdx derived. Based on the value of methodIdx, the decoder can then proceed with a corresponding resizing or rescaling method, using padding/cropping if methodIdx has a first value or using interpolation of methodIdx has a second value.

Figure 13:
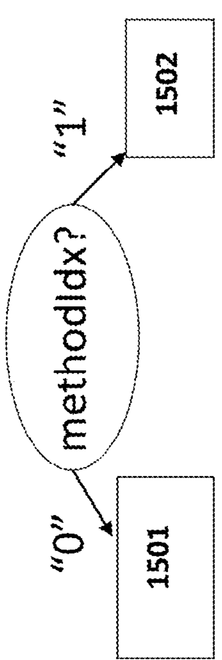
FIG. 13 shows an embodiment of signaling rescaling options according to one embodiment of the present disclosure.

This is shown in FIG. 13. Depending on the value of methodIdx being 0 or 1, either clipping (comprising either padding or cropping) or interpolation is chosen.

It is noted that, even though the embodiment of FIG. 13 refers to a selection or decision, based on methodIdx, between clipping (including one of padding/cropping) and interpolation as the methods used for realizing the resizing, the present disclosure is not limited in this regard. The method explained in relation to FIG. 13 can also be realized where the first option 1501 is interpolation to increase the size during the resizing operation and the second option 1502 is interpolation to decrease the size during the resizing operation. Any two or even more (depending on the binary size of methodIdx) different resizing methods as explained above and below can be chosen amongst and can be signaled with methodIdx. In general, the methodIdx does not need to be a separate syntax element. It may be indicated or coded jointly with another one or more parameters.

Figure 14:
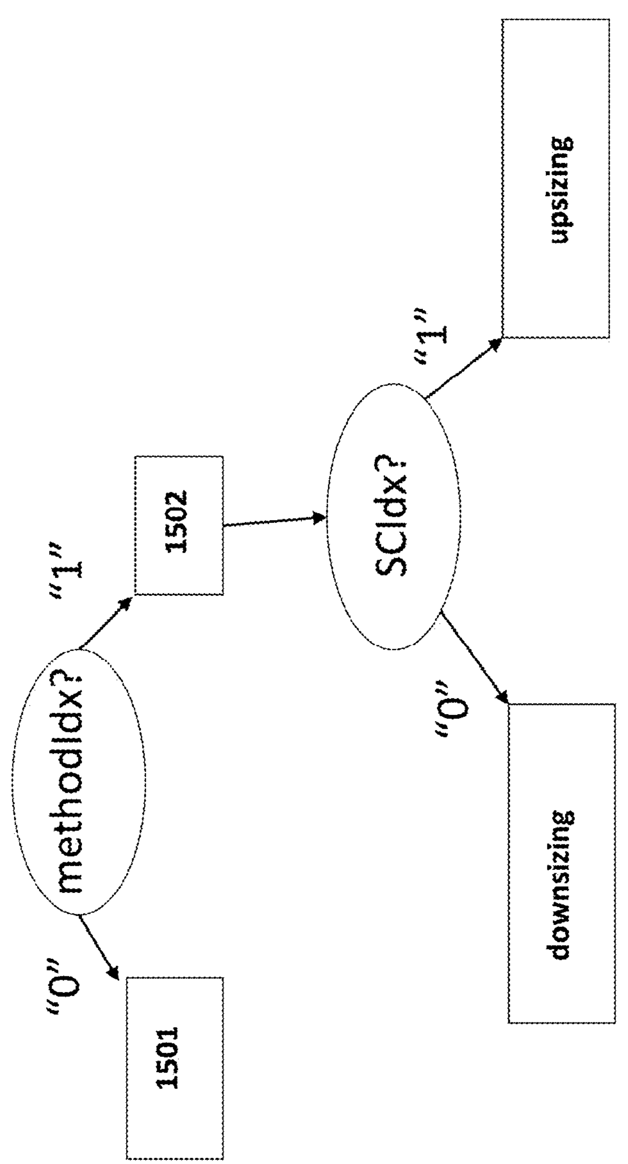
FIG. 14 shows another realization of the embodiment according to FIG. 13, in accordance with an embodiment of the present disclosure.

A further indication or flag may be provided as shown in FIG. 14. In addition to methodIdx, a Size Change flag (1 bit), SCIdx, may be signaled conditionally only for the case of the second option 1502. In the embodiment of FIG. 14, the second option 1502 comprises the use of interpolation for realizing the resizing. In FIG. 14, the second option 1502 is chosen in the case where methodIdx=1. The Size Change Flag, SCIdx, may have a third or fourth value, which may be values of either 0 (e.g. for the third value) or 1 (e.g. for the fourth value). In this embodiment, “0” may indicate downsizing and “1” may indicate upsizing. If SCIdx is thus 0, the interpolation for realizing the resizing will be done in a way so that the size of the input is decreased. If SCIdx is 1, the interpolation for realizing the resizing may be done so as to increase the size of the input. The conditional coding of the SCIdx may provide for a more concise and efficient syntax. However, the present disclosure is not limited by such conditional syntax and SCIdx may be indicated independently of the methodIdx or indicated (coded)jointly with the methodIdx (e.g. within a common syntax element that may be capable of taking only a subset of values out of values indicating all combinations of SCIdx and methodIdx).

Like for the indication methodIdx, also SCIdx may be obtained by a decoder by parsing a bitstream that potentially also decodes the picture to be reconstructed. Upon obtaining the value for SCIdx, downsizing or upsizing may be chosen.

Figure 15:
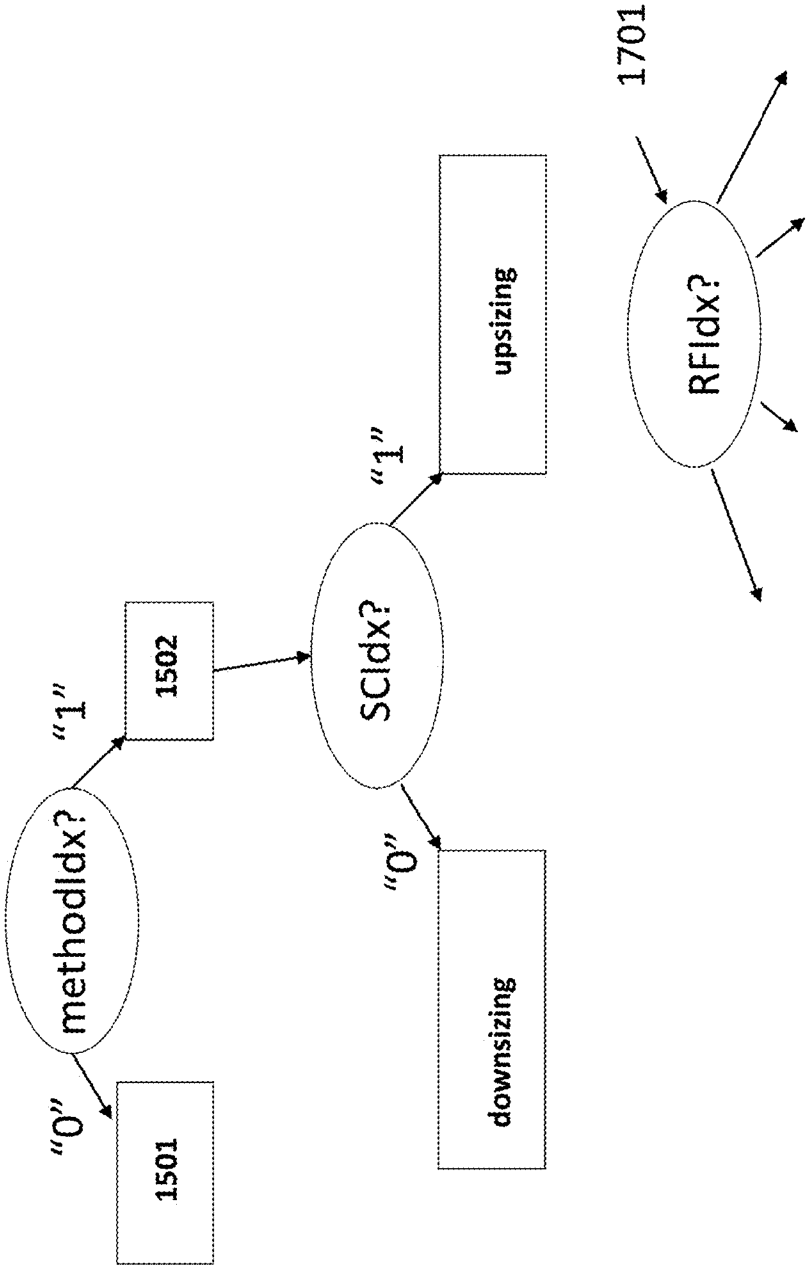
FIG. 15 shows another realization of the embodiment according to FIG. 14, in accordance with an embodiment of the present disclosure.

In addition or alternatively to the above described indications, as shown in FIG. 15, an additional (side) indication for Resizing Filter Index, RFIdx, may be signaled (indicated within the bitstream).

In some embodiments, the RFIdx may be indicated conditionally for the second option 1502, which may comprise that RFIdx is signaled if methodIdx=1 and not signaled if methodIdx=0. The RFIdx may have a size of more than one bit and may signal, for example, depending on its value, which interpolation filter is used in the interpolation for realizing the resizing. Alternatively or additionally, RFIdx may specify the filter coefficients from the plurality of interpolation filters. This may be, for instance, Bilinear, Bicubic, Lanczos3, Lanczos5, Lanczos8 among others.

As indicated above, at least one of methodIdx, SCIdx and RFIdx or all of them or at least two of them may be provided in a bitstream which may be the bitstream that also encodes the picture to be reconstructed or that is an additional bitstream. A decoder may then parse the respective bitstream and obtain the value of methodIdx and/or SCIdx and/or RFIdx. Depending on the values, actions as indicated above may be taken.

The filter used for the interpolation for realizing the resizing can, for example be determined by the scaling ratio.

As indicated in the lower right of FIG. 15 with item 1701, the values of RFIdx may be explicitly signaled. Alternatively or additionally, RFIdx may be obtained from a lookup-table so that RFIdx=LUT(SCIdx).

In another example there might be 2 lookup tables, one for the case of upsizing and one for the case of downsizing. In this case LUT1(SCIdx) might indicate the resizing filter when downsizing is selected, and LUT2(SCIdx) might indicate the resizing filter for the upsizing case.

In general, the present disclosure is not limited to any particular way of signaling for RFIdx. It may be individual and independent from other elements or jointly signaled.

The above referred to indications methodIdx, SCIdx, RFIdx have been provided as a nested structure where the presence of SCIdx and RFIdx may be dependent on the value of methodIdx. However, each of methodIdx, SCIdx and RFIdx may be provided independently, even in case one or more of the other indications is not provided.

Furthermore, in line with some embodiments, instead of or in addition to these indications, a further indication may be provided where this indication is or comprises an index that indicates an entry in a look-up table. This look-up table, LUT, may comprise a plurality of entries, each entry specifying a method of resizing. There may be entries in the LUT specifying that padding or cropping or interpolation is to be used. Additionally or alternatively, the LUT may comprise entries where each entry specifies the kind of padding (reflection padding, repetition padding or padding with zeros) is to be used. Additionally or alternatively, may comprise, instead or in addition to an entry specifying that interpolation is to be used, entries that specify that interpolation is to be used for increasing the size by the resizing or to decrease the size by the resizing, and/or that specify the filter to be used.

Exemplarily, the LUT may comprise 4 entries for padding/cropping, where one entry specifies cropping, one entry specifies padding with zeros, one entry specifies repetition padding and one entry specifies reflection padding. Additionally, the table may comprise entries for interpolation to be used to increase the size by the resizing. These entries may specify different interpolation filters each, where the interpolation filters may comprise Bilinear, Bicubic, Lanczos3, Lanczos5, Lanczos8 and a N-tab filter. This means there may be 6 entries that specify different methods of increasing the size by interpolation (one for each filter). Further, 6 entries may be provided for reducing the size by interpolation, where each entry specifies a corresponding filter to be used in the interpolation. Thus, the index may be provided to take 16 different values corresponding to the 16 different entries in the LUT (4 for padding methods and cropping and 6 entries each for interpolation to increase the size with a filter and for interpolation to decrease the size with a filter). The LUT may be available to the decoder or the encoder so that, depending on the value of the indication, the encoder or decoder can determine the method of resizing to be applied.

Figure 16:
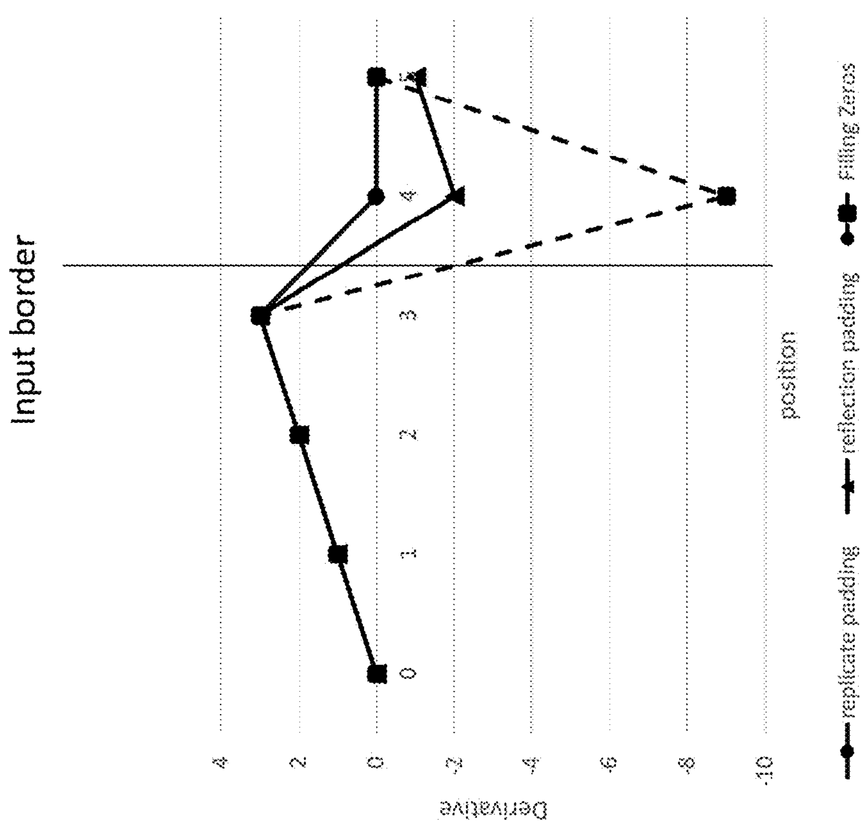
FIG. 16 shows a comparison of different possibilities of padding operations, in accordance with an embodiment of the present disclosure.
Figure 16:
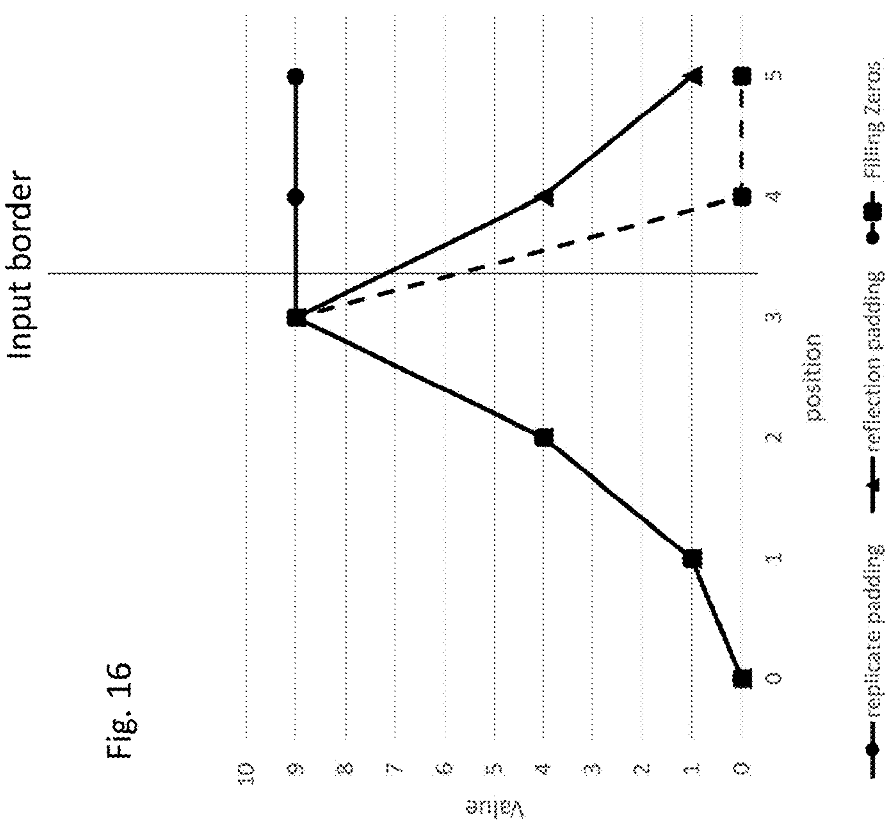
Figure 17:
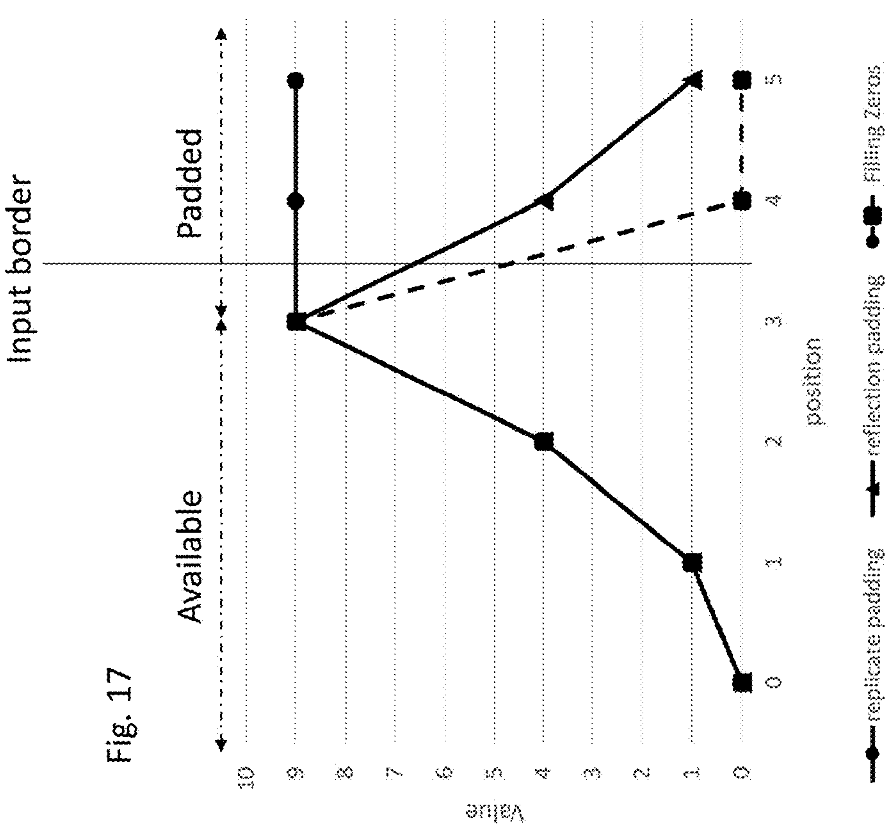
FIG. 17 shows a further comparison of different possibilities of padding operations, in accordance with an embodiment of the present disclosure.
Figure 17:
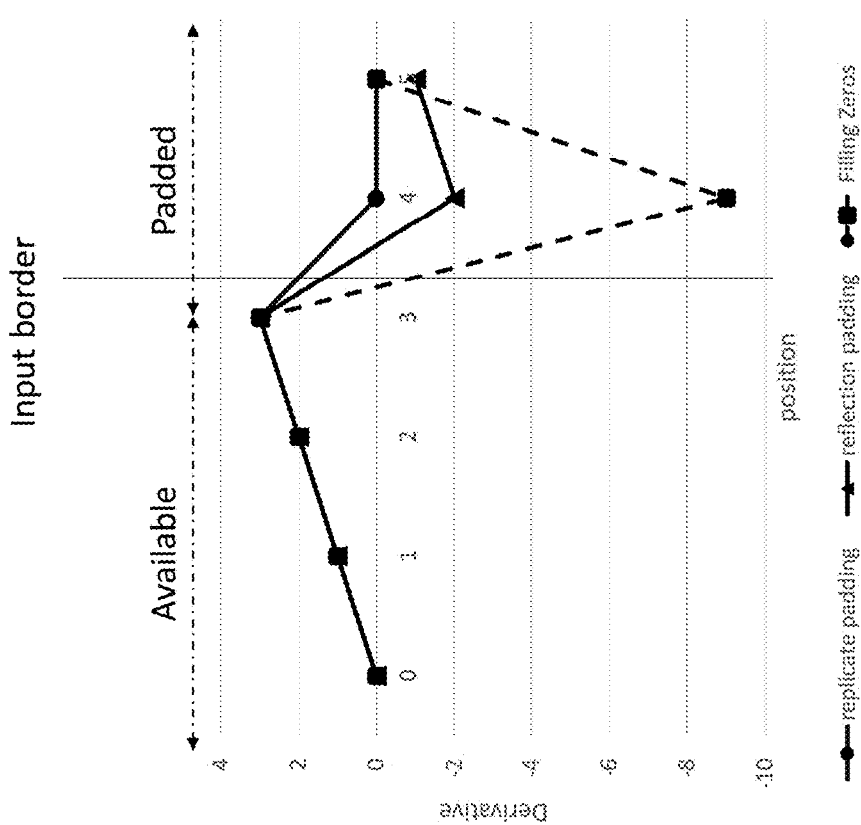

FIGS. 16 and 17 show some examples of resizing methods. In the FIGS. 16 and 17, 3 different kinds of padding operations and their performance are depicted. The horizontal axis in the diagrams shown indicates the sample position. The vertical axis indicates the value of the respective sample.

It is noted that the explanations that follow are only exemplarily and is not intended to limit the present disclosure to specific kinds of padding operations. The straight vertical line indicates the border of the input (a picture, according to embodiments), right hand side of the border are the sample positions where the padding operation is applied to generate new samples. These parts are also referred below as "unavailable portions" which means that these do not exist in the original input but are added by means of padding during the rescaling operation for the further processing. The left side of the input border line represents the samples that are available and are part of the input. The three padding methods depicted in the figure are replication padding, reflection padding and filling with zeros. In the case of a downsampling operation that is to be performed in line with some embodiments, the input to the one or more downsampling layers of the NN will be the padded information, i.e. the original input extended by the applied padding.

In the FIG. 16, the positions (i.e. sample positions) that are unavailable and that may be filled by padding are positions 4 and 5. In the case of padding with zeros, the unavailable positions are filled with samples with value 0. In the case of reflection padding, the sample value at position 4 is set equal to sample value at position 2; the value at position 5 is set equal to value at position 1. In other words, reflection padding is equivalent to mirroring the available samples at position 3, which is the last available sample at the input boundary. In the case of replication padding, the sample value at position 3 is copied to positions 4 and 5. Different padding types might be preferred for different applications.

In some embodiments, the padding type that is applied may depend on task to be performed. For example:

The padding or filling with zeros can be reasonable to be used for Computer Vision (CV) tasks such as recognition or detection tasks. Thereby, no information is added in order not to change the amount/value/importance of information already existing in the original input.

Reflection padding may be a computationally easy approach because the added values only need to be copied from existing values along a defined "reflection line" (i.e. the border of the original input).

The repetition padding (also referred to as repetition padding) may be preferred for compression tasks with Convolution Layers because most sample values and derivative continuity is reserved. The derivatives of the samples (including available and padded samples) are described on the right hand side of FIGS. 16 and 17. For example in the case of reflection padding, the derivate of the signal exhibits an abrupt change at position 4, (a value of −9 is attained at this position for the exemplary values shown in the figures). Since signals that are smooth (signals with small derivative) are easier to compress, it might be undesirable to use reflection padding in the case of video compression tasks.

In the examples shown, the replication padding has the smallest change in the derivatives. This is advantageous in view of video compression tasks but results in more redundant information being added at the border. With this, the information at the border may become more weight than intended for other tasks and, therefore, in some implementations, the overall performance of padding with zeros may supersede reflection padding.

Figure 18:
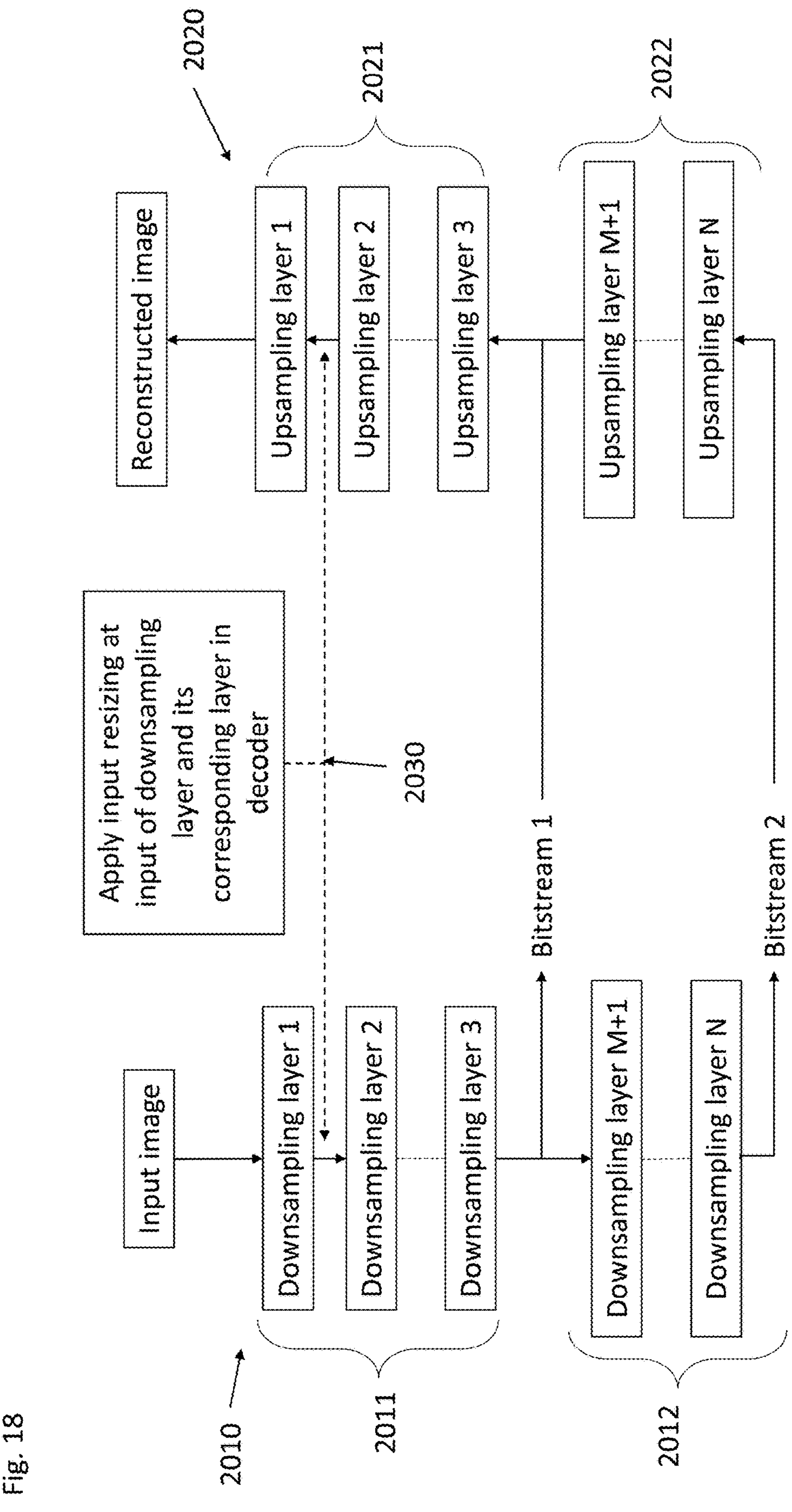
FIG. 18 shows an encoder and a decoder and the relationship in the processing of input to the encoder and the decoder in line with one embodiment of the present disclosure.

FIG. 18 shows a further example. Here the encoder 2010 and the decoder 2020 are shown side by side. In the depicted example, the encoder comprises a plurality of downsampling layers 1 to N. The downsampling layers can be grouped together or form part of subnetworks 2011 and 2012 of the neural network within the encoder 2010. These subnetworks can, for example, be responsible for providing bitstreams 1 and 2 that may be provided to the decoder 2020. In this sense, the subnetworks of downsampling layers of the encoder may form a logical unit that cannot reasonably be separated. As shown in the FIG. 18, the first subnet 2011 of the encoder 2020 comprises downsampling layers 1 to 3, each having its respective downsampling ratio. The second subnetwork 2012 comprises the downsampling layers M to N with respective downsampling ratios.

The decoder 2020 has a corresponding structure of the upsampling layers 1 to N. One subnetwork 2022 of the decoder 2020 comprises the upsampling layers N to M and the other subnetwork 2021 comprises the upsampling layers 3 to 1 (here, in descending order so as to bring the numbering in line with the decoder when seen in the processing order of the respective input).

As indicated above, the rescaling applied to the input before the downsampling layer 2 of the encoder is correspondingly applied to the output of the upsampling layer 2. This means the size of the input to the downsampling layer 2 is the same as the size of the output of the upsampling layer 2, as indicated above.

More generally, the rescaling applied to the input of a downsampling layer n of the encoder corresponds to the rescaling applied to the output of the upsampling layer n so that the size of the rescaled input is the same as the size of the rescaled output.

Figure 19:
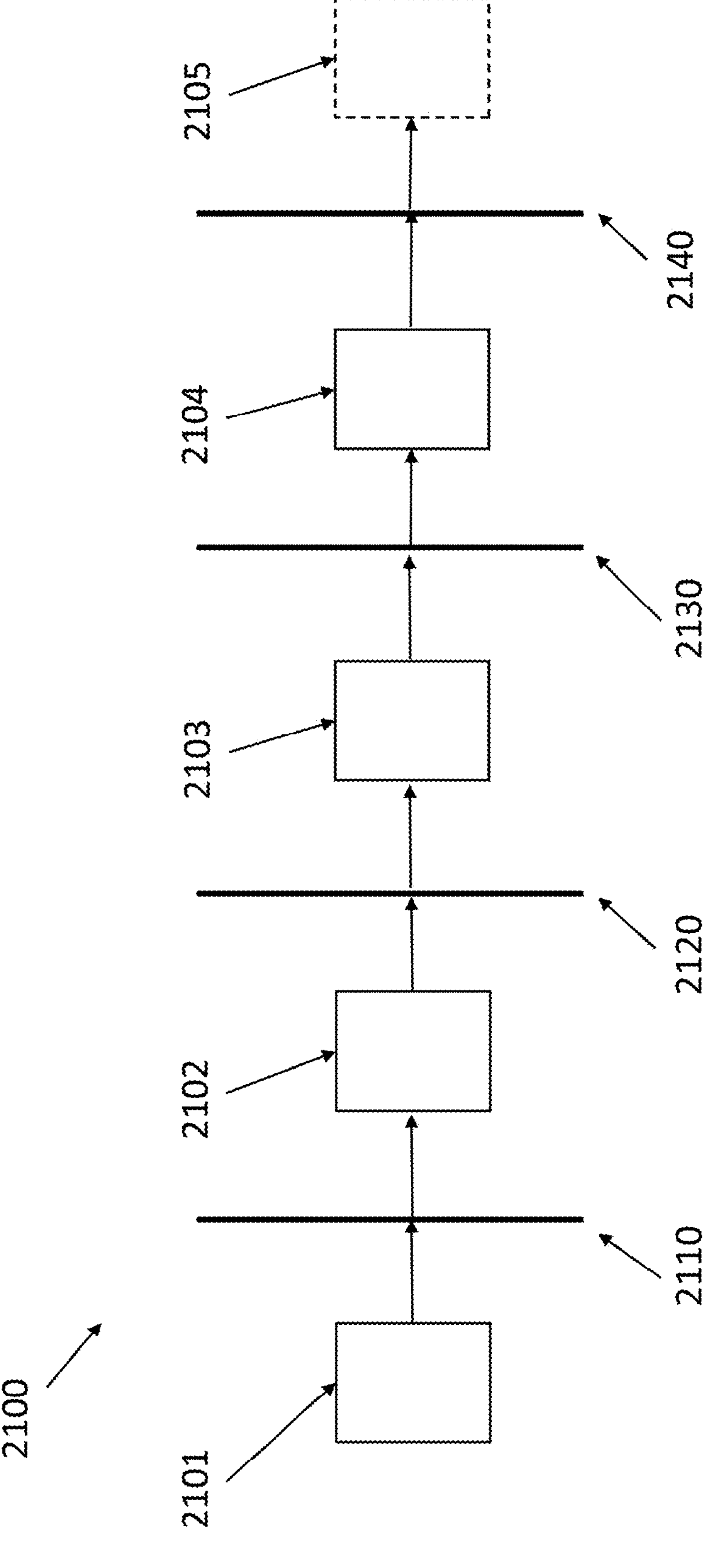
FIG. 19 shows a schematic depiction of a neural network as part of an encoder according to one embodiment of the present disclosure.
Figure 25:
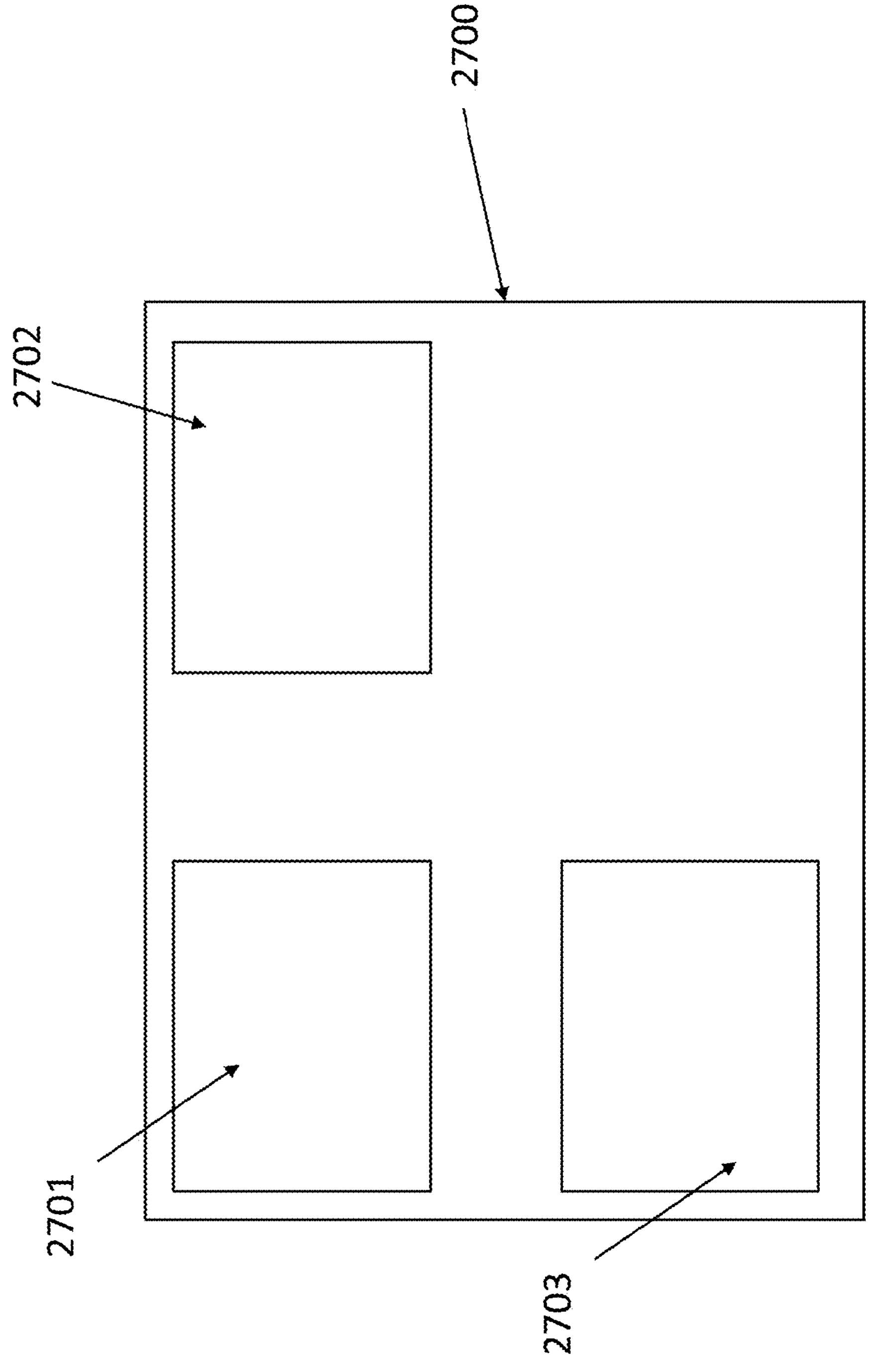
FIG. 25 shows a schematic depiction of an encoder according to one embodiment of the present disclosure.

FIG. 19 depicts a further exemplary embodiment of a neural network 2100 that may be part of an encoder as is explained in relation to, for example, FIG. 25 and is, according to embodiments of the present disclosure, used for encoding a picture.

The neural network 2100 may comprise, for this purpose, a plurality of layers 2110, 2120, 2130 and 2140. During the encoding, it is envisaged that the picture input for example as input 2101 is reduced in its size by processing the input through subsequent layers of the neural network 2100. Finally, an encoded picture can be provided as output 2105. In some embodiments, the output may be a binarized version of the encoded picture, constituting a bitstream 2105 and may be considered as output of the neural network 2100 or, more generally, of the encoder on which the neural network is implemented.

During this processing of an input through the neural network 2100, the input 2101, which may be the picture or some already processed version of the picture, is successively input into successive layers of the neural network 2100 in the processing order as shown, thereby potentially resulting in intermediate outputs 2102, 2103 and 2104 which are output by a current layer of a neural network and provided as an input to the immediately following layer of the neural network. While, in the embodiment of FIG. 19, one input 2101 is shown that is, during the processing with the neural network, translated into a single output 2105, it is also possible that one or more intermediate outputs are provided by the neural network, for example after having processed the input with the layer 2120. After having processed the input with the layer 2120, an intermediate bitstream or a sub-bitstream could be output that is already reduced in size compared to the original input but was not processed by the subsequent layers 2130 and 2140 of the neural network 2100. This can, for example, be provided in case the encoder is implemented in the way as exemplified in FIGS. 4 and 7 where the encoder provides a first bitstream (bitstream 1) and a second bitstream (bitstream 2) as output. This, however, is not mandatory and may be implemented according to the circumstances.

According to the present disclosure, the neural network may comprise one or more downsampling layers that apply downsampling to an input they receive, thereby reducing its size. The neural network shown in FIG. 19 comprises four layers 2110, 2120, 2130 and 2140. Not all of these layers may be implemented as downsampling layers. Some of the layers, for example the layers 2130 and 2140, may be implemented as layers that do not apply a downsampling to an input but process the input in another way.

A downsampling layer may be associated with a downsampling ratio r having an integer value greater than 1. When receiving an input with a given size S, the downsampling layer reduces the size of the input during the processing to a size $$\frac{S}{r}.$$

By applying a plurality of downsampling layers for processing an originally input picture the output has a size that may be reduced by a factor 1 divided by the product of all downsampling ratios. This may be denoted as $$\frac{1}{\prod_i r_i},$$

where the index i may enumerate the downsampling ratios of all downsampling layers. The downsampling layers may be enumerated in the order of processing an input through the neural network beginning with i=1 and running up to N, where N is the last downsampling layer of the neural network. In that case, the index i may take a natural number values beginning from 1 up to N.

If, for example, the neural network comprises six downsampling layers, each having a downsampling ratio r=2, the original size S of an input will be reduced to 1/64.

Generally, the size of the output 2105 of the neural network may be denoted with P. According to the present disclosure, the size P may, in view of the above, generally be smaller than the size S of the input.

When processing the input 2101 through the neural network, the input size may, preferably be an integer multiple of the product of the downsampling ratios of all downsampling layers. As the downsampling layers usually apply matrix operations or the like operations that may require an integer number of samples to be processed. When the input to a downsampling layer has a size S (and therefore a number S of samples) that is no integer multiple of the downsampling ratio of this layer, a reasonably processing of this input may not be possible.

For example, if the NN has a total of 2 downsampling layers (for example the layer 2110 and 2120 in FIG. 19) each having a downsampling ratio of 2 (along with other processing layers that do not perform downsampling), and if the size of the input image is 1024×512, no problem is observed. Since after two downsampling operations the resulting downsampled output is 256×128. However if the input had a size of 1024×511, it would not be possible to process the input with the NN, since after the first downsampling layer the expected size of the intermediate output 2102 would be 512×255.5, which is not an integer number which could be understood as referring to sample fractions (sub-pels) for which the NN is possibly not configured. This means that the NN in the example is not capable of processing input images that are not multiple of 4×4, where 4 in each dimension denotes the product of the downsampling ratios of the two downsampling layers in this example.

The problem has been exemplified above for a small number of downsampling layers (e.g. 2). However an image compression is a complicated task (since the image or picture usually has a significant size), and usually deep neural networks perform this task. This means that typically the number of downsampling layers comprised by the NN is more or even much more than 2. This increases the problem, since for example if the number of downsampling layers is 6 (each with a downsampling ratio of 2), the NN would be capable to process only input sizes that are multiple of $2^6 \times 2^6 = 64 \times 64$, if the neural network applies downsampling in two dimensions. Most of the images obtained by different end user devices do not satisfy this requirement.

In order to realize the downsampling, the downsampling layers may apply a convolution.

Such a convolution comprises the element-wise multiplication of entries in the original matrix of the input (in the exemplary case, a matrix with 1024×512 entries, the entries being denoted with $M_{ij}$) with a kernel K that is run (shifted) over this matrix and has a size that is typically smaller than the size of the input. The convolution operation of 2 discrete variables can be described as:

$$(f*g)[n]=\sum_{m\in K} f[m]g[n-m]$$

Therefore, calculation of the function (f*g)[n] for all possible values of n is equivalent to running (shifting) the kernel or filter f[ ] over the input array g[ ] and performing element-wise multiplication at each shifted position.

In the above example, the kernel K would be a 2×2 matrix that is run over the input by a stepping range of 2 so that the first entry $D_{11}$ in the downsampled bitstream D is obtained by multiplying the kernel K with the entries $M_{11}$, $M_{12}$, $M_{21}$, $M_{22}$. The next entry $D_{12}$ in the horizontal direction would then be obtained by calculating the inner product of the kernel with the entries or the reduced matrix with the entries $M_{13}$, $M_{14}$, $M_{23}$, $M_{24}$. In the vertical direction, this will be performed correspondingly so that, in the end, a matrix D is obtained that has entries $D_{ij}$ obtained from calculating the respective inner products of M with K and has only half as many entries per direction or dimension.

In other words, the shifting amount, which is used to obtain the convolution output determines the downsampling ratio. If the kernel is shifted 2 samples between each computation steps, the output is downsampled by a factor of 2. The downsampling ratio of 2 can be expressed in the above formula as follows:

$$(f*g)[n]=\sum_{m\in K} f[m]g[(2n)-m]$$

The transposed convolution operation can be expressed mathematically in a same manner as a convolution operation. The transposed convolution may be implemented during a decoding of an encoded picture, as will be explained with respect to the FIGS. 22 to 24. The term "transposed" corresponds to the fact that the said transposed convolution operation corresponds to inverting of a convolution operation. However implementation-wise, the transposed convolution operation can be implemented similarly by using the formula above. An upsampling operation by using a transposed convolution can be implemented by using the function:

$$(f*g)[n]=\sum_{m\in K} f[m]g\left[\operatorname{int}\left(n/u\right)-m\right]$$

In the above formula the u corresponds to the upsampling ratio, and into function corresponds to conversion to an integer. The into operation for example can be implemented as a rounding operation.

In the above formula, the values m and n can be scalar indices when the convolution kernel or filter f( ) and the input variable array g( ) are one dimensional arrays. They can also be understood as multiple dimensional indices when the kernel and the input array are multi-dimensional.

The present disclosure is not limited to downsampling or upsampling via convolution and deconvolution. Any possible way of downsampling or upsampling can be implemented in the layers of a neural network, NN.

This process (downsampling) can be repeated if more than one downsampling layer is provided within the neural network to reduce the size even further. Thereby, an encoded bitstream 2105 can be provided as output from the neural network according to FIG. 19. This repeated downsampling can be implemented in encoders as discussed in FIGS. 6, 10 and 11.

The encoder and the layers of the neural network 2100 are not limited to merely comprising downsampling layers that apply a convolution but also other downsampling layers can be thought of that not necessarily apply a convolution that obtains the reduction in the size of the input.

Furthermore, the layers of the neural network 2100 can comprise further units or can be associated with further units that perform other operations on the respective input and/or output of their corresponding layer of the neural network. For example, the layer 2120 of the neural network may comprise a downsampling layer and, in the processing order of an input to this layer before the downsampling, there may be provided a rectifying linear unit (ReLu) and/or a batch normalizer.

Rectifying linear units are known to apply a rectification to the entries $P_{ij}$ of a matrix P so as to obtain modified entries $P'_{ij}$ in the form $$P'_{ij}=\begin{cases}0 & \forall P_{ij}\le 0\\ P_{ij} & \forall P_{ij}>0\end{cases}$$

Thereby, it is ensured that values in the modified matrix are all equal or greater than 0. This may be advantageous for some applications.

The batch normalizer is known to normalize the values of a matrix by firstly calculating a mean value from the entries $P_{ij}$ of a matrix P having a size M×N in the form of $$V=\frac{\sum_{ij} P_{ij}}{N\cdot M}.$$

With this mean value V, batch normalized matrix P' with the entries $P'_{ij}$ is then obtained with by.

$$P'_{ij}=P_{ij}-V$$

Both, the calculations obtained by the batch normalizer and the calculations obtained by the rectified linear unit do not alter the number of entries (or the size) but only alter the values within the matrix.

Such units can be arranged before the respective downsampling layer or after the respective downsampling layer, depending on the circumstances. In some examples, as the downsampling layer reduces the number of entries in the matrix, it might be more appropriate to arrange the batch normalizer in the processing order of the bitstream after the respective downsampling layer. Thereby, the number of calculations to obtain V and $P'_{ij}$ is reduced significantly. As the rectified linear unit can simplify the multiplications to obtain the matrix of reduced size in the case of a convolution being used for the downsampling layer because some entries may be 0, it can advantageous to arrange the rectified linear unit before the application of the convolution.

However, the present disclosure is not limited in this regard and the batch normalizer or the rectified linear unit may be arranged in another order with respect to the downsampling layer.

Furthermore, not each layer necessarily has one of these further units or other further units may be used that perform other modifications or calculations. When processing an input by the neural network, matrix operations like the convolution explained above are applied.

As matrix calculations are performed here, for processing an input by each downsampling layer, the input to the neural network 2100 preferably has a size that is an integer multiple of the product of all downsampling ratios. Keeping with the above example and assuming that there are six downsampling layers each having a downsampling ratio of 2, this means that inputs to the neural network should have a size that is an integer multiple of 64 in order to be reliably processed by the neural network. Considering now an input that has a size of 540 in the at least one dimension, this input cannot be reasonably processed through the neural network, as this input is no integer multiple of the product of all downsampling ratios of the downsampling layers of the neural network.

Therefore, before processing an input with the neural network, a resizing or rescaling (these terms may be used interchangeably) is applied to the input, thereby changing its size S to a size $\overline{S}$ that can be reasonably processed by the neural network. For example, if the input has a size of 540, this is not an integer multiple of 64. In such a case, a rescaling to the closest smaller integer multiple (in that case 512) or to the closest larger integer multiple (in that case 576) may be applied so that the size S of the input is changed to a size $\overline{S}$ that can reasonably be processed by the neural network.

For this resizing, a plurality of different means can be employed as was already referred to above. For example, it is possible to increase or decrease the size of the input so that it matches an integer multiple of the product of all downsampling ratios of the neural network 2100. The decrease in size can be obtained in different ways, for example by cropping the input (which basically comprises deleting sample values of the input) or by applying interpolation. When interpolation is applied, instead of two neighboring samples (or more), a single new sample value (for example a mean value) representing these two samples can be used, thereby reducing the overall size of the input by 1. The more samples are interpolated, the more the size of the input can be reduced.

When increasing the size S of the input, it is also possible to use interpolation. In that case, an "intermediate" or new sample can be generated by taking the mean value of two neighboring samples and separating these neighboring samples and including the new sample in between them. Alternatively, padding can be used which comprises including additional samples with values in the input in order to increase its size. This padding can comprise, for example, padding with zeros or padding with information already available in the input, like repetition padding or reflection padding as already explained above.

The resizing method actually chosen may depend on circumstances like, for example, an intended output size P of the neural network. If this size P has a value, it may not be appropriate to reduce the size of the input to the closest smaller integer multiple of the product of the downsampling ratios of the neural network but it may rather be appropriate to increase the size of the input.

In keeping with the above example where the product of downsampling ratios was 64, consider an input with a size S of 540. This is no integer multiple of 64, but 512 and 576 are. If it is intended to provide an output with a size P=8, increasing the size to 576 is not appropriate. In that case, the size S of the input would rather be reduced to the size $\overline{S}$=512. After processing the resized input through the neural network, the obtained output has a size of 8 because 512 equals 8×64.

Furthermore, it may be a user selection to rather increase the size of the input, thereby avoiding loss of information or to decrease the size of the input during the encoding when the encoded picture should be as small as possible. Additionally, when processing a picture, the encoder performing the method of encoding may try a plurality of resizing methods and may choose the one that is most appropriate in order to ensure that a high quality of the decoding of a bitstream containing the encoded picture can be obtained.

Figure 20:
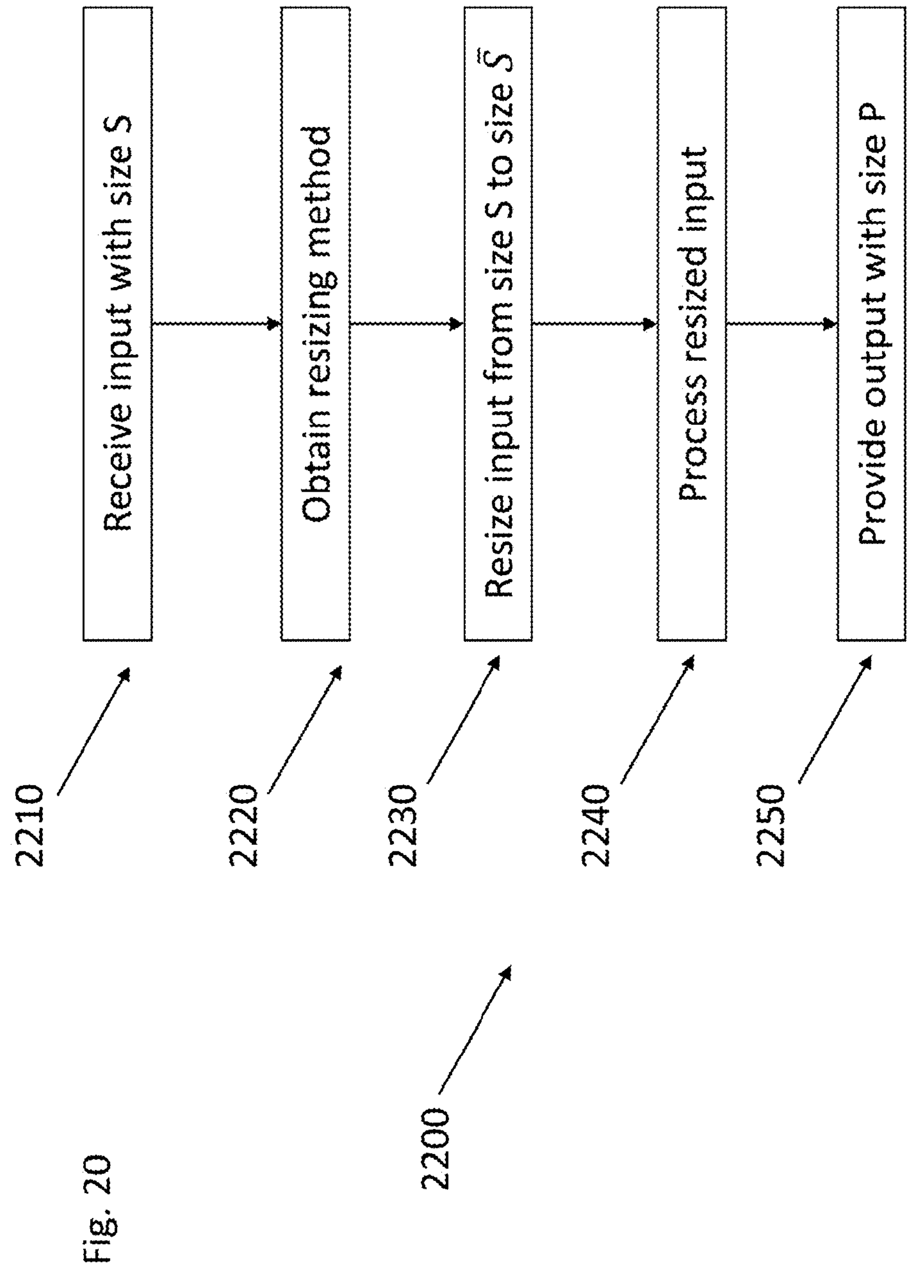
FIG. 20 shows a flow diagram of a method for encoding a picture according to one embodiment.

In order to take account of these options, FIG. 20 shows a method of encoding a picture according to one embodiment.

The picture or an input that is somehow related to this picture (for example a pre-processed or otherwise modified input) has a size S (corresponding to the number of samples of the picture, for example) and is received in step 2210 at the encoder or the neural network 2100 of FIG. 19. Depending on additional information, like a user selection of the resizing method, an intended output size P or other indications that will be explained further below, in step 2220, the resizing method to be used during the encoding can be obtained. In a next step, using this resizing method, the size S of the input may be changed to a size $\overline{S}$ by applying this resizing method. For example, the original input with a size S may be cropped so that the size S is reduced to the size $\overline{S}$. Alternatively, a padding with 0s of the input for the size s may be performed so that the size is increased to the size $\overline{S}$.

In the present disclosure, the size $\overline{S}$ is an integer multiple of the product of the downsampling ratios of all downsampling layers of the neural network.

In some embodiments, the method for resizing may be obtained depending on the input size S and information associated with the neural network. This information may comprise, for example, one or more downsampling ratios of the downsampling layers of the neural network or a number that is indicative of the product of the downsampling ratios of all downsampling layers of the neural network. Furthermore, the information may comprise the intended output size P of the neural network and one or more downsampling ratios or the product of the downsampling ratios of all downsampling layers.

This information can be used to determine how the size S has to be changed, if at all. For example, assuming that the input has a size S=512. Information provided may indicate that the output has to have a size of P=8. Furthermore, the product of all downsampling ratios of the downsampling layers may be 64. Multiplying 8 with 64 equals 512 and, therefore, it may be determined that no change in the size of the input is necessary when applying the resizing. In that case, the step 2230 may comprise that the resizing is an identical resizing, meaning that no change in the size of the input is applied.

Considering instead that the case that the input has a size of 540 as exemplified above. When the output P is to have a size of 8, even though increasing and decreasing the size of the input would in principle be possible, this may result in choosing the resizing method that reduces the size of the input to 512 being chosen.

If the intended output size P is not specified, increasing or decreasing the size S (as first step in a selection of a resizing method) may be chosen for example so that as few modifications to the original input with the size S are applied. This may comprise calculating the difference between the size S of the input to the closest smaller and closest larger integer multiple of the product of all downsampling ratios of all downsampling layers of the neural network. This may be done by calculating any one of the functions $$\text{ceil}\left(\frac{s}{\Pi_i r_i}\right)\prod_i r_i \text{ or}$$

$$\text{floor}\left(\frac{s}{\Pi_i r_i}\right)\prod_i r_i \text{ or int}$$

$$\left(\frac{s}{\Pi_i r_i}\right)\prod_i r_i.$$

Any of these may then be compared to the input size S, for example by subtracting the value of the respective function from S or subtracting S from the value of the respective function.

For example, a value $$C = \text{ceil}\left(\frac{s}{\Pi_i r_i}\right)\prod_i r_i - S$$

(indicating the difference between the closest larger integer multiple of the product of the downsampling ratios of all downsampling layers and the size S of the input) and a value $$F = \text{floor}\left(\frac{s}{\Pi_i r_i}\right)\prod_i r_i - S$$

(indicating the difference between the closest larger integer multiple of the product of the downsampling ratios of all downsampling layers and the size S of the input) may be obtained. Also or instead, the absolute values C and F may be obtained.

Depending on which of these values C and F or which of the absolute values |C| and |F| of is larger, a resizing method comprising either increasing or decreasing the size S may be chosen. If, for example, F is smaller than C, then the input size S is closer to the closest smaller integer multiple of the product of all downsampling ratios resulting, if the input size S is reduced to this closest smaller integer multiple, in the fewer modifications to the original input in terms of a reduction or increase in size. The same holds if the value C is smaller than the value F. In that case, fewer modifications to the original input size S will be applied when increasing the size to the closest larger integer multiple of the product of all downsampling ratios.

Furthermore, the intended size P of the output may be provided in the form of an index indicating an entry in a table, like a pre-stored look-up table, LUT, that has a plurality of entries, each entry indicating a different output size. By providing this indication, the size P can be selected and, from that, as already exemplified above, the appropriate resizing method can be chosen.

Having chosen whether to increase or decrease the size S of the input to a size $\overline{S}$, as part of obtaining the resizing method, it may then be determined or obtained which resizing method is actually be applied to perform this increasing or decreasing of the size S during the resizing. If for example the size S is to be decreased, then cropping or interpolation may be applied. If the size is to be increased, padding or interpolation may be applied. In a further step during the step 2220, the resizing method to be chosen to apply the increasing or decreasing of the size may be determined, for example based on additional information.

Additionally, or alternatively, one or more indications (for example as part of the additional information) that specify the resizing method to be chosen may be provided where, based on these one indications, the resizing method can be selected instead of 2220.

Once the resizing method has been obtained, the resizing of the input from the size S to the size $\overline{S}$ is applied in step 2230. This resized input is then processed through the neural network in step 2240 and, finally, after having been processed with the neural network, an output with the size P is provided.

The output can then be binarized and a bitstream provided. Alternatively, further processing can be performed like, for example, including information on the resizing method that has been applied like, for example, one or more indications regarding the resizing method chosen. After including or adding this information, the output of the neural network and the information can be binarized to obtain a bitstream. The bitstream can then be forwarded, for example, to a decoder where a decoding of the bitstream may be performed to reconstruct the picture, potentially using the information provided in addition to the encoded picture in the bitstream.

Figure 21:
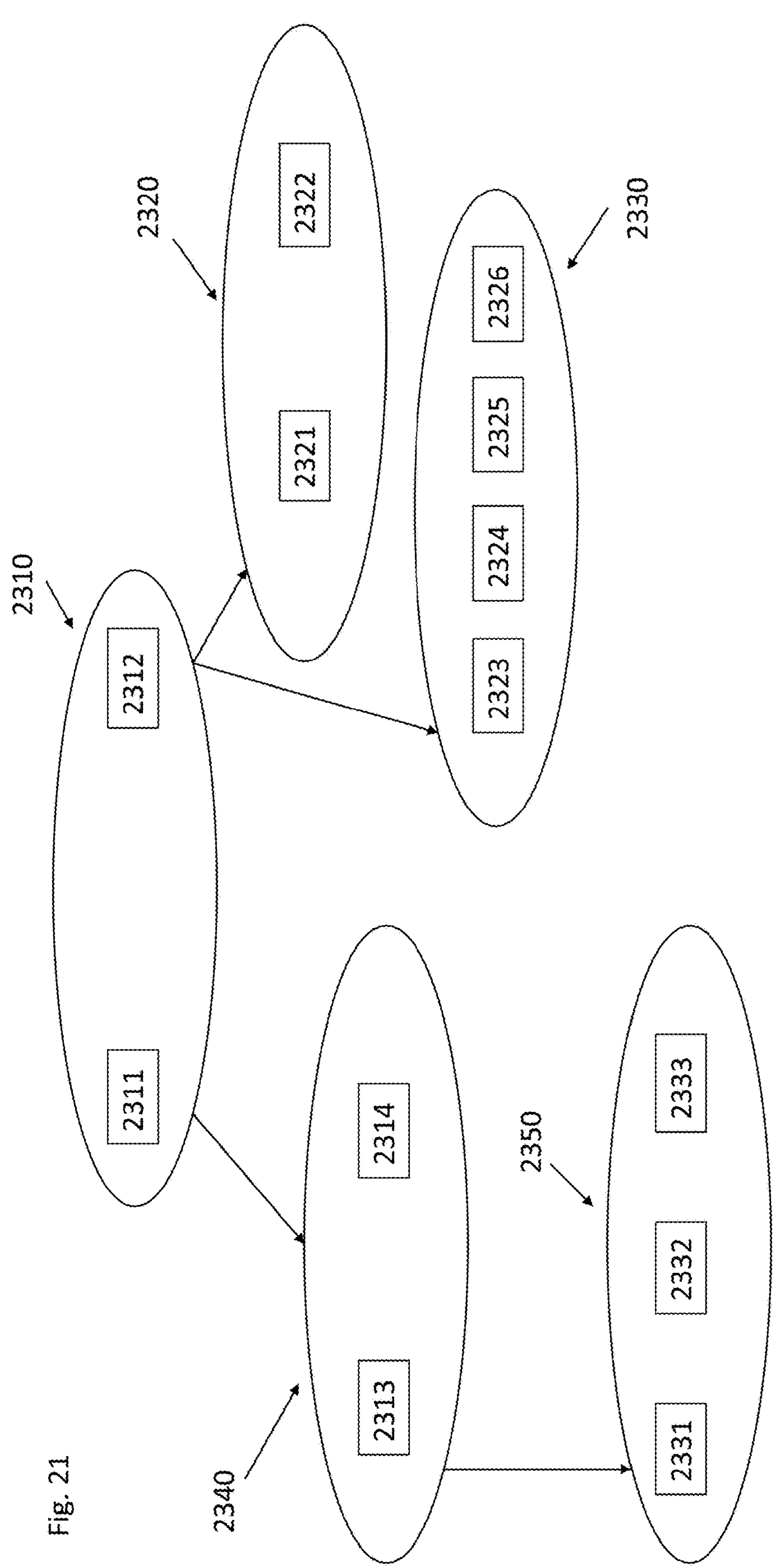
FIG. 21 shows an embodiment of one or more indications being provided for the encoding, in accordance with an embodiment of the present disclosure.

Regarding the indications that indicate which resizing method to apply, FIG. 21 provides a further example.

In FIG. 21, a plurality of ellipses 2310, 2320, 2330, 2340 and 2350 are provided. Each of these ellipses constitutes an indication that may or may not be provided to an encoder for obtaining the resizing method in step 2220 of FIG. 20. The numbers within these ellipses constitute values of the indication and a corresponding reference sign to the same for ease of explanation. The value of the indication may be understood to refer to a value the respective indication may have or take. In some embodiments, though each indication may potentially have a plurality of different values, it is understood that each indication can actually only take one of these different values. For example, the first indication may either take the value 2311 or the value 2312, but not both at the same time.

In some embodiments, all of these indications may be provided in a information provided to the encoder irrespective of their actual value. In some embodiments, it is also envisaged that one or more of these indications are only present if a preceding indication takes a value. This will be explained in more detail in the following.

In the FIG. 21, a first indication 2310 is shown. This indication may take, for example, two values. A first value 2311 may indicate that a resizing method comprising padding or cropping of the input is to be applied. A further value 2312 may indicate that interpolation is to be applied as the resizing method (irrespective of whether the size is to be increased or decreased in the resizing). Advantageously, the first indication 2310 can be provided in the form of a flag having a size 1 bit where the first value 2311 (for example 0) indicates that padding or cropping is to be used and the second value (for example 1) 2312 indicates that interpolation is to be used.

Depending on which value the first indication 2310 actually takes, the resizing method can already be considered to be finally determined so that the encoding can proceed by applying the resizing. For example, if the value of the first indication 2310 indicates that padding or cropping is to be used (by the value 2311), based on further information like the size S of the input and the intended output size P, it can be determined during the step 2220 in FIG. 20 whether padding or cropping is to be applied without this necessarily being signaled in an additional indication. This is because when the input size S is known and the downsampling ratios of the downsampling layers of the neural network are fixed, the intended output size P can only be obtained in one way, by either applying padding to increase the size S of the input or by applying cropping to decrease the size of the input. The resizing of the input size S to a size $\overline{S}$ may, in this case, be provided so that the size $\overline{S}$ may be equal to the product of the intended output size P and the downsampling ratios of all downsampling layers.

The way in which the input is padded may be arbitrary or may be determined as appropriate by the encoder.

In one embodiment, where the value of the first indication 2310 indicates that interpolation is to be used, a second indication 2320 may be provided. This second indication 2320 can take a first value 2321 that indicates that, by using interpolation, the size S of the input is to be increased and a second value 2322 of the second indication may indicate that the size of the input is to be decreased. Depending on which value this indication then takes, the size of the input may be increased or decreased.

Like the first indication, also the second indication can advantageously be provided in the form of a flag having a size of 1 bit as there are only two options, either increasing or decreasing the size S of the input using interpolation. These two options can be encoded with a single bit, thereby reducing the amount of information.

Furthermore, if the first indication 2310 indicates with its value 2312 that interpolation is to be applied as the resizing method, a third indication 2313 may be provided. This third indication is indicated here to have a plurality of values 2323 up to 2326. These values may each refer to or indicate an interpolation filter that is to be applied during the interpolation (irrespective of the value of the second indication 2320 or potentially even depending on that). For example, the third indication 2330 may have values that are provided as index that indicates an entry in a look-up table that can be available to the encoder or the encoding method. In this look-up table, each entry can specify an interpolation filter and by using the index, the entry in the look-up table can be identified and correspondingly the interpolation filter deduced without having to explicitly include the interpolation filter or its value in the third indication 2330. On the other hand, the third indication 2330 may explicitly specify an interpolation filter by means of one or more of its values 2323 to 2326.

In the other case, where the first indication 2310 indicates that padding or cropping are to be used (with the value 2311), a fourth indication 2314 may be provided. This fourth indication may also take different values where one value 2313 indicates that padding is to be used for the resizing and a second value 2314 indicates that cropping is to be used. Thereby, it is also specified whether the size of the input is to be increased (using padding) or whether the size is to be decreased (using cropping). Like the first and second indications, also the third indication can thus be provided in the form of a flag having a size of 1 bit where, for example, the 0 indicates that padding is to be used and a 1 indicates that cropping is to be applied.

In some embodiments, if the fourth indication indicates that padding is to be applied (value 2313), a fifth indication can be provided. This fifth indication 2350 can indicate, based on its value 2331 to 2333 whether padding with zeros, reflection padding or repetition padding or another padding method is to be used in the padding. Thus, by the fourth indication and the fifth indication, the amount of padding to be applied during the resizing is specified.

However, which mode of padding is applied may also be left open and may not explicitly indicated in the step 2220 of FIG. 20 and thus, no fifth indication may be present.

Alternatively, instead of a fifth indication 2350, the information on the padding to be used may also be included in the fourth indication 2340 itself. Assuming the three example padding methods referred to above (padding with zeros, reflection padding and repetition padding), and further taking the option of cropping, this makes four values for the fourth indication 2340 that can specify which mode of padding or cropping is to be applied. This can be encoded in an indication having a size of 2 bit, thus representing four values. Thereby, also this information can be provided in an indication having a comparatively small size.

As was referred to above in FIG. 21, the second and third indication may be present if the value of the first indication 2310 indicates that interpolation is to be applied. If the value of the first indication 2310 instead indicates that padding or cropping is to be used, the second and/or third indication may not be present, thereby even further reducing the amount of information. Likewise, if the first indication 2310 indicates that interpolation is to be used, neither the fourth nor the fifth indication may be present in order to keep the size small. Instead of this, it may also be considered that all indications referred to above are present anyway. However, as by processing the first indication 2310, the information whether to use interpolation or padding or cropping in the resizing is already available, the values of the respective other indications is no longer relevant and may then be set to 0 by default or to any other reasonable value.

By processing the indications and potential further information regarding the input size and/or the downsampling ratios of the downsampling layers of the neural network and/or the intended output size P, the encoder can determine the resizing method to be applied in step 2220 of FIG. 20.

While the embodiments referred to with regard to FIG. 21 may be used to obtain, at the encoder, the method of resizing in step 2220, the indications presented in FIG. 21 may also be included in a bitstream that comprises the output of the neural network. Thereby, this information can be made available to a decoder which can then use this information to apply an appropriate resizing, as will be explained in the following, during the decoding, thereby making sure that reliable reconstruction of the picture is obtained.

With respect to the indications, reference is also made to the FIGS. 13, 14 and 15, that refer to corresponding indications. In this context, the first indication may be the indication denoted with methodIdx. The second indication may be the indication denoted with SCIdx above and the third indication may be the indication referred to above with RFIdx. All what was said above in FIGS. 13 to 15 therefore also applies to the first, second and third indication referred to in FIG. 21.

The indications shown in FIG. 21 and explained above are described to be present depending on values of another indication. For example, presence of the indication 2320 was described to depend on the value of the indication 2310, denoted as first indication.

Alternatively, it is also encompassed by the present disclosure that each of the first to fifth indication is present independent from the presence of another indication.

In this context, naming the indications as first, second, third etc. indication is just employed here for easier identification of the different indications. As they may be provided as independent indications, they may, each, also be referred to as "indication". Furthermore, the numbering of first, second, etc. indication is not intended to limit these indications to an order in which they occur, for example in a bitstream. Rather, this is considered to just be a naming of the different indications that allows for easier identification.

Furthermore, in line with some embodiments, instead of or in addition to these first to fifth indications, a (further) indication is provided in line with some embodiments, where this indication allows for obtaining the method of resizing from a table.

This indication may be or may comprise an index that indicates an entry in a look-up table. This look-up table, LUT, may comprise a plurality of entries, each entry specifying a method of resizing. There may be entries in the LUT specifying that padding or cropping or interpolation is to be used. Additionally or alternatively, the LUT may comprise entries where each entry specifies the kind of padding (reflection padding, repetition padding or padding with zeros) that is to be used. Additionally or alternatively, the LUT may comprise an entry specifying that interpolation is to be used, entries that specify that interpolation is to be used for increasing the size by the resizing or to decrease the size by the resizing, and/or that specify the filter to be used during the interpolation.

Exemplarily, the LUT may comprise 4 entries for padding/cropping, where one entry specifies cropping, one entry specifies padding with zeros, one entry specifies repetition padding and one entry specifies reflection padding. Additionally, the table may comprise one or more entries for interpolation to be used to increase the size of the input by the resizing. These entries may specify different interpolation filters each, where the interpolation filters may comprise Bilinear, Bicubic, Lanczos3, Lanczos5, Lanczos8 and a N-tab filter, or any other filter or any other number of different filters.

In some embodiments, this may encompass that there are 6 entries that specify different methods of increasing the size by interpolation (one for each filter). Further, 6 entries may be provided in the LUT for reducing the size by interpolation, where each entry specifies a corresponding filter to be used in the interpolation.

Thus, the index may be provided to take 16 different values, corresponding to the 16 different entries in the LUT (4 for padding methods and cropping and 6 entries each for interpolation to increase the size with a filter and for interpolation to decrease the size with a filter). The LUT may be available to the encoder so that, depending on the value of the indication, the encoder can determine the method of resizing to be applied.

The indication comprising the index to the LUT may, like the other indications referred to above, be provided to the encoder for example in a bitstream in addition to the picture to be encoded or together with the picture. Alternatively, the indication may, for example, be derived from input by a user that specified the resizing method to be applied by one or more inputs.

Figure 22:
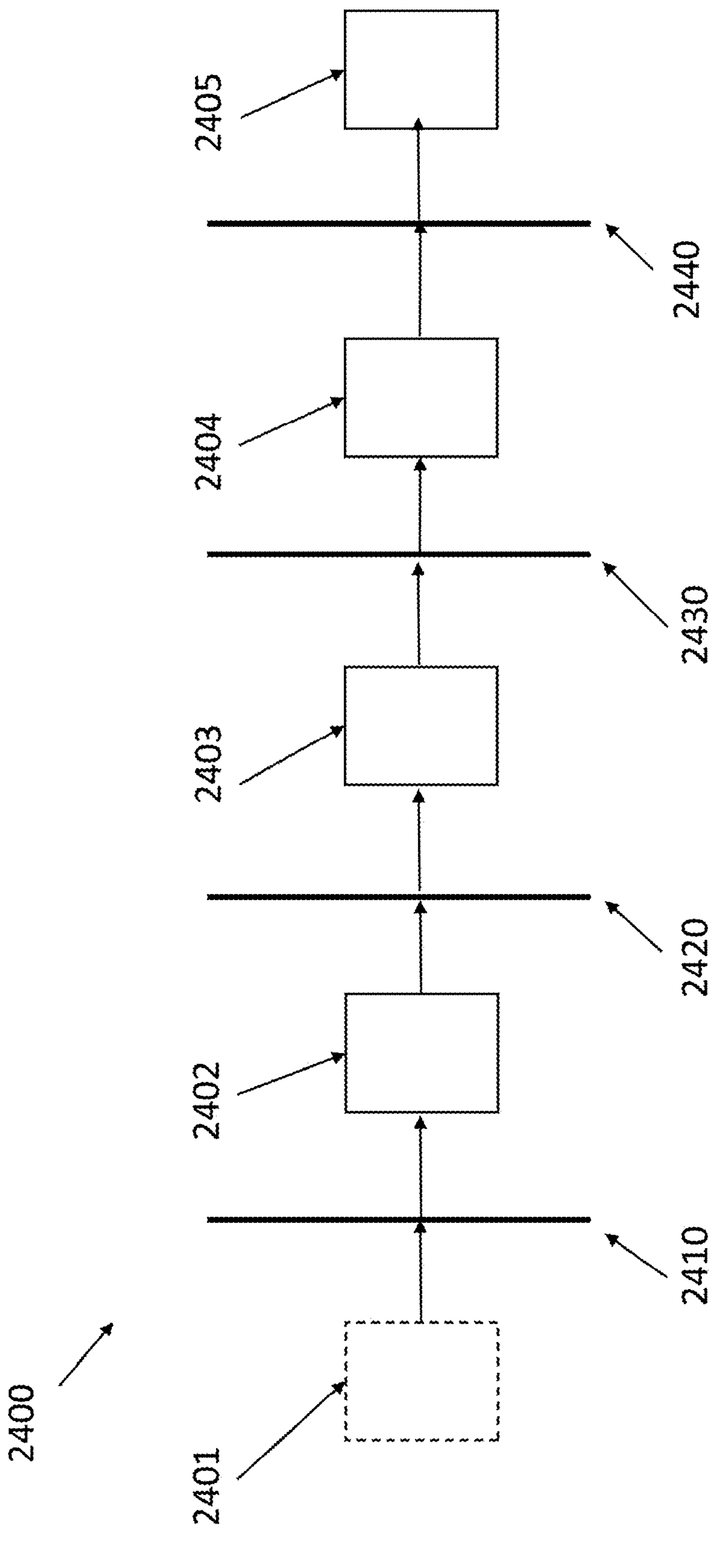
FIG. 22 shows a schematic depiction of a neural network as part of a decoder according to one embodiment of the present disclosure.

FIG. 22 shows a schematic depiction of a neural network 2400 that may be part of a decoder receiving a bitstream representing an encoded picture for decoding. The input to the neural network is denoted with 2401 and may be related to the output 2105 of the neural network 2100 according to FIG. 19.

The general structure of the neural network 2400 may be comparable to the structure of the neural network 2100 according to FIG. 19. Like in FIG. 19, the neural network 2400 may comprise a plurality of layers, like the layers 2410, 2420, 2430 and 2440 that process an input they receive. In this context, the input 2401 may be processed by the layers, each providing an output 2402, 2403 and 2404 that is used as input for the next layer of the neural network until, finally, after having processed the input 2401 with all layers of the neural network 2400, an output 2405 that may be a decoded picture is obtained.

For this purpose, the neural network 2400 comprises upsampling layers that apply an upsampling to an input they receive. This may be considered to be the inverse operation of the downsampling applied in the downsampling layers according to FIG. 19 and is associated usually with an upsampling ratio u for a corresponding upsampling layer. This upsampling ratio may be a natural number larger than 1 so that an input, for example the input 2401, when being processed by an upsampling layer 2410 of the neural network 2400, is increased in size in at least one of the dimensions by the upsampling ratio. This can be achieved by, for example, applying a deconvolution to the input as the inverse transformation to the convolution as exemplified in FIG. 19. The upsampling might be a property of a layer that performs in general a transformation to its input. For example the layer might be a convolution layer, or an activation layer (consisting for example of rectified linear units) with the property of upsampling. The layers having this property are generally called an upsampling layer in the present application.

By processing the input 2401 by all upsampling layers of the neural network 2400, an output is obtained. Due to the upsampling that is applied by each of the upsampling layers, the size T of the input 2401 and a size $\overline{T}$ of an intermediate output 2405 provided by the last upsampling layer 2440 have the relation that the size $\overline{T}$ is proportional to a function of T and total upsampling ratio of the neural network 2400. The total upsampling applied by the NN in 2400 depends on the upsampling applied by its layers. In one example, the total upsampling ratio of the NN might be obtained according to the product of all of the individual upsampling rations of the layers of the NN. The total upsampling ratio of NN (2400) might be denoted with $\Pi_i u_i$, where the $u_i$ specify the upsampling ratios of the upsampling layers i and the index i may take as many values as there are upsampling layers of NN 2400. In another example the total upsampling ratio of NN might be a precalculated scalar number K.

The relationship between the size T of the input 2401 and size output size may be denoted with $\overline{T}=T\Pi_i u_i$, where the $u_i$ specify the upsampling ratios of the upsampling layers i and the index i may take as many values as there are upsampling layers of NN 2400. If there are thus for example N (N being a natural number) of upsampling layers, the index i may take all natural values between 1 and N. This way of indexing or enumerating the upsampling layers is only exemplarily. The index i may for example start with a first value 0 or −1.

To exemplify the upsampling, the following is noted.

If the input has a size T of 8 and the neural network 2400 comprises six upsampling layers, each having an upsampling ratio u=2, then the intermediate output, for example the output 2405, will have a size $\overline{T}$=512, because $8\times2^6=512$.

As was explained above with respect to FIGS. 19 to 21, during the processing of an input by an encoder, resizing may be applied that reduces or increases the size S of an input the encoder receives to a size $\overline{S}$. This size $\overline{S}$ is usually different from the original size S that may represent the size of the picture. However, processing the resized input with the downsampling layers during the encoding results in an output having a size P. This output is then provided to a decoder for decoding and reconstructing the image and in that case, the input size T is equal to P.

However, even when applying upsampling layers that have the same upsampling ratios as the downsampling ratios of the downsampling layers of the encoder, what is obtained as output of the neural network at the decoder will correspond to the product of the size P (equal to T) with the upsampling ratios of all upsampling layers. Therefore, what is obtained as output of the neural network 2400 will generally have a size $\overline{T}$ that does not necessarily already match the size S of the original input to the encoder. This is because the upsampling applied by the decoder to the input with the size T may only be provided to revert the downsampling applied to an input at the encoder that encoded the picture that is now to be reconstructed. This input to the encoder, to which the encoder applies downsampling to obtain an output with the size P, may, however, have a size $\overline{S}$ that is not identical to the size S (as explained above). Applying a downsampling to the resized input with the size $\overline{S}$ results in an output with the size P that is then provided as input with the size T to the decoder. When the decoder reverts the downsampling by applying upsampling (assuming that the total upsampling ratio of the NN of the decoder is the same as the total downsampling ratio of the NN of the encoder), this may lead to an intermediate output having the size $\overline{T}$ that is the same as the size $\overline{S}$, because the operation that is inverted or reverted by the decoder is the downsampling that was applied to the potentially resized input with the size $\overline{S}$, not the input with the original size S. Consequently, the size $\overline{T}$ of the intermediate output will usually equal the size $\overline{S}$ of the resized input to which the downsampling is applied by the encoder, but the size $\overline{T}$ of the intermediate output will generally not already equal the size S of the original input (picture) to the encoder.

Thus, the picture is not usually already reconstructed when having it processed with the neural network of the decoder. The cascaded application of the upsampling layers to the input at the decoder makes it impossible to achieve some target sizes at the output. For example if the total upsampling ratio of decoder is K and if the input size is T, the size of the intermediate output of the decoder might be equal to K×T, in one example. This means that only output sizes that are multiple of K can be achieved by this decoder neural network. However if it is desirable to make the output size equal to input size S of the encoder, it might not be possible especially if the S is not multiple of K. This would cause either potential loss of information (when the intermediate size $\overline{T}$ is smaller than S or redundant information when $\overline{T}$ is greater than S).

Thus, in some embodiments of the present disclosure, after having processed an input with the size T in at least one dimension with all upsampling layers of the neural network, a resizing may be applied to an intermediate output obtained from the processing with all upsampling layers of the neural network, where the resizing changes the size $\overline{T}$ of the intermediate output to a size $\hat{T}$.

This intermediate output may explicitly be output by the neural network, in some examples the last layer of the neural network. Having obtained this output, a resizing may then be applied. Alternatively, the resizing may be applied while still processing the input with the neural network, for example as part of the last layer of the neural network. The resizing may be provided in a way that the size $\overline{T}$ is resized to the size $\hat{T}$ and $\hat{T}$ may for example be provided as information in the bitstream (for example equal to the original input size S).

On the other hand, the size $\hat{T}$ may be obtained from information obtained in the bitstream where $\hat{T}$ is not explicitly provided in the bitstream. For example, the size $\hat{T}$ may be obtained from upsampling parameters of the upsampling layers of the neural network, like the upsampling ratios. Alternatively, the size $\hat{T}$ may be obtained using an index that is part of the bitstream or an additional bitstream. The index may point to an entry in a look-up table of output sizes $\hat{T}$. When obtaining the value of the index from the bitstream, it is possible to obtain the size $\hat{T}$ associated with this index from the look-up table. This is advantageous in cases where the decoded picture (which will for example have the size $\hat{T}$) only has a limited number of allowed sizes like 512×256, 1024×512 or 2048×1024 like usually used for videos. In such a case, that look-up table can already be available to the decoder and can then be used to obtain, using the index provided in the bitstream, the size $\hat{T}$, thereby, obtaining the resizing.

The resizing to be applied can, like for the encoding, be done in different ways comprising for example interpolation, cropping and padding as well as increasing or decreasing the size. While, with having the size $\hat{T}$ fixed, the way in which the resizing is to be done (either increasing or decreasing the size) may already be fixed, the way in which increasing or decreasing the size of the intermediate output to the size $\hat{T}$ may still need to be determined. For example, it may be preferred to apply a resizing that corresponds to (for example by being the inverse) to the resizing applied by the encoder. By applying a resizing that inverses the resizing applied by the encoder, the quality of the reconstruction may be improved. For example, if the encoder applied padding to increase the size S of the input before processing it with the neural network, the decoder may apply cropping and no interpolation.

Figure 23:
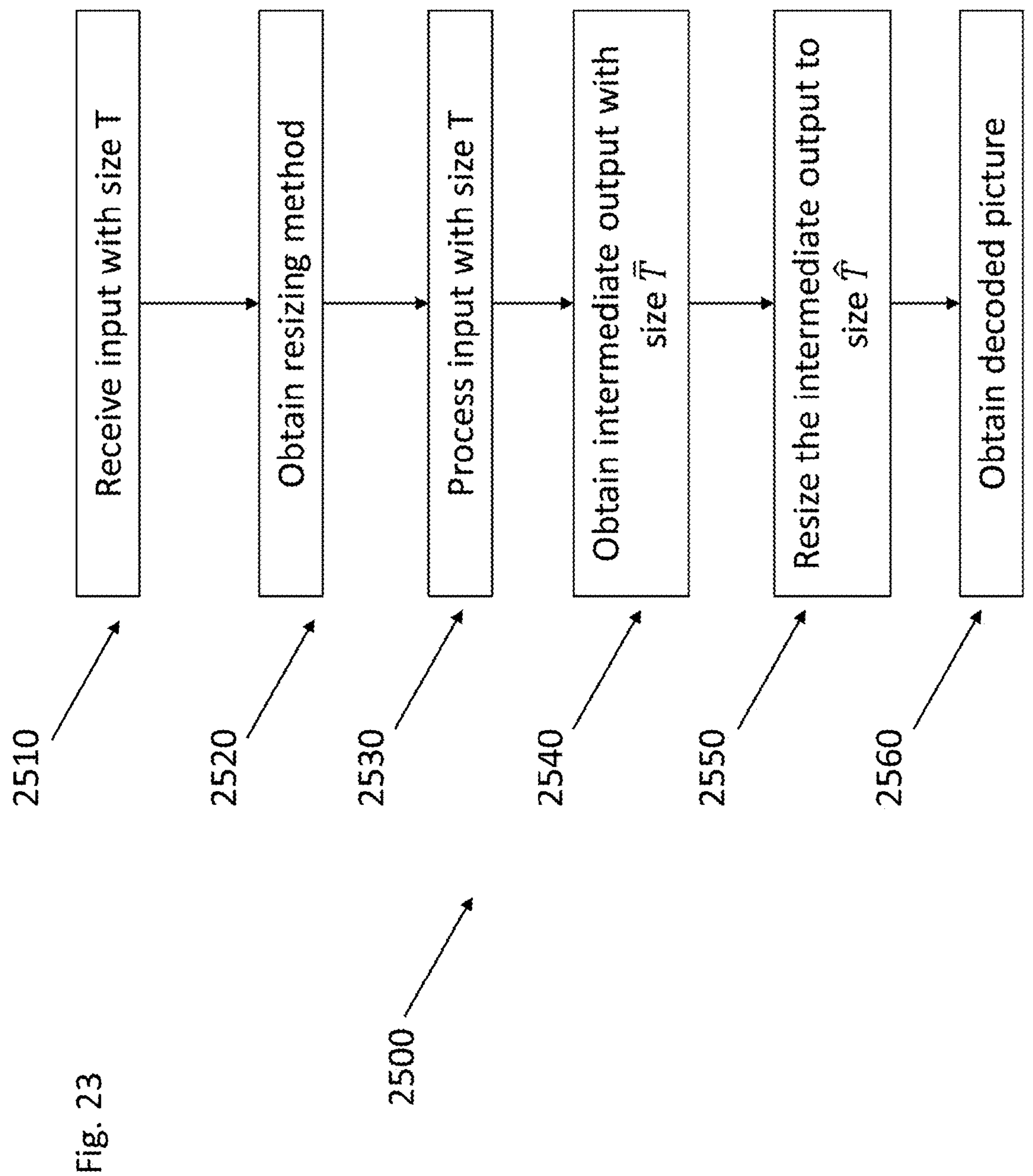
FIG. 23 shows a flow diagram of a method for decoding a bitstream according to one embodiment of the present disclosure.

In this regard, FIG. 23 shows a method 2500 according to one embodiment for decoding a bitstream. In a first step 2510, an input with a size T is received like, for example, a bitstream encoding picture or some pre-processed form of this bitstream. In a next step 2520 (although this temporal order may different as will be explained below), a resizing method to be applied is obtained by, for example, using additional information available, like the size $\hat{T}$ discussed above or one of more indications as will be discussed below.

In a next step 2530 of the method, the input with the size T may be processed by the neural network. This may comprise processing the input successively by each of the upsampling layers of the neural network, thereby obtaining, in the step 2540, an intermediate output that has a size $\overline{T}$. This size $\overline{T}$ will usually be larger than the size T as the one or more upsampling layers of the neural network apply upsampling to the respective input they receive. In some embodiments, when considering that a plurality of upsampling layers with associated upsampling ratios process the input of the size T, the size $\overline{T}$ may equal the product of the original input size T with the upsampling ratios of all upsampling layers. This may be denoted with $\overline{T}=T\ \Pi_m\ u_m$ where the $u_m$, are the upsampling ratios of the upsampling layers.

Having obtained this intermediate output in the step 2540, the resizing method determined or obtained in step 2520 is applied to this intermediate output with the size $\overline{T}$ in step 2550, thereby obtaining an output having the size $\hat{T}$. The size $\hat{T}$ may be larger than the size $\overline{T}$ if the resizing comprises an increasing of the size of the intermediate output $\overline{T}$. If the resizing comprises a decreasing of the size $\overline{T}$, then the size $\hat{T}$ will be smaller than the size $\overline{T}$ of the intermediate output.

The output with the size $\hat{T}$ may already constitute the decoded picture so that, in step 2560, the decoded picture may be directly obtained after this resizing. However, it may also be possible that some further processing, after having applied the resizing, is performed and only then the decoded picture is obtained. However, for ease of explanation, it is assumed that after having applied the resizing to the intermediate output so that it is transformed to an output having a size $\hat{T}$, the decoded picture is immediately obtained in the step 2560.

Above, it was explained that in the step 2520, the resizing method to be applied in step 2540 may be obtained. This may be efficient if information on the resizing method to choose is encoded or provided in the bitstream. When processing or parsing the bitstream, this information can then be obtained when having received the input and from this, the resizing method to apply can be obtained. However, it can also be provided that the resizing method is only obtained after having obtained the intermediate output with the size $\bar{T}$ and before applying the resizing in step 2550 that makes use of the obtained resizing method.

As was already explained above, it is possible that the resizing method to apply is obtained or determined from the size $\hat{T}$ that may be provided as output size and/or the size T of the input and/or information regarding the upsampling ratios of the upsampling layers of the neural network. For example, the input size T may be multiplied with the upsampling ratios of all upsampling layers. This provides the size $\bar{T}$ of the intermediate output. The result, i.e. the size $\bar{T}$, may then be compared to the size $\hat{T}$. If the result differs from $\hat{T}$, a resizing will be applied. For example, if $\bar{T}<\hat{T}$, a resizing will be applied that increases the size of the intermediate output to the size $\hat{T}$. If $\bar{T}>\hat{T}$, a resizing will be applied that decreases the size of the intermediate output. If $\bar{T}=\hat{T}$, it may be determined that no resizing of the intermediate output to a different size is necessary.

Additionally, or alternatively, information on which resizing method to apply may already be provided in the bitstream or an additional bitstream in the form of one or more indications.

Figure 24:
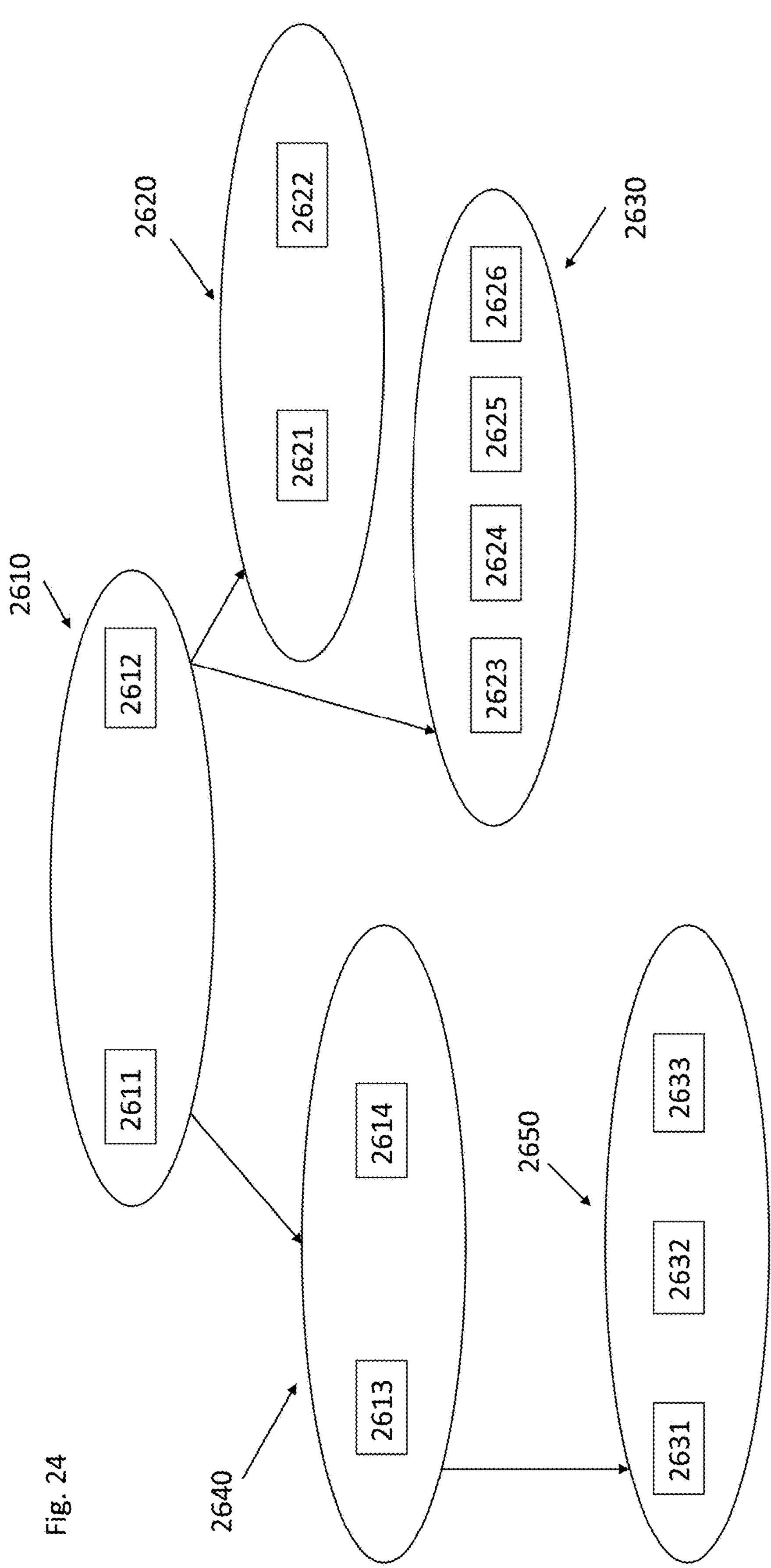
FIG. 24 shows an embodiment of one or more indications being provided for the decoding, in accordance with an embodiment of the present disclosure.

In this regard, FIG. 24 shows an exemplary embodiment of indications that may be provided as part of the bitstream or in an additional bitstream to a decoder implementing the decoding method in order to allow for obtaining the resizing method to be applied. These indications may be provided in the bitstream by the encoder that encoded the picture, thereby ensuring that the decoder uses appropriate information to apply the appropriate resizing method when decoding the bitstream to obtain the decoded picture.

In this regard, most of what was described in relation to FIG. 21 also applies to the one or more indications provided to the decoder. In some examples, there may be provided a first indication 2610 as part of the bitstream. The value of the first indication 2610 may indicate (2611) whether padding or cropping is to be used as the resizing method or whether interpolation (value 2612) is to be used for the resizing. Depending on which of the values the first indication 2610 takes, a second indication 2620 and a third indication 2630 as explained above already in relation to FIG. 21 or a fourth indication 2640 and a fifth indication 2650 may be provided also in line with what was explained in relation to FIG. 21.

The indications shown in FIG. 24 and explained above are described to be present depending on values of another indication. For example, presence of the indication 2620 was described to depend on the value of the indication 2610, denoted as first indication.

Alternatively, it is also encompassed by the present disclosure that each of the first to fifth indication is present independent from the presence of another indication. In this context, naming the indications as first, second, third etc. indication is just employed here for easier identification of the different indications. As they may be provided as independent indications, they may, each, also be referred to as "indication". Furthermore, the numbering of first, second, etc. indication is not intended to limit these indications to an order in which they occur. Rather, this is considered to just be a naming of the different indications that allows for easier identification.

Furthermore, in line with some embodiments, instead of or in addition to these first to fifth indications, a (further) indication may be provided in line with some embodiments, where this indication allows for obtaining the method of resizing from a table.

This indication may be or may comprise an index that indicates an entry in a look-up table. This look-up table, LUT, may comprise a plurality of entries, each entry specifying a method of resizing. There may be entries in the LUT specifying that padding or cropping or interpolation is to be used. Additionally or alternatively, the LUT may comprise entries where each entry specifies the kind of padding (reflection padding, repetition padding or padding with zeros) that is to be used. Additionally or alternatively, the LUT may comprise an entry specifying that interpolation is to be used, entries that specify that interpolation is to be used for increasing the size of the intermediate output by the resizing or to decrease the size of the intermediate output by the resizing, and/or that specify the filter to be used during the interpolation.

Exemplarily, the LUT may comprise 4 entries for padding/cropping, where one entry specifies cropping, one entry specifies padding with zeros, one entry specifies repetition padding and one entry specifies reflection padding. Additionally, the table may comprise one or more entries for interpolation to be used to increase the size of the intermediate output by the resizing. These entries may specify different interpolation filters each, where the interpolation filters may comprise Bilinear, Bicubic, Lanczos3, Lanczos5, Lanczos8 and a N-tab filter, or any other filter or any other number of different filters.

In some embodiments, this may encompass that there are 6 entries that specify different methods of increasing the size of the intermediate output by interpolation (one for each filter). Further, 6 entries may be provided in the LUT for reducing the size of the intermediate output by interpolation, where each entry specifies a corresponding filter to be used in the interpolation.

Thus, the index may be provided to take 16 different values, corresponding to the 16 different entries in the LUT (4 for padding methods and cropping and 6 entries each for interpolation to increase the size with a filter and for interpolation to decrease the size with a filter). The LUT may be available to the decoder so that, depending on the value of the indication, the decoder can determine the method of resizing to be applied.

The indication comprising the index to the LUT may, like the other indications referred to above, be provided to the decoder for example in a bitstream in addition to the bitstream encoding the picture or as part of the bitstream encoding the picture.

Using these one or more indications and/or additional information for example on the intended size $\hat{T}$ as explained above, the decoder can determine or obtain the resizing method that is to be applied in order to decode the picture. Thereby, it can be ensured that a resizing method applied by an encoder during encoding of the picture is appropriately indicated to the decoder.

In this regard, it is noted that the information provided in the one or more indications to the decoder may be identical to the information of the one or more indications provided according to FIG. 21 to the encoder. These one or more indications could, in some embodiments, thus be copied into the bitstream by the encoder. This will result in the decoder being informed about which operations the encoder has applied. It is clear that when the encoder has applied a cropping to an input before processing of the downsampling layers of the neural network, a padding or other resizing method that increases the size of the intermediate output needs to be applied in order to increase the size $\overline{T}$ of the intermediate output in order to obtain an output with the size $\hat{T}$ at the decoder. This is because the processes performed at the encoder and the decoder are basically inverse to each other. If the same resizing method as applied at the encoder would be applied at the decoder, the picture would not be reconstructed.

In view of this, in one embodiment, the indications shown or explained in relation to FIG. 24 indicate the opposite or the inverse of what was applied by the encoder when encoding the picture. In view of this, when the encoder encodes the picture and provides indications to the bitstream, these indications may be obtained from the indications explained in relation to FIG. 21 by inverting them, for example by inverting the values of the flags as far as it pertains to whether increasing or decreasing the size is to be used.

FIG. 25 shows an encoder 2700 for encoding a picture. The encoder comprises one or more processors 2701 that are adapted to implement a neural network, the neural network comprising, in a processing order of the picture through the neural network, a plurality of layers comprising at least one downsampling layer that is adapted to apply downsampling to an input, and a transmitter 2702 for outputting the bitstream. The encoder 2700 and its one or more processors 2701 may be adapted for encoding a picture by:

Obtaining a resizing method out of a plurality of resizing methods,

Resizing an input with the size S to a size $\overline{S}$ by applying the resizing method, Processing the resized input with the size $\overline{S}$ by the neural network, wherein the neural network comprises one or more downsampling layers, and Providing, after processing the input of the size $\overline{S}$ with the neural network, an output of the neural network, the output having a size P that is smaller than S in the at least one dimension.

Additionally, the encoder may comprise a receiver 2702 for receiving the picture or data associated with the picture.

Figure 26:
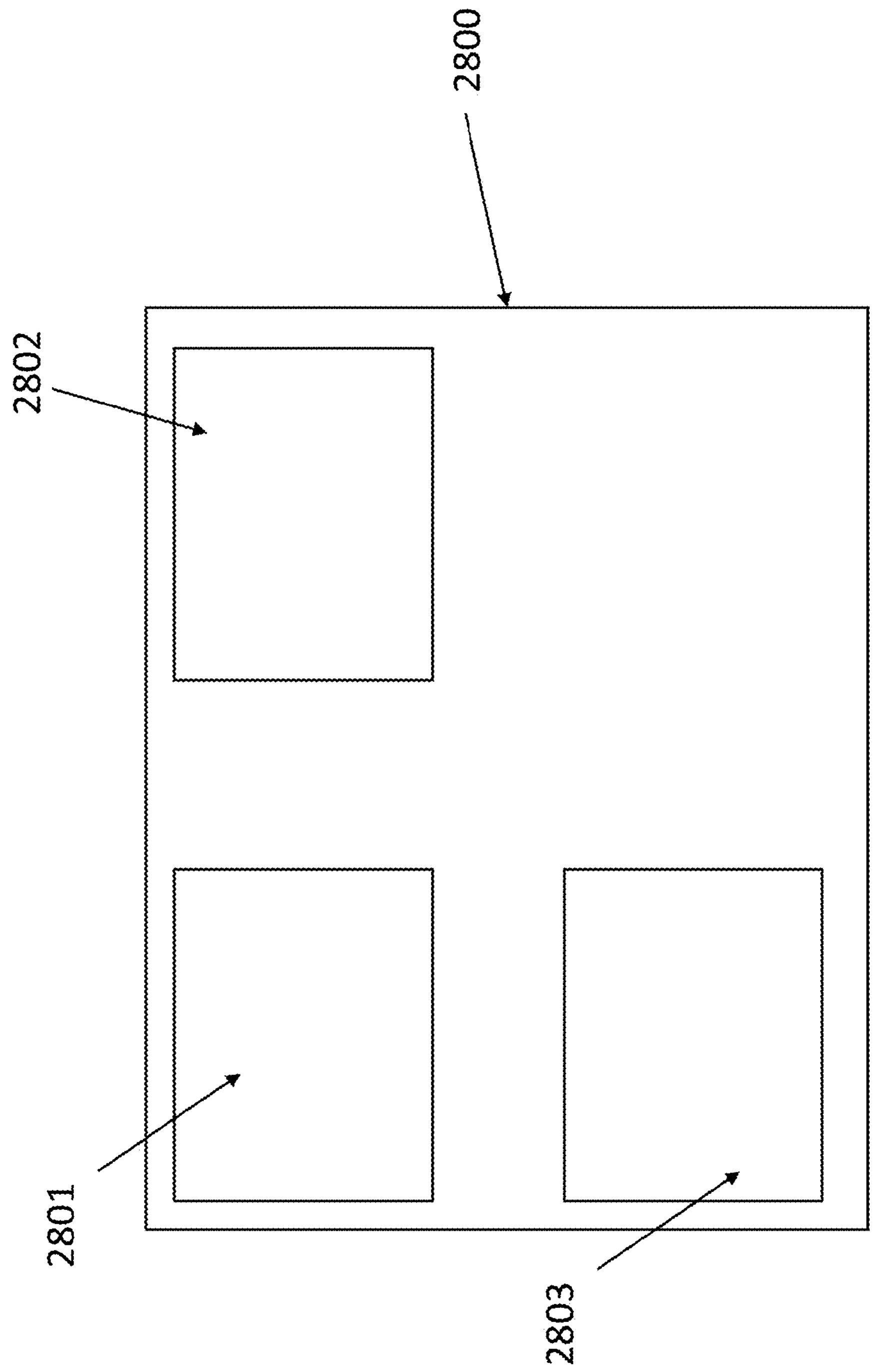
FIG. 26 shows a schematic depiction of a decoder according to one embodiment of the present disclosure.

FIG. 26 depicts an embodiment of a decoder 2800 for decoding a bitstream representing a picture, wherein the decoder 2800 comprises a receiver 2801 for receiving a bitstream and one or more processors 2802 that are configured to implement a neural network, the neural network comprising, in a processing order of the bitstream through the neural network, a plurality of layers comprising at least one upsampling layer that is adapted to apply upsampling to an input, and a transmitter 2803 for outputting a decoded picture, wherein the decoder is adapted to decode a picture by:

Obtaining a resizing method out of a plurality of resizing methods,

Processing the input with a size T by the neural network, wherein the neural network comprises one or more upsampling layers, thereby obtaining an intermediate output having a size $\overline{T}$ that is larger than T in at least one dimension, Resizing the intermediate output from the size $\overline{T}$ to a size $\hat{T}$ by applying the obtained resizing method, thereby obtaining a decoded picture.

It is intended that the embodiments of the encoder according to FIG. 25 and the decoder according to FIG. 26 are adapted to implement all embodiments referred to above regarding the encoding of a picture (for the encoder) or the decoding of a bitstream (for the decoder), including those as explained in FIG. 19 to 24.

The encoder and the decoder according to FIGS. 25 and 26 may be implemented in any technically reasonable way. The encoder and/or the decoder may be implemented using hardware and software components running on the hardware where the software components realize the functionalities mentioned above. Also, dedicated hardware may be provided for implementing functionalities. Likewise, the encoder and/or the decoder may be implemented using virtual devices, including virtual processors and the like.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

* Multiplication, including matrix multiplication $x_y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x ? y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

–– Decrement, i.e., x–– is equivalent to x=x–1; when used in an array index, evaluates to the value of the variable prior to the decrement operation.

+= Increment by amount specified, i.e., x+=3 is equivalent to x=x+3, and x+=(–3) is equivalent to x=x+(–3).

–= Decrement by amount specified, i.e., x–=3 is equivalent to x=x–3, and x–=(–3) is equivalent to x=x–(–3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \ \&\& \ y >= 0 \\ \text{Atan}\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Round}(x) = \text{Sign}(x) * \text{Floor}(\text{Abs}(x) + 0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |
| "x * y", "x/y", "x ÷ y", "x/y", "x % y" |
| "x + y", "x − y" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \| \| y" |
| "x ? y : z" |
| "x..y" |
| "x = y", "x += y", "x −= y" |

Text Description of Logical Operations

In the text, a statement of logical operations as would be described mathematically in the following form:

```
if( condition 0 )
  statement 0
else if( condition 1 )
  statement 1
...
else /* informative remark on remaining condition */
  statement n
```

may be described in the following manner:

```
... as follows / ... the following applies:
  If condition 0, statement 0
  Otherwise, if condition 1, statement 1
  ...
  Otherwise (informative remark
  on remaining condition), statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
  statement 0
else if( condition 1a | | condition 1b )
  statement 1
...
else
  statement n
```

may be described in the following manner:

```
... as follows / ... the following applies:
If all of the following conditions
are true, statement 0:
  condition 0a
  condition 0b
Otherwise, if one or more of the
following conditions are true, statement 1:
  condition 1a
  condition 1b
...
Otherwise, statement n
```

In the text, a statement of logical operations as would be described mathematically in the following form:

```
if(condition 0)
  statement 0
if(condition 1)
  statement 1
```

may be described in the following manner:

When condition 0, statement 0

When condition 1, statement 1

Although embodiments of the present disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304. In general, the embodiments of the present disclosure may be also applied to other source signals such as an audio signal or the like.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding a bitstream representing a picture using a neural network (NN) to process an input representing a matrix having a size in at least one dimension, wherein the method comprises:

obtaining a resizing method out of a plurality of resizing methods, wherein obtaining the resizing method is based on one or more indications, wherein the one or more indications comprise a third indication, wherein the third indication has a value that indicates an interpolation filter that is to be used in the interpolation, wherein, the third indication is or comprises an index indicating an entry in a first lookup table (LUT) that has a plurality of entries and each entry in the first LUT specifies the interpolation filter, wherein obtaining the resizing method comprises comparing a larger size with another size and obtaining, based on the comparing, the resizing method, wherein the another size is obtained from a function comprising a combined upsampling parameter of the NN, the upsampling parameter being a product of upsampling ratios of all upsampling layers of the NN, wherein each upsampling layer has a different upsampling ratio;

processing the input with the size by the NN, wherein the NN comprises one or more upsampling layers, thereby obtaining an intermediate output having the larger size that is larger than the size in the at least one dimension; and resizing the intermediate output from the larger size to the another size by applying the obtained resizing method, thereby obtaining a decoded picture.

2. The method according to claim 1, wherein the step of obtaining the resizing method comprises determining the resizing method from the plurality of resizing methods based on information relating to at least one of the input, the one or more layers of the NN, an output to be provided by the NN, or the decoded picture.

3. The method according to claim 1, wherein the plurality of resizing methods comprises padding, padding with zeros, reflection padding, repetition padding, cropping, interpolation to increase the larger size of the intermediate output to the another size, interpolation to decrease the larger size of the intermediate output to the another size.

4. The method according to claim 1, wherein the another size is further obtained from:

(ii) a product of the size and the unsampling ratios of all unsampling layers of the neural network; or (iii) the bitstream or an additional bitstream or an index in the bitstream or an index in the additional bitstream and the index indicating an entry in a table, wherein the table is a lookup table (LUT), comprising a plurality of entries and each entry indicates the another size, wherein the method further comprises obtaining the another size using the index.

5. The method according to claim 1, wherein:

based on determining that the larger size is not equal to the another size, the resizing method is applied; or based on determining that the larger size is smaller than the another size, the resizing method is applied that increases the larger size; or based on determining that the larger size is larger than the another size, the resizing method is applied that decreases the larger size.

6. The method according claim 2, wherein the one or more indications comprise at least one of:

a first indication being or comprising a first flag having a size of 1 bit, wherein a first value of the first indication indicates that padding or cropping is to be applied as the resizing method and a second value of the first indication indicates that interpolation is to be applied as the resizing method;

a second indication, wherein the second indication has a first value that indicates that the larger size to be increased and a second value that indicates that the larger size is to be decreased;

a fourth indication, being or comprising a second flag having a size of 1 bit, the fourth indication having a first value that indicates that padding is to be applied as the resizing method and a second value that indicates that cropping is to be applied as the resizing method;

a fifth indication having a first value that indicates whether padding with zeros, reflection padding or repetition padding is to be applied as the resizing method; and a sixth indication that is or comprises an index indicating an entry in a second look-up table (LUT) wherein the second LUT comprises a plurality of entries, wherein each entry specifies a resizing method.

7. A decoder for decoding a bitstream representing a picture, wherein the decoder comprises one or more processors for implementing a neural network (NN) to process an input representing a matrix having a size in at least one dimension, wherein the one or more processors are adapted to perform a method comprising:

obtaining a resizing method out of a plurality of resizing methods, wherein obtaining the resizing method is based on one or more indications, wherein the one or more indications comprise a third indication, wherein the third indication has a value that indicates an interpolation filter that is to be used in the interpolation, wherein, the third indication is or comprises an index indicating an entry in a first lookup table (LUT) that has a plurality of entries and each entry in the first LUT specifies the interpolation filter, wherein obtaining the resizing method comprises comparing a larger size with another size and obtaining, based on the comparing, the resizing method, wherein the another size is obtained from a function comprising a combined upsampling parameter of the NN, the upsampling parameter being a product of upsampling ratios of all upsampling layers of the NN, wherein each upsampling layer has a different upsampling ratio;

processing the input with the size by the NN, wherein the NN comprises one or more upsampling layers, thereby obtaining an intermediate output having the larger size that is larger than the size in the at least one dimension; and resizing the intermediate output from the larger size to the another size by applying the obtained resizing method, thereby obtaining a decoded picture.

8. The method according to claim 1, wherein the NN further comprises one or more downsampling layers configured to apply a downsampling by a certain factor.

9. The method according to claim 8, wherein the NN further comprises an inverse generalized divisive normalization (IGDN).

10. The method according to claim 2, wherein the upsampling parameter includes information regarding upsampling ratios of a decoder of the NN.

* * * * *